US008357279B2

(12) United States Patent
Aubry et al.

(10) Patent No.: US 8,357,279 B2
(45) Date of Patent: Jan. 22, 2013

(54) METHODS, APPARATUS AND SYSTEMS FOR CONCENTRATION, SEPARATION AND REMOVAL OF PARTICLES AT/FROM THE SURFACE OF DROPS

(75) Inventors: Nadine Aubry, Wexford, PA (US); Pushpendra Singh, Pine Brook, NJ (US); Muhammad Janjua, Sault Sainte Marie, MI (US); Sai Nudurupati, Sault Sainte Marie, MI (US)

(73) Assignee: Carnegie Mellon University, Pittsburgh, PA (US)

( * ) Notice: Subject to any disclaimer, the term of this patent is extended or adjusted under 35 U.S.C. 154(b) by 235 days.

(21) Appl. No.: 12/710,885

(22) Filed: Feb. 23, 2010

(65) Prior Publication Data

US 2010/0215961 A1 Aug. 26, 2010

Related U.S. Application Data

(60) Provisional application No. 61/208,319, filed on Feb. 23, 2009.

(51) Int. Cl.
*G01N 27/447* (2006.01)

(52) U.S. Cl. .......... 204/547

(58) Field of Classification Search .......... 204/547, 204/643

See application file for complete search history.

(56) References Cited

U.S. PATENT DOCUMENTS

| | | | | |
|---|---|---|---|---|
| 4,305,797 | A | 12/1981 | Knoll et al. | |
| 5,814,200 | A | 9/1998 | Pethig et al. | |
| 7,258,774 | B2 | 8/2007 | Chou et al. | |
| 7,267,752 | B2 | 9/2007 | King et al. | |
| 7,534,331 | B2 | 5/2009 | Kayyem | |
| 7,601,286 | B2 | 10/2009 | Benett et al. | |
| 7,607,641 | B1 | 10/2009 | Yuan | |
| 7,648,835 | B2 | 1/2010 | Breidford et al. | |
| 7,655,470 | B2 | 2/2010 | Ismagilov et al. | |
| 7,658,536 | B2 | 2/2010 | Johnson et al. | |
| 7,658,829 | B2 | 2/2010 | Kanagasabapathi et al. | |
| 2009/0014394 | A1* | 1/2009 | Yi et al. | 210/767 |

OTHER PUBLICATIONS

Jung et al. "Separation of Microparticles and Biological Cells Inside an Evaporating Droplet Using Dielectrophoresis," Anal. Chem. 2007, 79, 5087-5092.*

Zhao et al. "Highly Efficient in-Droplet Particle Concentration and Separation by twDEP and EWOD for Digital Microfluidics," IEEE MEMS 2007, Kobe, Japan, Jan. 21-25, 2007.*

Chabreyrie et al. "Tailored mixing inside a translating droplet," Physical Review E 77, 036314 (2008).*

Yan et al. "Adsorption and Desorption of Clay Particles at the Oil-Water Interface" Journal of Colloid and Interface Science 168, 386-392 (1994).*

(Continued)

*Primary Examiner* — Alex Noguerola

(74) *Attorney, Agent, or Firm* — The Webb Law Firm

(57) ABSTRACT

Methods are provided for concentrating particles on the surface of a drop or bubble in a continuous phase, for separating different types of particles, and for removing particles from the surface of the drop or bubble. The methods also facilitate separation of two types of particles on a drop or bubble, optionally followed by solidification of the drop or bubble, to produce a particle for which the surface properties vary, such as a Janus particle. The methods can be also used to destabilize emulsions and foams by re-distributing or removing particles on the surface of the drop or bubble, facilitating coalescence of the particle-free drops or bubbles.

33 Claims, 30 Drawing Sheets

OTHER PUBLICATIONS

Allan, et al., Particle Behaviour in Shear and Electric Fields. I. Deformation and Burst of Fluid Drops, Proceedings of the Royal Society of London A, Mathematical and Physical Sciences, Apr. 24, 1962, pp. 45-61, vol. 267, No. 1328.
Allan, et al., Particle Motions in Sheared Suspensions, XIV. Coalescence of Liquid Drops in Electric and Shear Fields, Journal of Colloid Science, 1962, pp. 383-408, vol. 17.
Aubry, et al., Control of Electrostatic Particle-Particle Interactions in Dielectrophoresis, Europhysics Letters, 2006, pp. 623-629, vol. 74.
Aubry, et al. Influence of Particle-Particle Interactions and Particles Rotational Motion in Traveling Wave Dielectrophoresis, Electrophoresis, 2006, pp. 703-715, vol. 27.
Aubry, et al., Electrostatic Forces on Particles Floating Within the Interface Between Two Immiscible Fluids, Proceedings of IMECE2007, ASME International Mechanical Engineering Congress and Exhibition, Nov. 11-15, 2007, pp. 1-8.
Aubry et al., Micro- and Nonoparticles Self-Assembly for Virtually Defect-Free, Adjustable Monolayers, Proceedings of the National Academy of Sciences of the United States of America, Mar. 11, 2008, pp. 3711-3714, vol. 105, No. 10.
Aubry, et al., Physics Underlying Controlled Self-Assembly of Micro- and Nanoparticles at a Two-Fluid Interface Using an Electric Field, Physical Review, May 7, 2008, pp. 056302-1-056302-11, vol. 77.
Aveyard, et al., Emulsions Stabilised Solely by Colloidal Particles, Advances in Colloid and Interface Science, 2003, pp. 503-546, vols. 100-102.
Aveyard, et al., Aspects of the Stabilisation of Emulsions by Solid Particles: Effects of Line Tension and Monolayer Curvature Energy, Physical Chemistry Chemical Physics, 2003, pp. 2398-2409, vol. 5.
Aveyard, et al., Structure and Collapse of Particle Monolayers Under Lateral Pressure at the Octane/Aqueous Surfactant Solution Interface, Langmuir, 2000, pp. 8820-8828, vol. 16.
Basaran, et al., Axisymmetric Shapes and Stability of Pendant and Sessile Drops in an Electric Field, Journal of Colloid and Interface Science, Nov. 1990, pp. 10-30, vol. 140, No. 1.
Basaran, Small-Scale Free Surface Flows with Breakup: Drop Formation and Emerging Applications, Perspective, Sep. 2002, pp. 1842-1848, vol. 48, No. 9.
Baygents, et al., Electrohydrodynamic Deformation and Interaction of Drop Pairs, J. Fluid Mech., 1998, pp. 359-375, vol. 368.
Binks, Particles as Surfactants—Similarities and Differences, Current Opinion in Colloid & Interface Science, 2002, pp. 21-41, vol. 7.
Binks, et al., Influence of Particle Wettability on the Type and Stability of Surfactant-Free Emulsions, Langmuir, 2000, pp. 8622-8631, vol. 16.
Binks, et al., Naturally Occurring Spore Particles at Planar Fluid Interfaces and in Emulsions, Langmuir, 2005, pp. 8161-8167, vol. 21.
Bon, et. al., Route to Stable Non-Spherical Emulsion Droplets, European Polymer Journal, 2007, pp. 4839-4842, vol. 43.
Chabreyrie, et al., Tailored Mixing Inside a Translating Droplet, Physical Review E, 2008, pp. 036314-1-036314-4, vol. 77.
Chabreyrie, et al., Robustness of Tuned Mixing Within a Droplet for Digital Microfluidics, Mechanics Research Communications, 2009, pp. 130-136, vol. 36.
Chao, et al., Control of Concentration and Volume Gradients in Microfluidic Droplet Arrays for Protein Crystallization Screening, 26th Annual International Conference of the IEEE EMBS, Sep. 1-5, 2004, pp. 2623-2626, vol. 1 (1).
Cho, et al., Concentration and Binary Separation of Micro Particles for Droplet-Based Digital Microfluidics, Lap Chip, 2007, pp. 490-498, vol. 7.
Darhuber, et al., Principles of Microfluidic Actuation by Modulation of Surface Stresses, Annu. Rev. Fluid Mech., 2005, pp. 425-455, vol. 37.
Dinsmore, et al., Colloidosomes: Selectively Permeable Capsules Composed of Colloidal Particles, Science, Nov. 1, 2002, pp. 1006-1009, vol. 298.
De La Mora, The Fluid Dynamics of Taylor Cones, The Annual Review of Fluid Mechanics, 2007, pp. 217-243, vol. 39.
Garton, et al., Bubbles in Insulating Liquids: Stability in an Electric Field, Proceedings of the Royal Society of London. Series A, Mathematical and Physical Sciences, Jul. 21, 1964, pp. 211-226, vol. 280, No. 1381.
Green, et al., Numerical Solution of the Dielectrophoretic and Travelling Wave Forces for Interdigitated Electrode Arrays Using the Finite Element Method, Journal of Electrostatics, 2002, pp. 235-254, vol. 56.
Heida, et al., Understanding Dielectrophoretic Trapping of Neuronal Cells: Modelling Electric Field, Electrode-Liquid Interface and Fluid Flow, Journal of Physics D: Applied Physics, 2002, pp. 1592-1602, vol. 35.
Horozov, et al., Particle-Stabilized Emulsions: A Bilayer or a Bridging Monolayer, Angewante Chemie-International Edition, 2006, pp. 773-776, vol. 45.
Jones, et al., Multipolar Dielectrophoretic and Electrorotation Theory, Journal of Electrostatics, 1996, pp. 121-134, vol. 37.
Jones, Electromechanics of Particles, 1995, p. 181-188, Cambridge University Press, Cambridge.
Kadaksham, et al., Manipulation of Particles Using Dielectrophoresis, Mechanics Research Communications, 2006, p. 108-122, vol. 33.
Kadaksham, et al., Dynamics of Electrorheological Suspensions Subjected to Spatially Nonuniform Electric Fields, Journal of Fluids Engineering, Mar. 2004, pp. 170-179, vol. 126.
Kadaksham, et al., Dielectrophoresis of Nanoparticles, Electrophoresis, 2004, pp. 3625-3632, vol. 25.
Kadaksham, et al., Dielectrophoresis Induced Clustering Regimes of Viable Yeast Cells, Electrophoresis, 2005, pp. 3738-3744, vol. 26.
Klingenberg, et al., Dynamic Simulation of Electrorheological Suspensions, The Journal of Chemical Physics, Dec. 15, 1989, pp. 7888-7895, vol. 91.
Li, et al., Linear Stability of a Two-Fluid Interface for Electrohydrodynamic Mixing in a Channel, J. Fluid Mech., 2007, pp. 347-377, vol. 583.
Lin, et al., Nanoparticle Assembly and Transport at Liquid-Liquid Interfaces, Science, Jan. 10, 2003, pp. 226-229, vol. 299.
Melcher, et al., Electrohydrodynamics: A Review of the Role of Interfacial Shear Stresses, Annu. Rev. Fluid Mech., 1969, pp. 111-146, vol. 1.
Melle, et al., Pickering Emulsions with Controllable Stability, Langmuir, 2005, pp. 2158-2162, vol. 21.
Menon, et al, Particle-Fluid Interactions with Application to Solid-Stabilized Emulsions, Colloids and Surfaces, 1986, pp. 89-105, vol. 19.
Mugele, et al., Electrowetting: From Basics to Applications, Journal of Physics: Condensed Matter, 2005, pp. R705-R774, Matter 17.
Nudurupati, et al., Concentrating Particles on Drop Surfaces Using External Electric Fields, Electrophoresis, 2008, pp. 1164-1172, vol. 29.
Nudurupati, et al., Electrohydrodynamics of Yeast Cells in Microchannels Subjected to Travelling Electric Fields, Journal of Physics D: Applied Physics, 2006, pp. 3425-3439, vol. 39.
O'Konski, et al., The Distortion of Aerosol Droplets by an Electric Field, Division of Physical and Inorganic Chemistry, Dec. 1953, pp. 955-958, vol. 57.
Ozen, et al., Monodisperse Drop Formation in Square Microchannels, Physical Review Letters, 2006, pp. 144501-1-144501-4, vol. 96.
Ozen, et al., Electrohydrodynamic Linear Stability of Two Immiscible Fluids in Channel Flow, Electrochimica Acta, 2006, pp. 5316-5323, vol. 51.
Pickering, Pickering: Emulsions, J. Chem. Soc., Jan. 1, 1907, pp. 2001-2021, vol. 91(2).
Pieranski, Two-Dimensional Interfacial Colloidal Crystals, Physical Review Letters, Aug. 18, 1980, pp. 569-582, vol. 45, No. 7.
Pillapakkam, et al., A Level-Set Method for Computing Solutions to Viscoelastic Two-Phase Flow, Journal of Computational Physics, 2001, pp. 552-578, vol. 174.
Pillapakkam, et al., Transient and Steady State of a Rising Bubble in a Viscoelastic Fluid, J. Fluid Mech., 2007, pp. 215-252, vol. 589.
Pohl, Dielectrophoresis, The Behavior of Neutral Matter in Nonuniform Electric Fields, 1978, pp. 38-47, Cambridge University Press, Cambridge.

Ramos, et al., The Role of Electrohydrodynamic Forces in the Dielectrophoretic Manipulation and Separation of Particles, Journal of Electrostatics, 1999, pp. 71-81, vol. 47.
Ramsden, Separation of Solids in the Surface-Layers of Solutions and 'Suspensions', Proceedings of the Royal Society of London, Jun. 8, 1903, pp. 156-157.
Reznik, et al., Transient and Steady Shapes of Droplets Attached to a Surface in a Strong Electric Field, J. Fluid Mech., 2004, pp. 349-377, vol. 516.
Saville, Electrohydrodynamics: The Taylor-Melcher Leaky Dielectric Model, Annu. Rev. Fluid Mech., 1997, pp. 27-64, vol. 29.
Sebba, Foams and Biliquid Foams—Aphrons, 1987, pp. 112-113, John Wiley & Sons, Chichester, UK.
Seo, et al., Microfluidic Consecutive Flow-Focusing Droplet Generators, Soft Matter, 2007, pp. 986-992, vol. 3.
Sherwood, Breakup of Fluid Droplets in Electric and Magnetic Fields, J. Fluid Mech., 1988, pp. 133-146, vol. 188.
Singh, et al, Transport and Deformation of Droplets in a Microdevice Using Dielectrophoresis, Electrophoresis, 2007, pp. 644-657, vol. 28.
Singh, et al., Trapping Force on a Finite-Sized Particle in a Dielectrophoretic Cage, Physical Review, 2005, pp. 016602-016607, vol. 72.
Singh, et al., Fluid Dynamics of Floating Particles, J. Fluid Mech., 2005, pp. 31-80, vol. 530.
Singh, et al., Deformation of a Droplet in a Uniform Electric Field, Proceedings of FESM2006, ASME Joint U.S.—European Fluids Engineering Summer Meeting, Jul. 17-20, 2006, pp. 1-8, FEDSM2006-98413.
Singh, et al., A Distributed Lagrange Multiplier/Fictitious Domain Method for Viscoelastic Particulate Flows, J. Non-Newtonian Fluid Mech., 2000, pp. 165-188, vol. 91.
Song, et al., A Microfluidic System for Controlling Reaction Networks in Time, Angew. Chem. 2003, pp. 791-796, vol. 115, No. 7.
Stancik, et al., Coalescence of Particle-Laden Fluid Interfaces, Langmuir, 2004, pp. 90-94, vol. 20.
Subramaniam, et al., Non-Spherical Bubbles, Nature, Dec. 15, 2005, p. 930, vol. 438.
Subramaniam, et al., Microstructure, Morphology, and Lifetime of Armored Bubbles Exposed to Surfactants, Langmuir, 2006, pp. 5986-5990, vol. 22.
Tambe, et al., The Effect of Colloidal Particles on Fluid-Fluid Interfacial Properties and Emulsion Stability, Advances in Colloid and Interface Science, 1994, pp. 1-63, vol. 52.
Tambe, et al., Factors Controlling the Stability of Colloid-Stabilized Emulsions, Journal of Colloid and Interface Science, 1994, pp. 1-10, vol. 162.
Taylor, Disintegration of Water Drops in an Electric Field, Proceedings of the Royal Society of London. Series A, Mathematical and Physical Sciences, Jul. 28, 1964, pp. 383-397, vol. 280, No. 1382.
Taylor, Studies in Electrohydrodynamics. I. The Circulation Produced in a Drop by Electrical Field, Proceedings of the Royal Society of London. Series A, Mathematical and Physical Sciences, Apr. 5, 1966, pp. 159-166, vol. 291, No. 1425.
Torza, et al., Electrohydrodynamic Deformation and Burst of Liquid Drops, Philosophical Transactions of the Royal Society of London. Series A, Mathematical and Physical Sciences, Feb. 18, 1971, pp. 295-319, vol. 269, No. 1198.
Vignati, et al., Pickering Emulsions: Interfacial Tension, Colloidal Layer Morphology, and Trapped-Particle Motion, Langmuir, 2003, pp. 6650-6656, vol. 19.
Wohlhuter, et al., Shapes and Stability of Pendant and Sessile Dielectric Drops in an Electric Field, J. Fluid Mech., 1992, pp. 481-510, vol. 235.

* cited by examiner (a) (b)

(c) (d)

(a) (b)

(c)

(a)

(b)

t=0 s t=10.5333 s t=10.6667 s t=11.5 s (a) (b)

METHODS, APPARATUS AND SYSTEMS FOR CONCENTRATION, SEPARATION AND REMOVAL OF PARTICLES AT/FROM THE SURFACE OF DROPS

CROSS-REFERENCE TO RELATED APPLICATIONS

This application claims the benefit under 35 U.S.C. §119 (e) to U.S. Provisional Patent Application No. 61/208,319, filed Feb. 23, 2009, which is incorporated herein by reference in its entirety.

STATEMENT REGARDING FEDERALLY-SPONSORED RESEARCH AND DEVELOPMENT

This invention was made with government support under Grant Nos. 0626123 and 0626070 awarded by the National Science Foundation. The government has certain rights in this invention.

This invention relates to the field of digital microfluidics, the concentration and separation of particles on the surface of droplets and controlled coalescing of droplets.

An appealing approach to the issue of controlling fluids in microdevices is the use of droplets which can transport various types of fluids and particles. This has been referred to as "digital microfluidics." An advantage of this technique compared to those using fluid streams lies in its potential for programmable microchips with biochemical reactions occurring within single droplets. There are numerous other applications in which the presence of small particles on drop surfaces is important. First, it is well known that foams and emulsions can be stabilized by using submicron sized solid particles which become adsorbed at fluid-fluid interfaces, a technique often used in diverse applications. However, the physics behind the process by which stabilization occurs is still far from being understood. Second, in recent years, partly as a result of the attention given to nano particles (and nanotechnology), there has been much interest in the phenomenon of particles assembly at interfaces, including fluid-fluid interfaces, as a means to fabricate novel nano structured materials. Third, the field of digital microfluidics, which generates and uses droplets-rather than fluid streams-to transport, concentrate and mix fluid and particles, offers a clear advantage in its potential for programmable micro-chips with bio-chemical reactions occurring within single drops.

Concentration and binary separation of micro particles for droplet-based digital microfluids has already been accomplished by Cho, Zhao, and Kim (*Lab Chip* 2007, 7, 490-498). However, the present invention contains major advances over that process. The particles described in the Cho article were charged and underwent electrophoresis. Positively and negatively charged particles can thus be separated via that process. The methods described herein use particles that are not charged, so there is no charge related electric force acting on them. Instead, particles undergo dielectrophoresis, where the force is due to the gradient of the electric field. The method also has application for use with charged particles as dielectrophoresis itself acts on both charged and uncharged particles. At first sight, it is unexpected that the particles would undergo dielectrophoresis when a uniform external electric field is applied. However, the presence of the drop makes the electric field non-uniform in the vicinity and on the surface of the drop. Another major difference is that the particles described in the Cho article are within the droplets; while the particles in the present invention are at the drop's surface.

Furthermore, the methods described herein can be used for separating two kinds of particles from a droplet as well as for washing the droplet. At the end of the process there are either one or two droplets completely free of particles. At the end of process described in the Cho article, there is no droplet without particles.

U.S. Pat. No. 7,267,752 discloses a method for rapid, size-based deposition of particles from liquid suspension using a non-uniform electric field. U.S. Pat. No. 5,814,200 discloses the use of non-uniform, alternating electric field which allows particles to undergo dielectrophoresis, thereby separating two different particles suspended in a medium. U.S. Pat. No. 4,305,797 separates particles within a mixture by passing the mixture through a non-uniform electric field generated between an electrically charged surface and a grounded surface. However, the methods described in those patents differ from those of the present disclosure in that they apply non-uniform electric fields while the methods described herein can use a uniform electric field. The methods disclosed in those patents are for particles suspended in a medium, while the methods described herein relates to particles on the surface of drops where they remain trapped because of the interfacial tension.

SUMMARY

Methods to concentrate or otherwise manipulate or move particles on the surface of a dispersed phase in a continuous phase are provided. Dispersed phases include liquid drops within a liquid or gas continuous phase or gaseous bubbles within a liquid continuous phase. As an example the dispersed phase is a liquid drop in an inmiscible continuous phase. The methods can be used to separate different types of particles on the drop or bubble either to remove them from the drop or bubble or to produce a pattern of particles on the drop or bubble, and to coalesce drops or bubbles. The technique uses an externally applied electric field that is typically uniform to move particles on a surface of a drop suspended in a medium. In an electric field, such as in a uniform field, the electric field's non-uniformity in the vicinity and on the surface of drop result in dielectrophoretic motion of the particles on the surface of the drop. Depending on the respective dielectric constants of the fluids and the particles, particles aggregate either near the poles or near the equator of the drop, creating a patterned structure (e.g., a Janus particle, which is optionally solidified). Also provided are solidified drops, optionally prepared according to the methods described herein, that comprise particles aggregated at their poles and/or equator. In one embodiment, the particles are uncharged.

In a Pickering emulsion, motion of stabilizing particles to either the poles or equator will leave "clear" portions that facilitate coalescence of the emulsion. This effect also can be used to mix two or more types of drops, for example, one comprising a substrate and another comprising an enzyme, to initiate an enzymatic reaction. Mixing may be enhanced in many instances if the drops have different sizes.

When particles aggregate near the poles and the dielectric constant of the drop or bubble is greater than that of the ambient fluid, the drop or bubble deformation is larger than that of a clean drop or bubble. In this case, with a further increase in the electric field, the drop or bubble develops conical ends and particles concentrated at the poles eject out by a tip streaming mechanism, thus leaving the drop or bubble free of particles. On the other hand, when particles aggregate near the equator, it is shown that the drop or bubble can be broken into three or more major droplets or bubbles, with the middle droplet or bubble carrying all particles and the two larger size droplets or bubbles on the sides being free of particles. By "free of particles," it is meant that the drops or bubbles are free of particles, or, in recognition that separation process typically are not perfect, substantially or essentially free of particles. Thus, in one non-limiting example in the context of the methods described herein, a drop or bubble is considered to be free of particles where the number of particles and/or particle density on the surface of the drop is reduced by at least 90%, 95%, or 97.5%, and preferably at least 99%, and increments therebetween as compared to the original drop or bubble from which particles are removed. The method also facilitates separation of particles for which the sign of the Clausius-Mossotti factor is different, making particles of one type aggregate at the poles and of the second type aggregate at the equator. The former can be removed from the drop or bubble by increasing the electric field strength, leaving the latter on the surface of the drop or bubble.

The methods can be used for particle assembly and concentration on a drop or bubble's surface, the full removal of particles from the drop or bubble's surface (cleaning or filtration of particles from bulk liquids and then from the drops or bubbles), and further concentration into smaller drops or bubbles containing a high density of particles. The particle manipulation on drops' or bubbles' surfaces could also be used for changing the drops' or bubbles' surface properties (e.g., for adsorption of external agents or the destabilization of foams and emulsions).

BRIEF DESCRIPTION OF THE DRAWINGS

FIG. 2. The steady deformed shape and the modified electric field around a dielectric drop suspended in a dielectric liquid and subjected to a uniform electric field.

FIG. 7. Schematic diagram showing the formation of drops containing small particles on their surfaces.

remained approximately constant.

Figure 19:
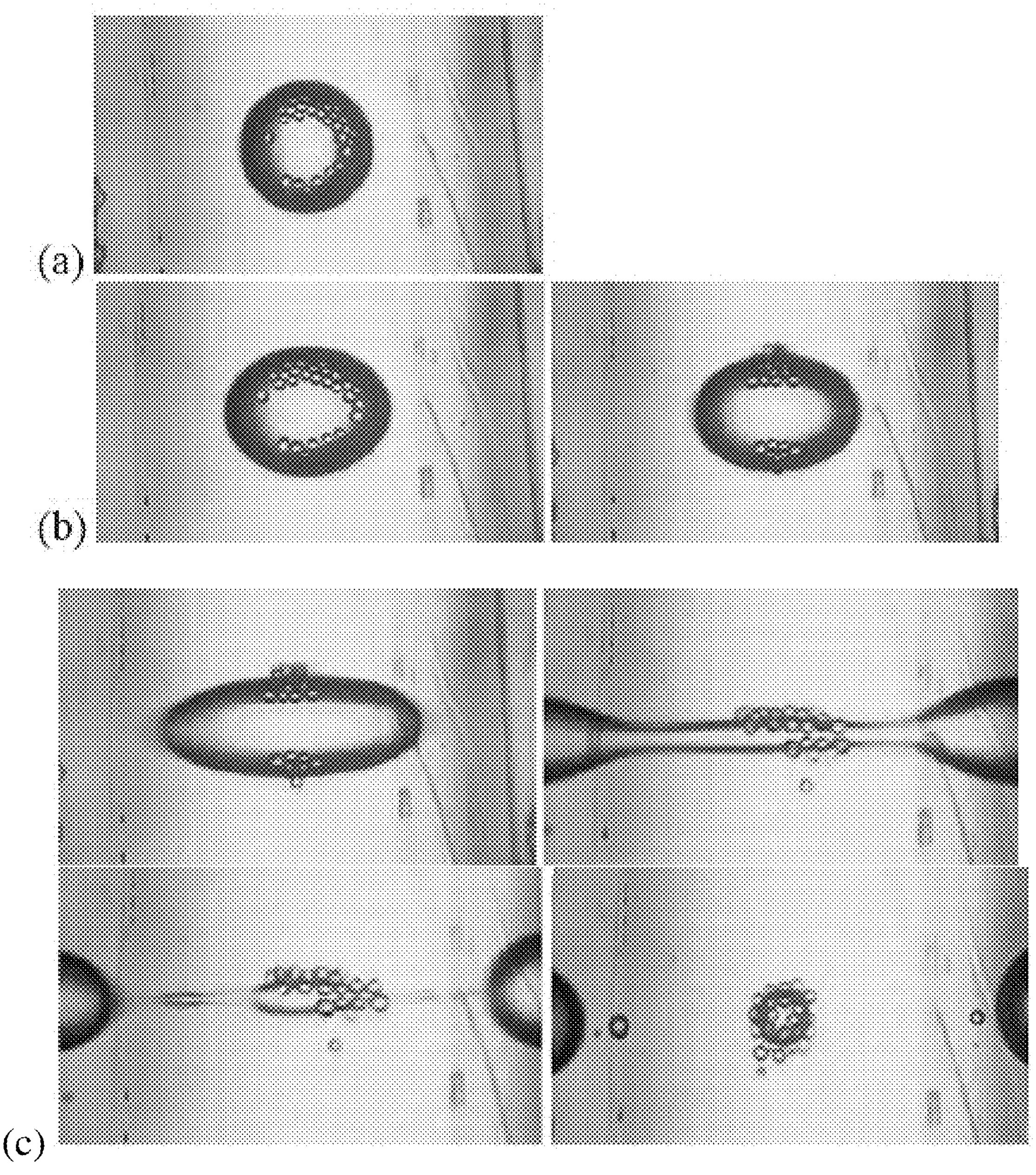

FIG. 19. Removal of polystyrene spheres from a water drop immersed in corn oil. The electrodes were mounted on the left and right side walls of the device, and the distance between them was 2.65 mm. (a) The drop diameter was 876 μm. Polystyrene spheres sedimented to the bottom of the drop as they were heavier than water. The applied voltage was zero. (b) The applied voltage was 1400 V at 100 Hz. Particles moved towards the equator and collected in a ring shaped region around the equator; D=0.15. (c) The applied voltage was 1800 V at 100 Hz. Particles continued to move towards the equator while the drop quickly stretched with time (the sequence is shown in five photographs), and broke into three main droplets. The droplet in the middle contained all of the particles, and the larger sized droplets on the left and right sides were particle free. Notice that there were some particles outside the drop which remained outside throughout the experiment and that some particles were expunged from the surface of the drop because the number of particles became larger than that could be accommodated on the surface of the middle droplet.

Figure 20:
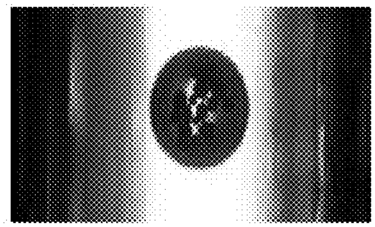
Figure 20:
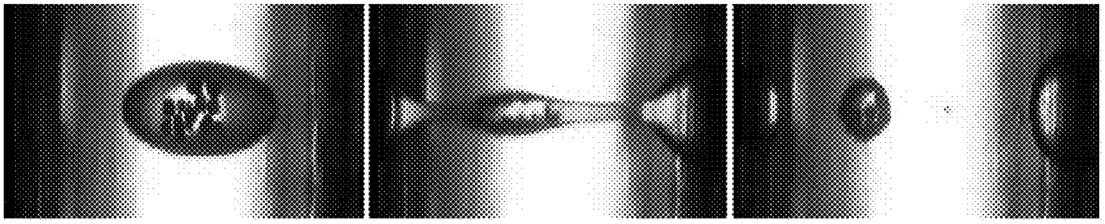

FIG. 20. Removal of extendospheres from a water drop immersed in corn oil. The electrodes were mounted on the left and right side walls of the device, and the distance between them was 2.65 mm. (a) The drop diameter was 796 μm. Extendospheres were trapped on the drop's top surface. The voltage applied was zero. (b) The voltage applied was 2000 V at 1 kHz. Particles remained at the equator while the drop stretched and broke into three main droplets (the sequence is shown in 3 photographs). The droplet in the middle contained all of the particles, and the droplets on the left and right sides were particle free. Notice that at t=0.2 s the distribution of particles was slightly to the left and as a result the middle droplet with the particles was also slightly to the left.

Figure 21:
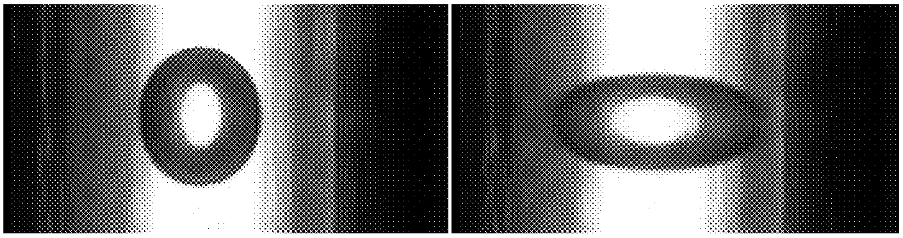
Figure 21:
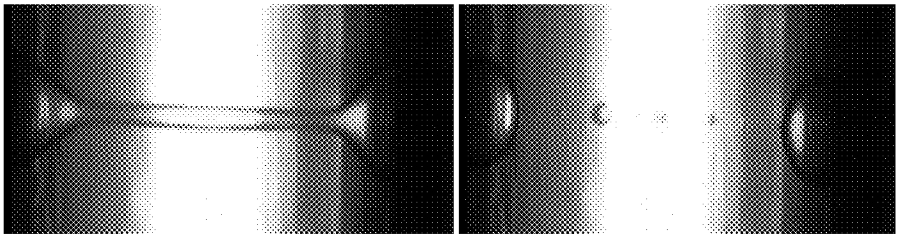

FIG. 21. Removal of extendospheres from a water drop immersed in corn oil. The electrodes were mounted on the left and right side walls of the device, and the distance between them was 2.65 mm. The voltage applied was 2000 V at 1 kHz. A clean drop with a diameter of 828 μm shown at t=0, 10.533, 10.6667 and 11.5 s. The drop stretched and broke into two main drops, although three additional small droplets were also generated in the middle.

Figure 22:
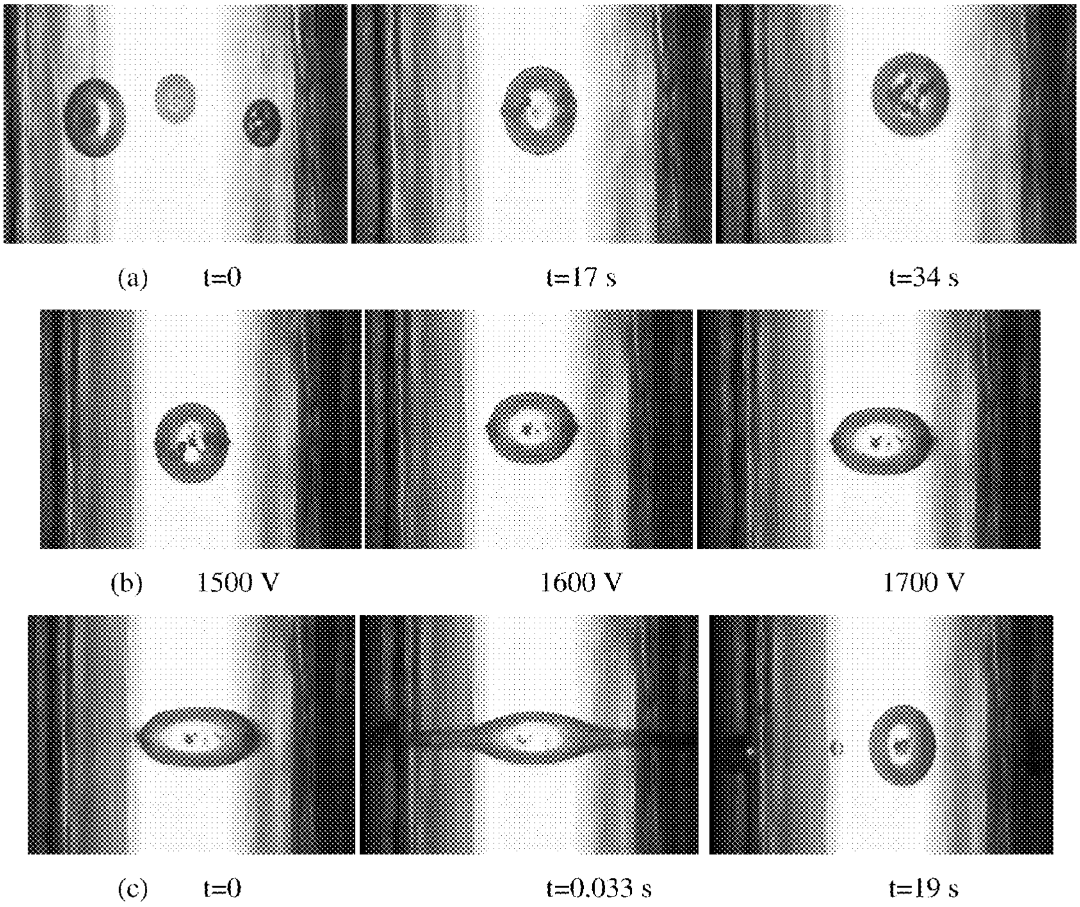

FIG. 22. Removal and separation of extendospheres (larger darker particles) and hollow glass spheres (smaller, diameter 20 μm) from a water drop immersed in corn oil. The electrodes were mounted on the left and right side walls of the device, and the distance between them was 2.65 mm. (a) The electric field induced merging of three drops is shown at t=0, 17 and 34 s. The middle drop carried glass particles, and the left and right drops carried extendospheres. The drops merged when a voltage of 600 V at 100 Hz was applied. The electric field was then switched off and at t=34 s particles stopped moving. The diameter of the combined drop was 622 μm. (b) The steady drop shapes are shown for increasing voltages at 100 Hz. The voltage was increased from 1500 to 1700 V. Most extendospheres (larger darker particles) except for one moved to the poles while the glass particles remained at the equator. (c) The voltage applied was 1825 V at 100 Hz. The drop is shown at t=0, 0.033 and 19 s. The extendospheres were ejected out by tip-streaming, and glass particles and one extendosphere remained in the drop. The last figure shows small droplets on the left and right sides that carried extendospheres. The diameter of the main drop was 573 μm, which was smaller than in (b). Also notice that the size of the drop was smaller than in FIGS. 20 and 11, and therefore it did not break in the middle as in FIGS. 20 and 21.

Figure 23:
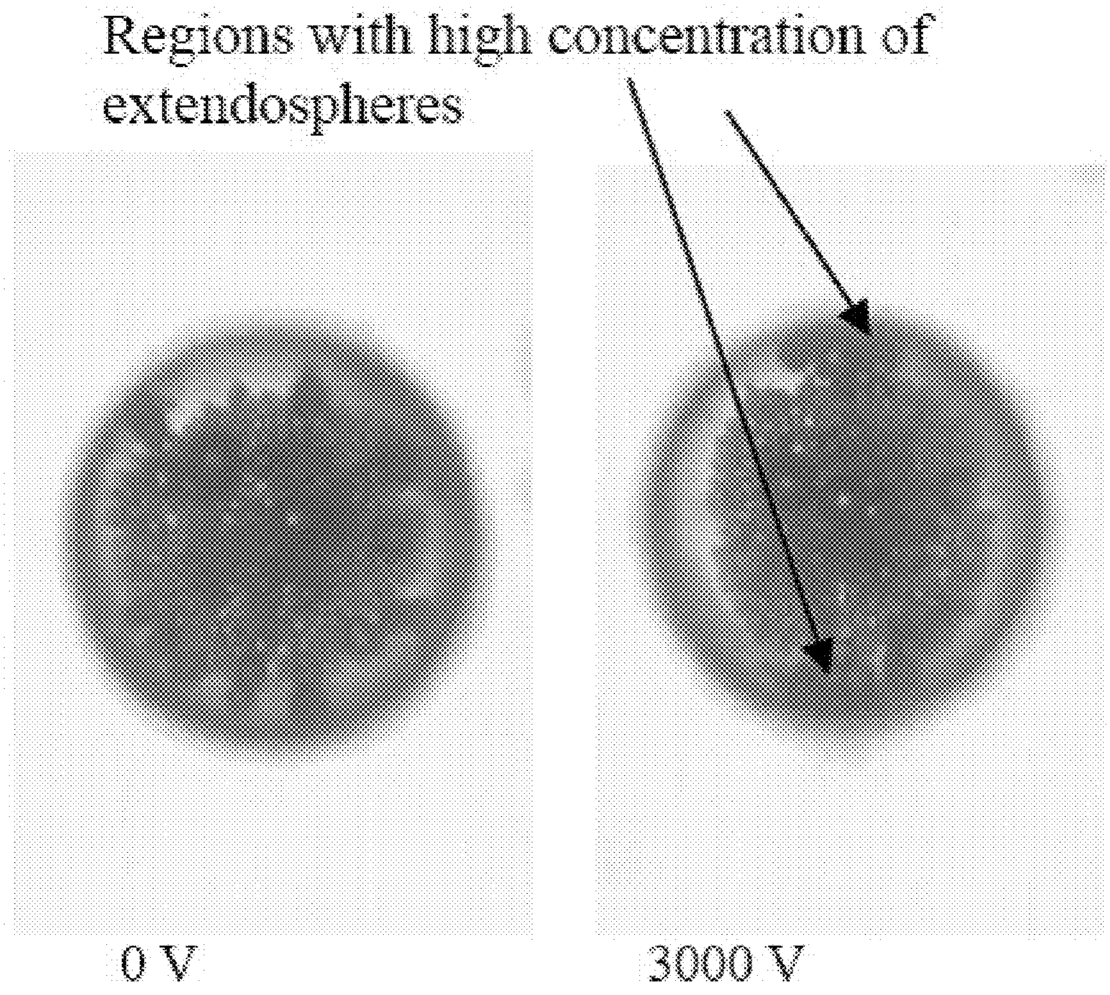

FIG. 23. Experiments showing that when the electric field was applied glass particles (smaller sized particles, a~10 μm) trapped on a water drop moved to the region near the equator and most extendospheres (larger sized particles, a~55 μm) migrated to the region near the poles. Some extendospheres remained trapped at the equator because they were physically blocked. The drop diameter was 624 μm and it was immersed in corn oil. The electrodes were mounted on the upper and lower side walls of the device, and the distance between them was 6.5 mm.

Figure 24A:
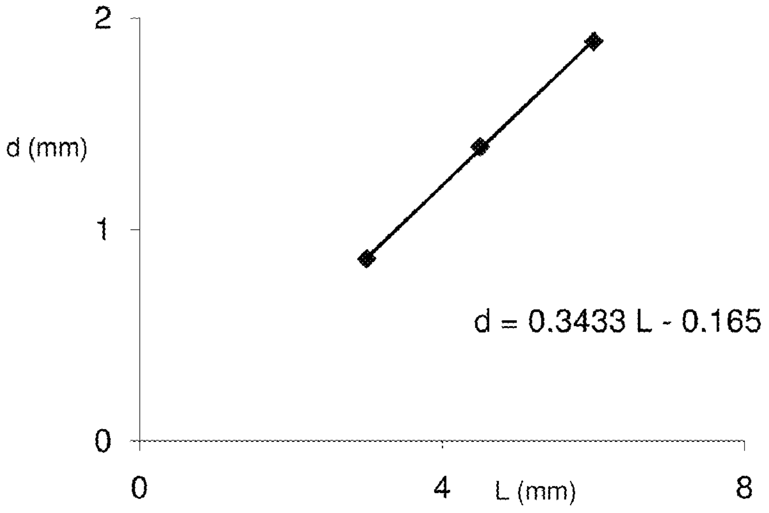
Figure 24B:
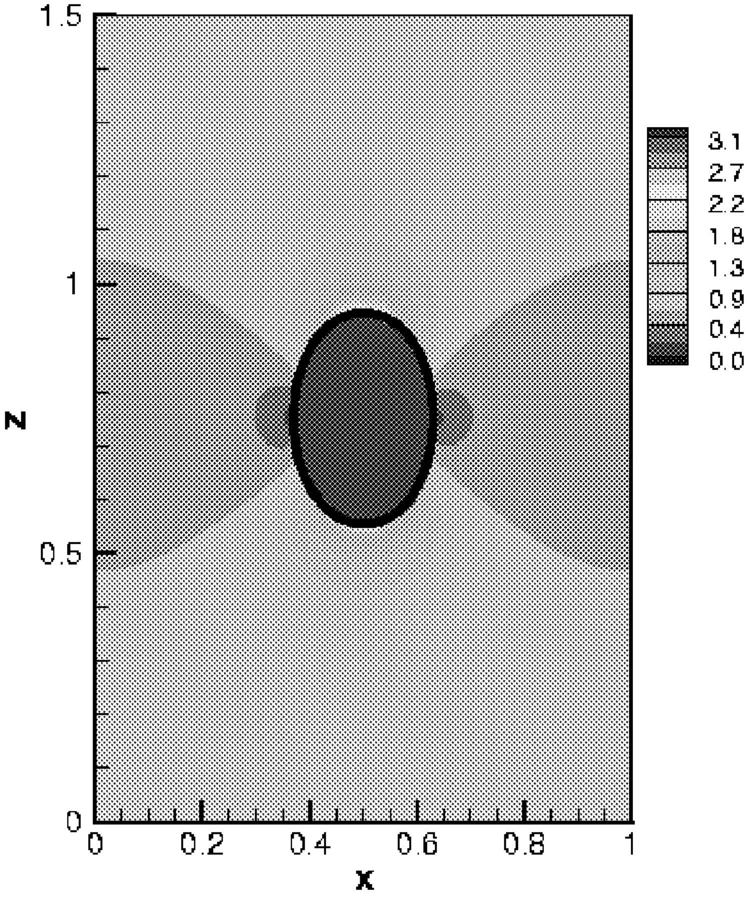
Figure 24C:
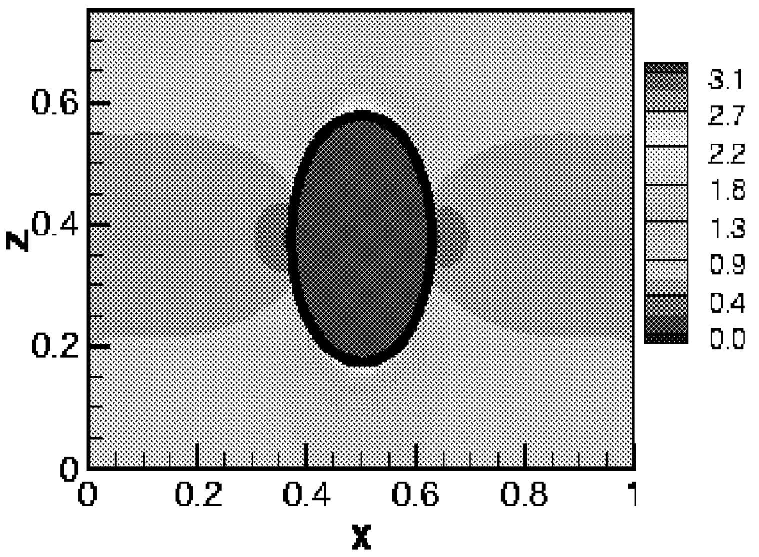

FIG. 24. The diameter d of the smallest water drop that bridged the gap between the electrodes in our experiments is plotted as a function of the distance L between the electrodes, showing a linear dependence with L (with the best linear fit shown here). Tip-streaming occurred for the drops that were of the smaller diameter. The drops were immersed in corn oil and the frequency was 1 kHz. FIGS. 24B and 24C show that the presence of a drop makes the electric field distribution nonuniform and that the electric field strength in the gap between the drop and the electrode increases with decreasing gap. The electrodes are mounted on the upper and lower walls. The electric field in the presence of a drop is computed numerically using the approach described in P. Singh and N. Aubry, Electrophoresis 28, 644 (2007) and S. B. Pillapakkam, and P. Singh, Journal Comput. Phys., 174, 552 (2001); S. B. Pillaipakkam, P. Singh, D. Blackmore and N. Aubry, J. Fluid Mech., 589, 215 (2007)). The drop permittivity is 30 times larger than that of the ambient fluid and the electric Weber number is 0.9. In (FIG. 24B) the distance between the electrodes is 5 times the drop diameter and in (FIG. 24C) it is 2.5 times the drop diameter. The intensity of the applied uniform electric field (and that of the shown isovalues) in (FIG. 24B) and (FIG. 24C) is the same. Notice that in the smaller device (FIG. 24C) the electric field intensity in the region between the electrodes and the drop is greater; this results in an increase in the electric stress causing the drop to bridge the gap.

Figure 25:
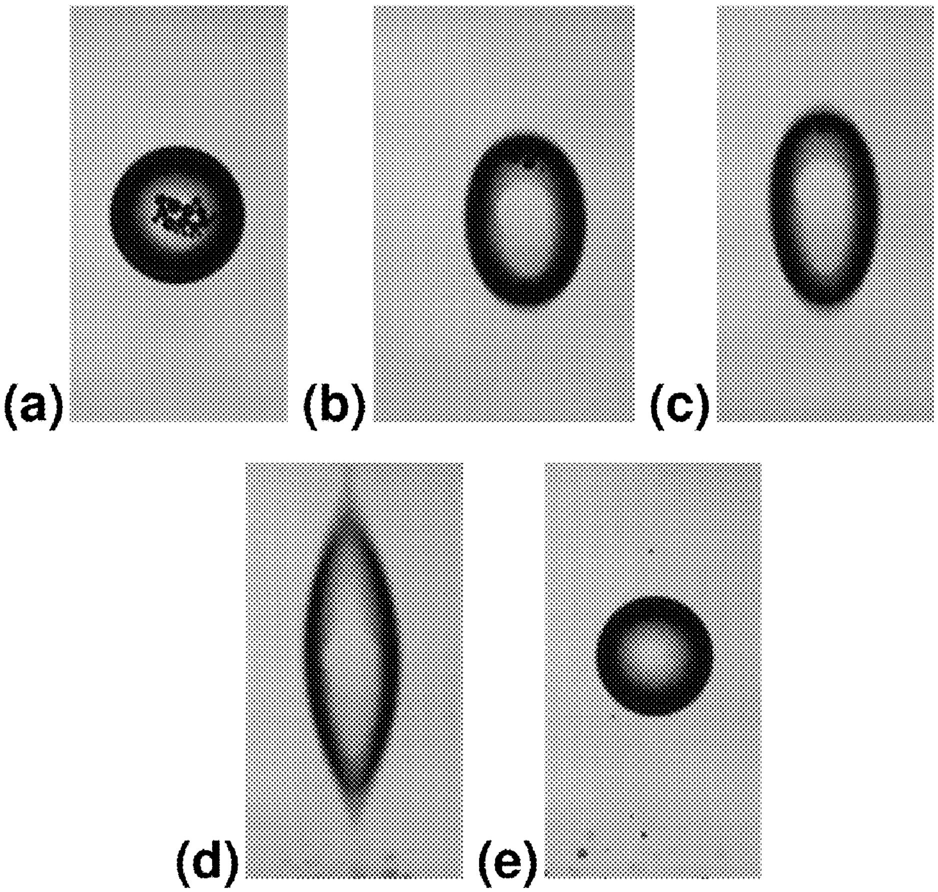

FIG. 25. Removal of extendo spheres from a water drop immersed in corn oil. The initial drop diameter is 844.6 μm. The mean diameter of extendo spheres is 55 μm and the dielectric constant is 4.5. The distance between the electrodes mounted on the upper and lower walls is 6.5 mm and the voltage applied is (a) 0, (b) 3.2 kV, (c) 3.6 kV, (d) 3.95 kV and (e) 0 at 100 Hz. The various stages are: (a) particles are distributed quasi-uniformly on the drop's top surface; (b) particles begin to cluster at the poles; (c) the drop elongates; (d) the drop shape at the poles is conical and all particles have been ejected out; (e) the drop is now clean and spherical.

Figure 26:
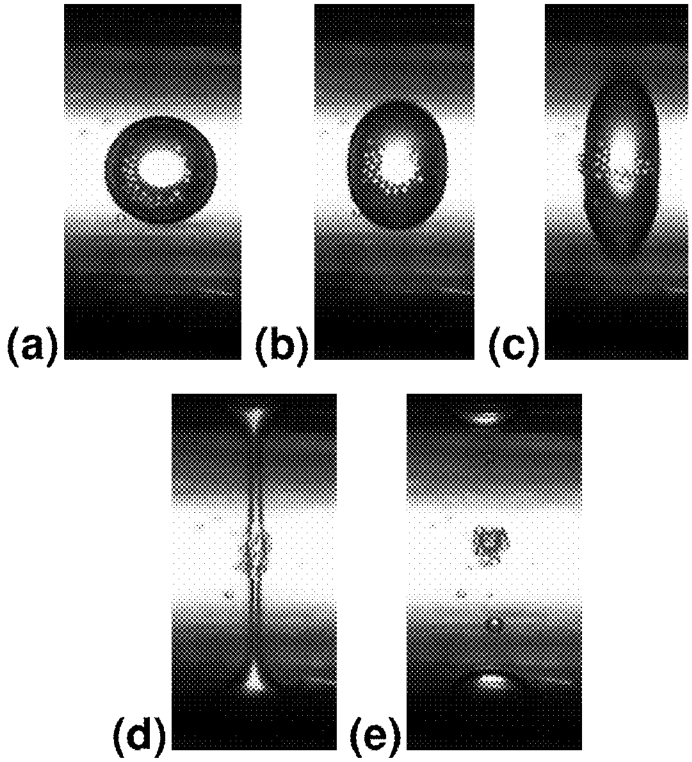

FIG. 26. Removal of polystyrene spheres from a water drop immersed in corn oil. The drop diameter is 932.6 μm. The mean diameter of polystyrene spheres is 70.0 μm and their dielectric constant is 2.5. The distance between electrodes is 2.65 mm. The applied voltage is (a) 0, (b) 1.4 kV, (c) 1.6 kV, (d) 1.8 kV and (e) 0 at 1 kHz. In (b-c) particles move towards the equator and collect in a ring shaped region around the equator. In (d) particles remain at the equator while the drop stretches and breaks into two clean drops, leaving particles in a small droplet (of high particle concentration) in the middle as can be seen in (e). Notice that there are some particles outside the drop which remained outside throughout this experiment.

Figure 27:
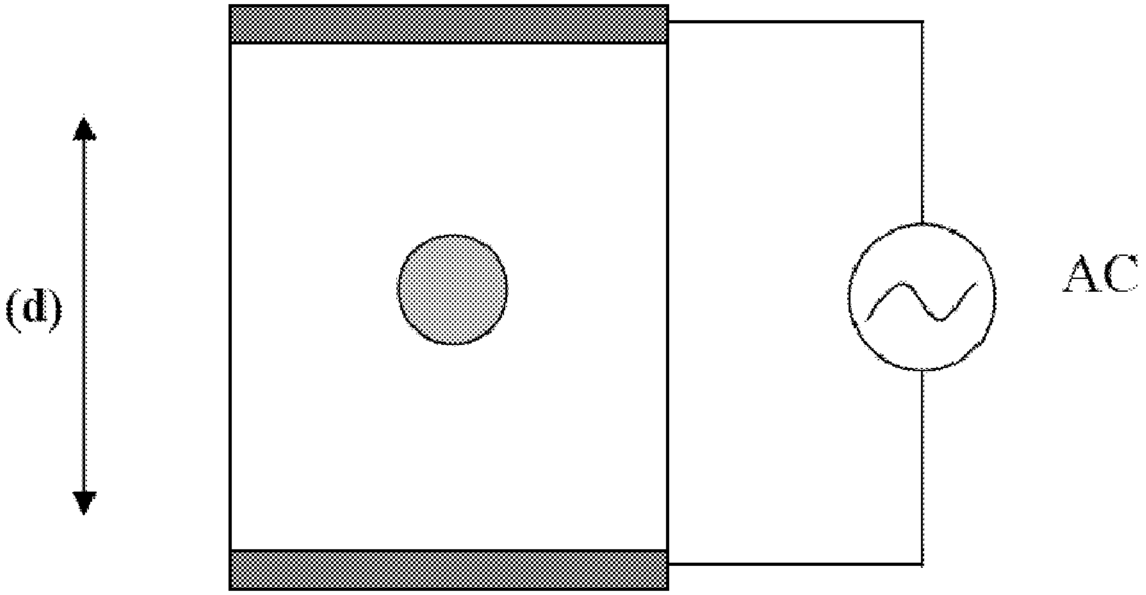

FIG. 27. Schematic of a drop immersed in an ambient liquid, and subjected to a uniform AC electric field. The electric field is generated from the electrodes placed within the top and bottom walls of the device and an AC current is generated by a power supply.

Figure 28A:
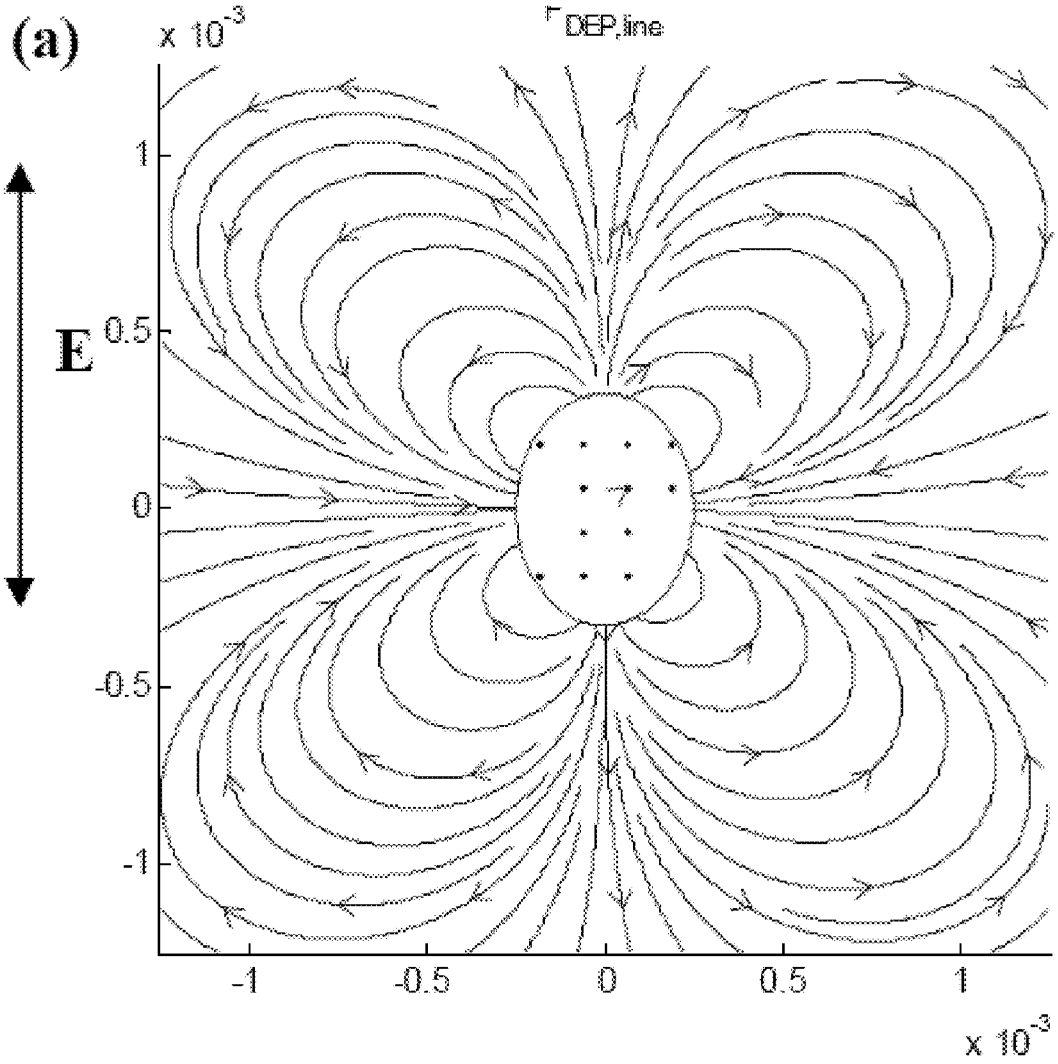
Figure 28B:
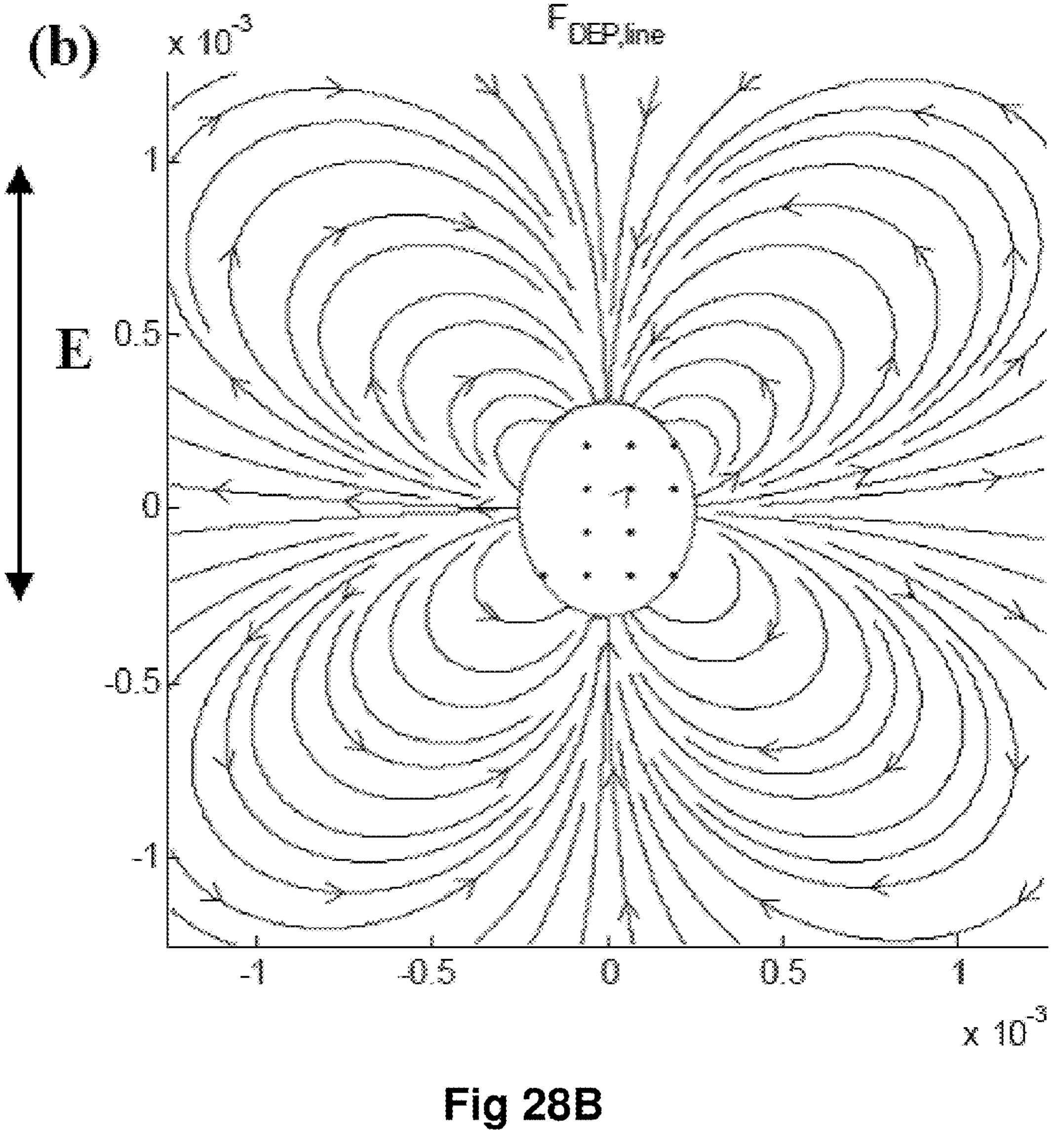

FIGS. 28A and 28B. DEP force lines around a dielectric drop suspended in a dielectric liquid and subjected to a uniform electric field. (FIG. 28A) The combined Clausius-Mossotti factor is negative ($\beta\beta'=-0.1077<0$) and the DEP force lines point towards the equator of the drop; (FIG. 28B) The combined Clausius-Mossotti factor is positive ($\beta\beta'=0.1346>0$) and the DEP force lines point towards the poles of the drop. As shown, the electric field is vertical.

Figure 29:
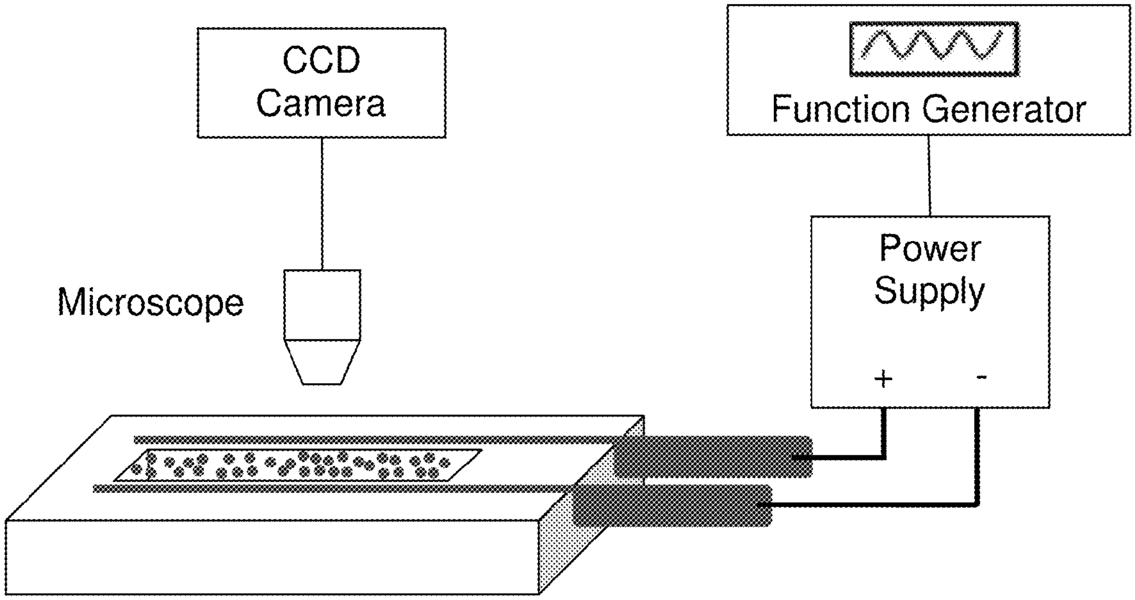

FIG. 29. Schematic of the experimental setup used in the experiments. An electric field is generated by the electrodes placed within the walls of the channel. The voltage is adjusted by means of a power supply, and the applied frequency and wave form are controlled by a function generator.

Figure 30:
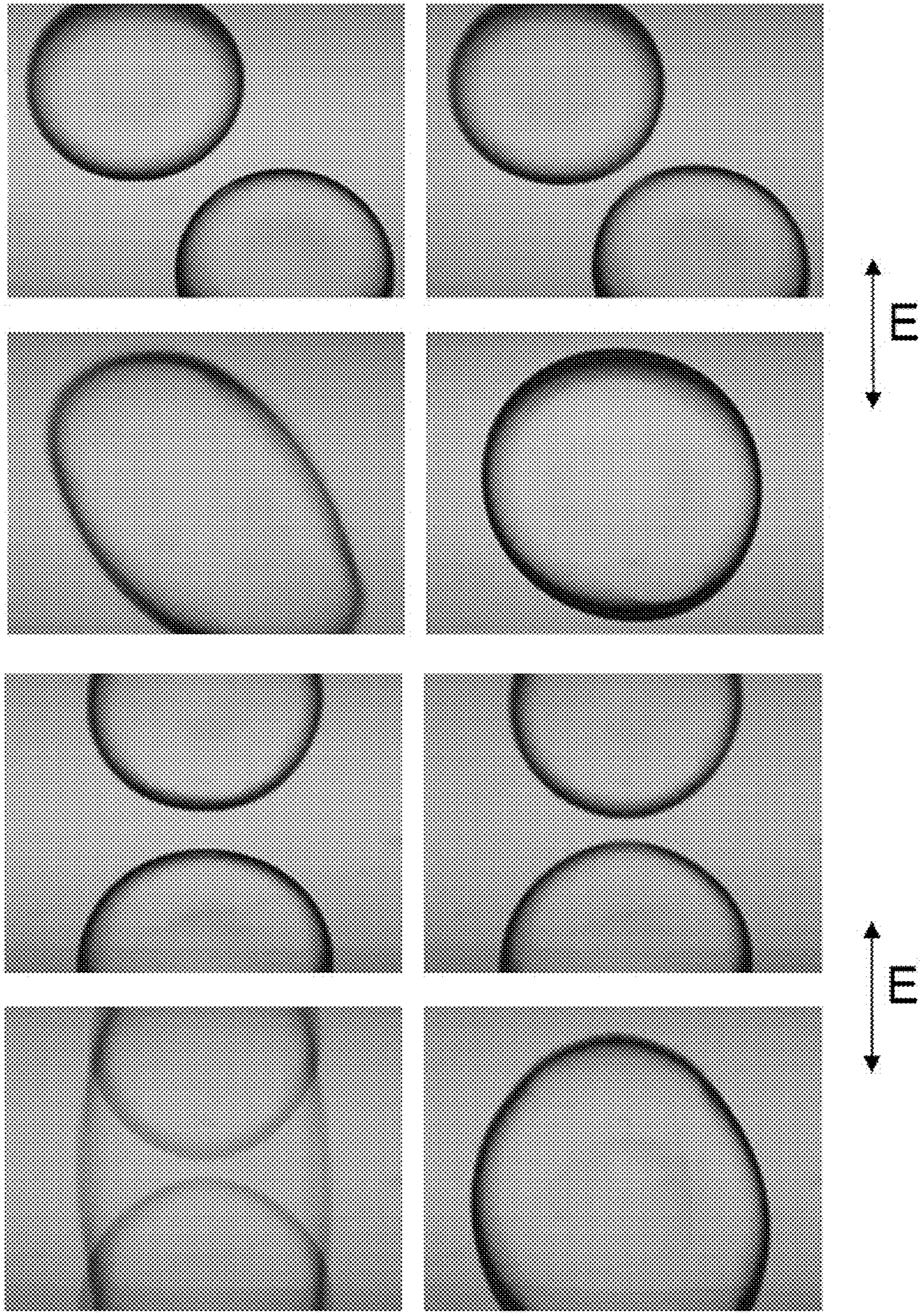

FIG. 30. Time sequence of the coalescence between two drops in presence of an electric field, but without particles. Electrodes are located at the bottom and top of the photographs: (a) drops are initially placed so that the line joining their centers is initially inclined with respect to the electric field direction (no voltage is applied); under a voltage of 380V they approach each other and coalesce; as the electric field is relaxed the final drop recovers a spherical shape; (b) drops are initially placed so that the line joining their centers is initially aligned with the electric field (no voltage is applied); under a voltage of 250 V they approach each other and coalesce; as the electric field is relaxed the final drop recovers a spherical shape (here the shape is not quite spherical as they touch the bottom of the device). In both cases, the coalescence takes place in less than 1/30 s.

Figure 31:
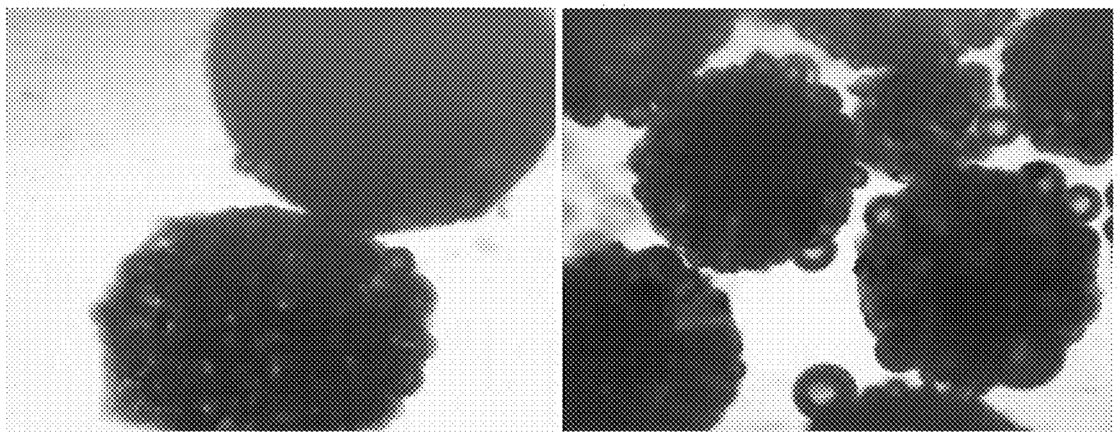

FIG. 31. Pickering water-in-decane emulsion without electric field. Drop surfaces are covered with particles (extendospheres). It is clear that adjacent drops which are covered with particles do not merge. (a) Two drops, (b) Multiple drops.

Figure 32:
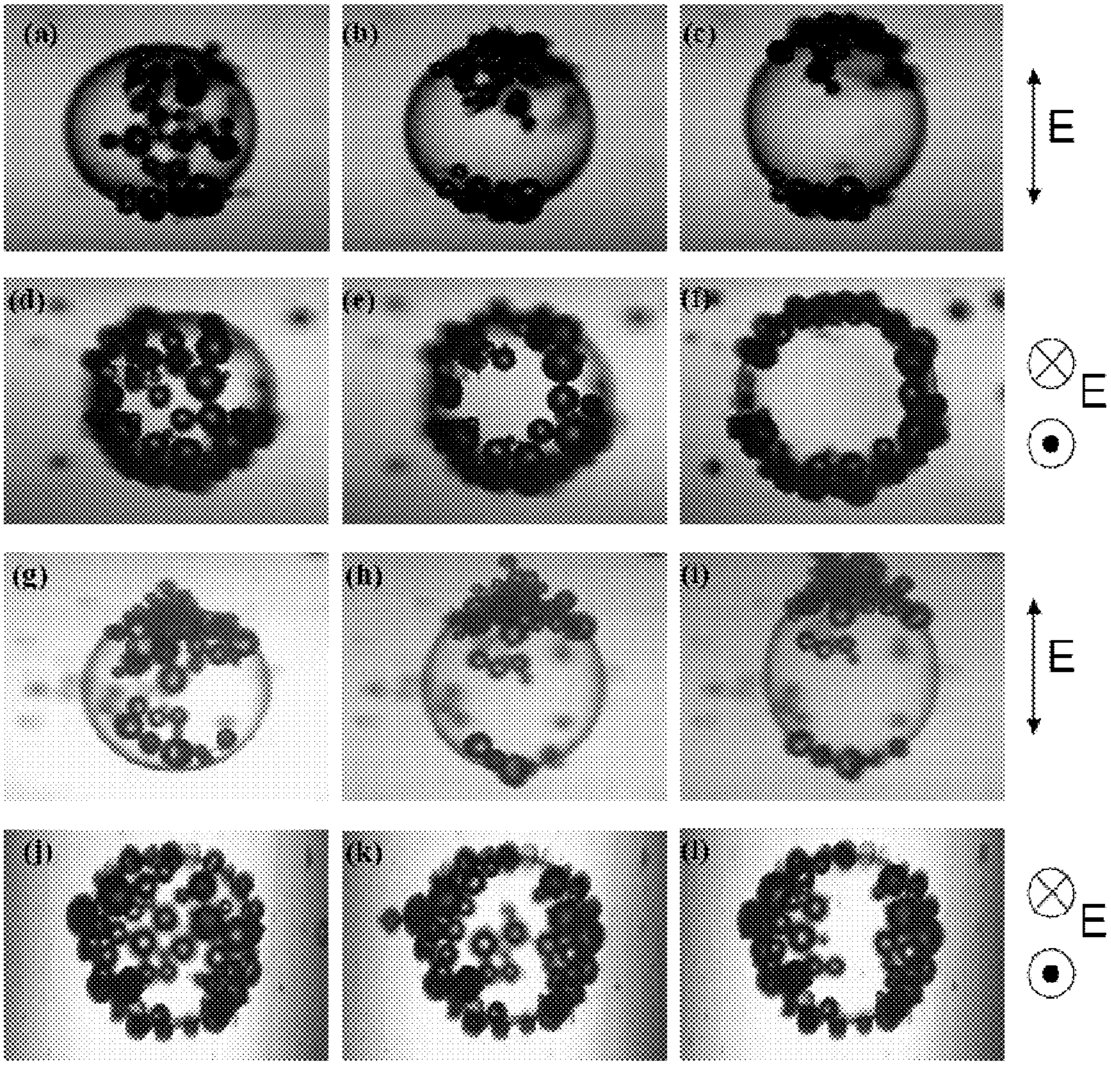

FIG. 32. Particle distribution on the surface of a drop in presence of an external electric field whose direction is either vertical or normal to the view as indicated. In all cases, the drop diameter is about 800 μm and the particles are extendospheres. The frequency of the AC electric field is 1 kHz (a-f) and 100 Hz (g-l), and the voltage is increased from left to right: (a),(d),(g),(j) 0 V; (b),(e),(h),(k) 1500V; (c),(f),(i),(l) 2500V. The particle density is such that the drop surface is not fully covered so that the particles' motion can be clearly observed.

Figure 33:
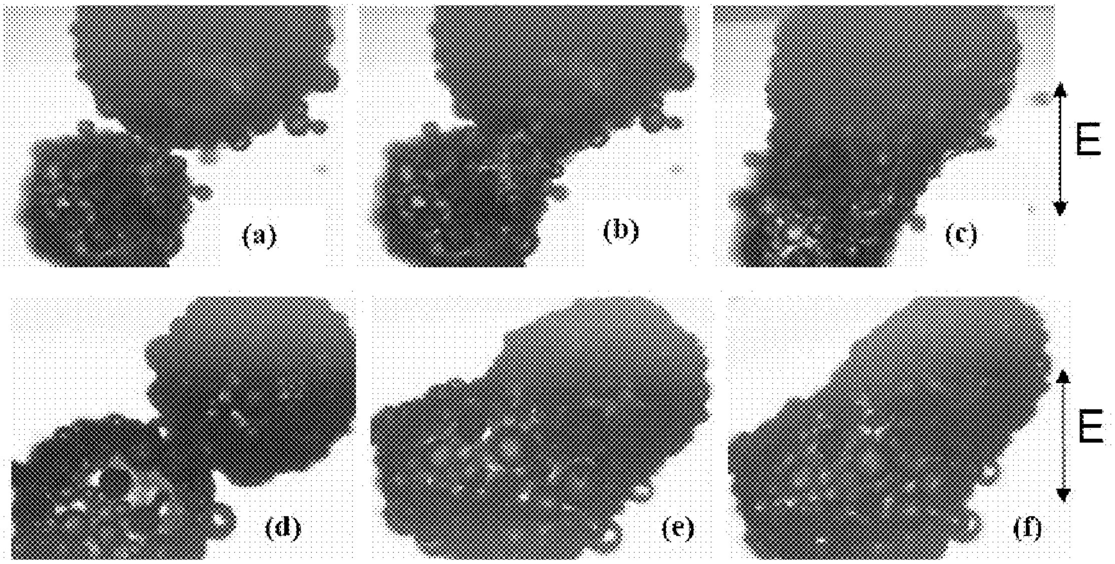

FIG. 33. Time sequence showing the coalescence of two drops covered with particles (extendospheres) and placed at an angle with respect to the (vertical) electric field. Time increases from left to right: (a),(d) t=0 s; (b), (e) t=0.1 s; (c), (f) t=241 s. The frequency and voltage applied to the electrodes are 100 Hz and 1500 V, respectively. Two drop/ambient liquid systems are investigated. Top panels (a), (b) and (c): the water drop is immersed in a decane solution (the combined Clausius-Mossotti factor is $\beta\beta'=0.2731>0$). Recall from FIG. 32 that in this case particles are attracted to the poles of the drop. Bottom panels (d), (e) and (f): the silicone oil drop is immersed in corn oil (the combined Clausius-Mossotti factor is $\beta\beta'=-0.0036<0$). Recall that in this case particles are attracted to the equator of the drop.

Figure 34:
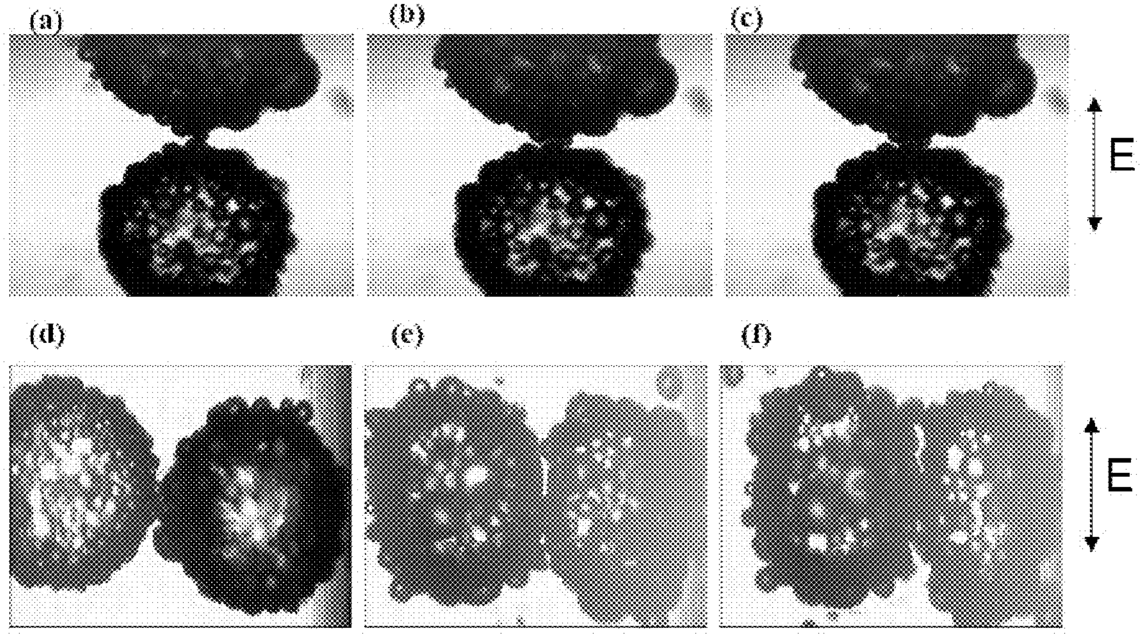

FIG. 34. Directional dependence of the coalescence between two drops covered with particles (extendospheres), showing that drops do not merge through regions the particles move to. The electric field is vertical and the voltage is increased from left to right: (a), (d) 0 V; (b), (e) 2000V; (c), (f) 2500V. The frequency of the AC electric field applied is 100 Hz. Two drop/ambient liquid systems are investigated. Top panels (a), (b) and (c): The water drop is immersed in a decane solution (the combined Clausius-Mossotti factor is $\beta\beta'=0.2731>0$), in which case the particles are attracted to the poles of the drop (see FIG. 32). Bottom panels (d), (e) and (f): The silicone oil drop is immersed in corn oil (the combined Clausius-Mossotti factor is $\beta\beta'=-0.0036<0$), in which case the particles are attracted to the equator of the drop (see FIG. 32).

Figure 35:
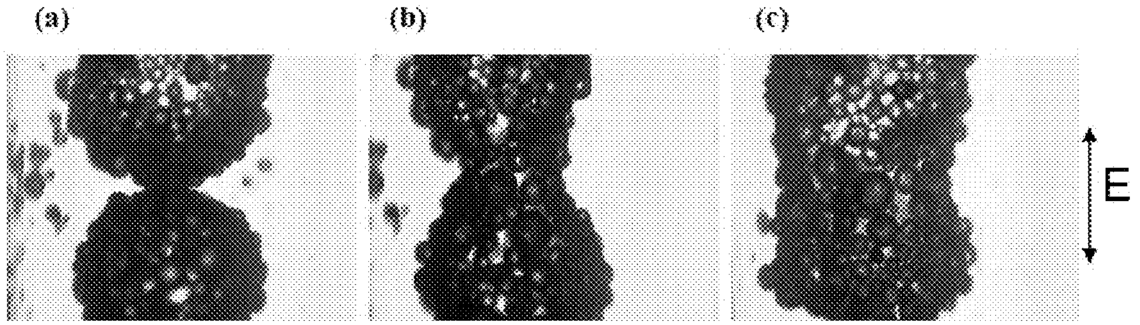

FIG. 35. Directional dependency of the coalescence between two drops covered with particles (extendospheres), showing that drops merge through the regions particles move away from. The electric field is vertical, its frequency is 100 Hz, and its corresponding voltages are (a) 0 V, (b) 1000V and (c) 1500V. The silicone oil drop is immersed in corn oil (the combined Clausius-Mossotti factor is $\beta\beta'=-0.0036<0$), in which case particles are attracted to the equator of the drops.

Figure 36:
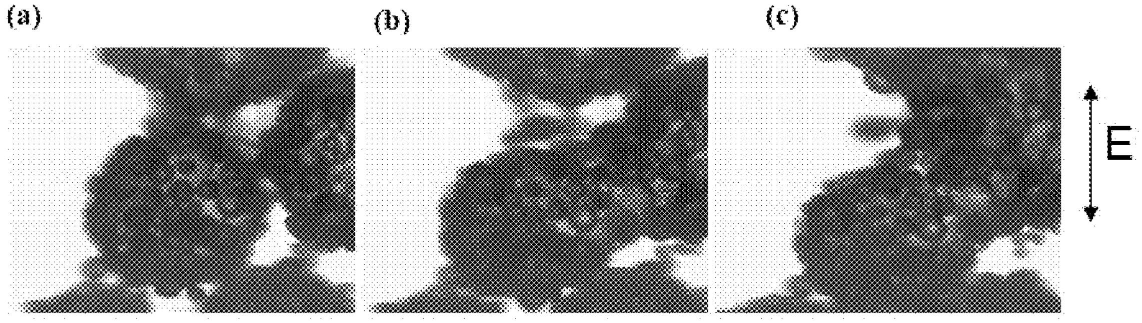

FIG. 36. Coalescence between three drops in a water-in-decane Pickering emulsion under the action of a uniform electric field. Recall that in this case, particles are attracted to the poles of the drops. The frequency of the AC electric field applied is 100 Hz, and the voltages are: (a) 0V, (b) 1000V, and (c) 2000V. The three drops eventually merge under a sufficiently strong electric field. Note that the two drops initially on top of each other do mot merge directly, only through the drop in the middle oriented at an angle with the bottom and top drops.

Figure 37:
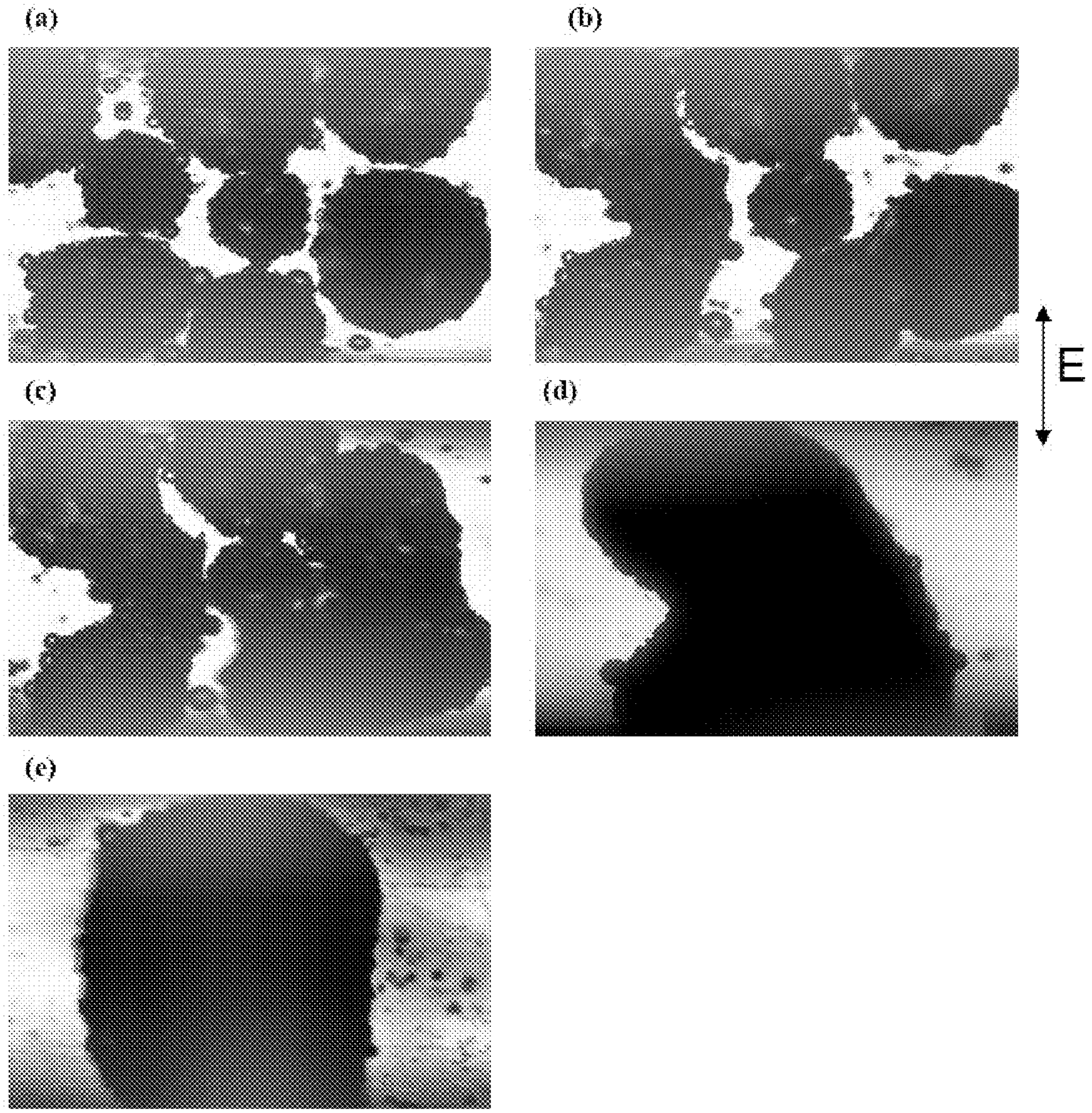

FIG. 37. Destabilization of a silicone oil-in-corn oil Pickering emulsion under the action of a uniform electric field showing the different steps in the drop merging process as the voltage is increased. Recall that in this case, particles are attracted to the equator of the drops. The frequency of the AC electric field applied is 1 kHz, and the voltages are: (a) 0V, (b) 1000V, (c) 2000V, (d) 3000V and (e) 3500V. The drops eventually merge under a sufficiently strong electric field.

DETAILED DESCRIPTION

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of these ranges is intended as a continuous range including every value between the minimum and maximum values. For definitions provided herein, those definitions also refer to word forms, cognates and grammatical variants of those words or phrases. As used herein, the terms "comprising," "comprise" or "comprised," and variations thereof, in reference to elements of an item, composition, apparatus, method, process, system, claim etc. are intended to be open-ended, meaning that the item, composition, apparatus, method, process, system, claim etc. includes those elements and other elements can be included and still fall within the scope/definition of the described item, composition, apparatus, method, process, system, claim etc. As used herein, "a" or "an" means one or more. As used herein "another" may mean at least a second or more.

The methods described herein involve applying an external uniform electric field to alter the distribution of particles on the surface of a drop or bubble immersed in another immiscible liquid or gas. Well-defined concentrated regions at the drop or bubble surface are generated, while the rest of the surface becomes particle free. When the dielectric constant of the drop or bubble is greater than that of the ambient liquid, the particles for which the Clausius-Mossotti factor is positive move along the drop or bubble surface to the two poles of the drop or bubble. Particles with a negative Clausius-Mossotti factor, on the other hand, move along the drop or bubble surface to form a ring near the drop or bubble equator. The opposite takes place when the dielectric constant of the drop or bubble is smaller than that of the particles. In this scenario, particles for which the Clausius-Mossotti factor is positive form a ring near the equator. Particles for which the Clausius-Mossotti factor is negative move to the poles. Of particular note, the methods described herein are equally pertinent to a number of phase combinations, including: a liquid dispersed phase within a liquid continuous phase; a gaseous dispersed phase within a liquid continuous phase; and a liquid phase dispersed in a gaseous continuous phase. The dispersed phase may comprise one or more different liquids or gases, including a three-phase system in which a drop is dispersed within another drop in a continuous phase. Therefore, the methods described herein are applicable, for example and without limitation, to emulsions, colloids, foams, and aerosols.

The dispersed phase may be created within the continuous phase by any useful method. In the case of an aerosol, there are innumerable spray or aerosolization methods and devices that are suitable for producing the aerosol. In the case of a liquid-in-liquid or gas-in-liquid, the dispersed phase may be produced by shaking, homogenizing, stirring, introduction as drops or bubbles through a tube or capillary, sonication, cavitation, etc. The amount or density of the dispersed phase within the continuous phase may vary greatly depending on the use of the methods described herein. For example, where the production of Janus particles is desired, the density of the dispersed phase within the continuous phase may be comparatively low, and the size distribution of the dispersed phase drops or bubbles may be more consistent as compared to the situation where the methods are used to coalesce drops.

Although the following description and examples describe liquid-in-liquid phase combinations (that is, drop in ambient fluid), the methods are expected to be equally applicable and effective in gas-in-liquid or liquid-in-gas combinations.

This motion of the particles is due to the dielectrophoretic force that acts upon particles due to the electric field on the surface of the drop being non-uniform, despite the uniformity of the applied electric field. These phenomena are useful for concentrating particles at a drop surface within well-defined regions (poles and equator), separating two types of particles at the surface of a drop, or increasing the drop deformation to accelerate drop breakup.

Electric Field Distribution for a Dielectric Drop Placed in a Dielectric Liquid

A drop suspended in a surrounding fluid with small solid particles floating at its surface is subjected to an externally applied uniform electric field. This is generated by placing the drop and its surrounding fluid in a suitable container or vessel with electrodes in any configuration, such as coinciding with the upper and lower walls or with the side walls. Although the applied electric field away from the drop is uniform, the presence of the drop makes the electric field in the neighborhood of the drop non-uniform and, as a result, the particles on its surface are subjected to a non-uniform electric field and thus to the phenomenon of dielectrophoresis (DEP). This non-uniformity, and the resulting DEP force acts on particles located either on the drop's surface or near the drop. The electric stress exerted on the drop or bubble due to the electric field is obtained in terms of the Maxwell stress tensor computed directly from the electric potential (Cho, S. K., Zhao, Y., Kim, C. J., Lab Chip 2007, 7, 490-498; Aubry, N., Singh, P., *Eur. Phys. Lett.* 2006, 74, 623-629; Wohlhuter, F. K., Basaran, O. A., *J. Fluid Mech.* 1992, 235, 481-510; Basaran, O. A., Scriven, L. E., *J. Colloid Interface Sci.* 1990, 140, 10-30; and Baygents, J. C., Rivette, N. J., Stone, H. A., *J. Fluid Mech.* 1998, 368, 359-375).

Electric Field Distribution

The modified electric field distribution is such that the magnitude of the electric field is larger near the equator and smaller near the poles of the drop or bubble, compared to the magnitude of the imposed uniform electric field. The strength of the electric field inside the drop or bubble is greater than the applied field strength. This modification makes the electric field strength and the electric stress distribution on the drop surface non-uniform.

Figure 2A:
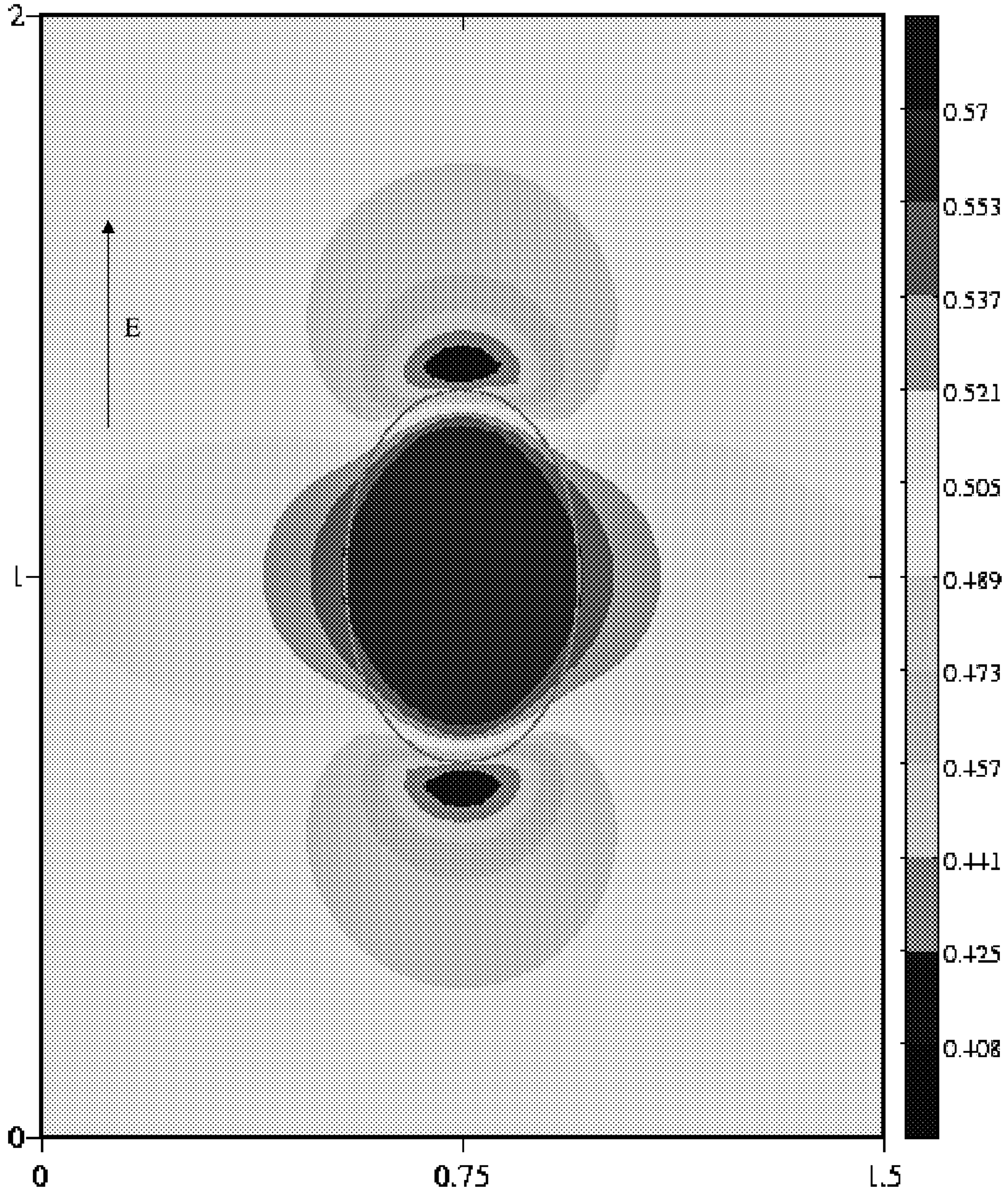
In FIG. 2A, the dielectric constant of the drop is less than that of the ambient liquid. In this case, the electric field is no longer uniform; it is locally maximum at the equator and locally minimum at the poles.
Figure 2B:
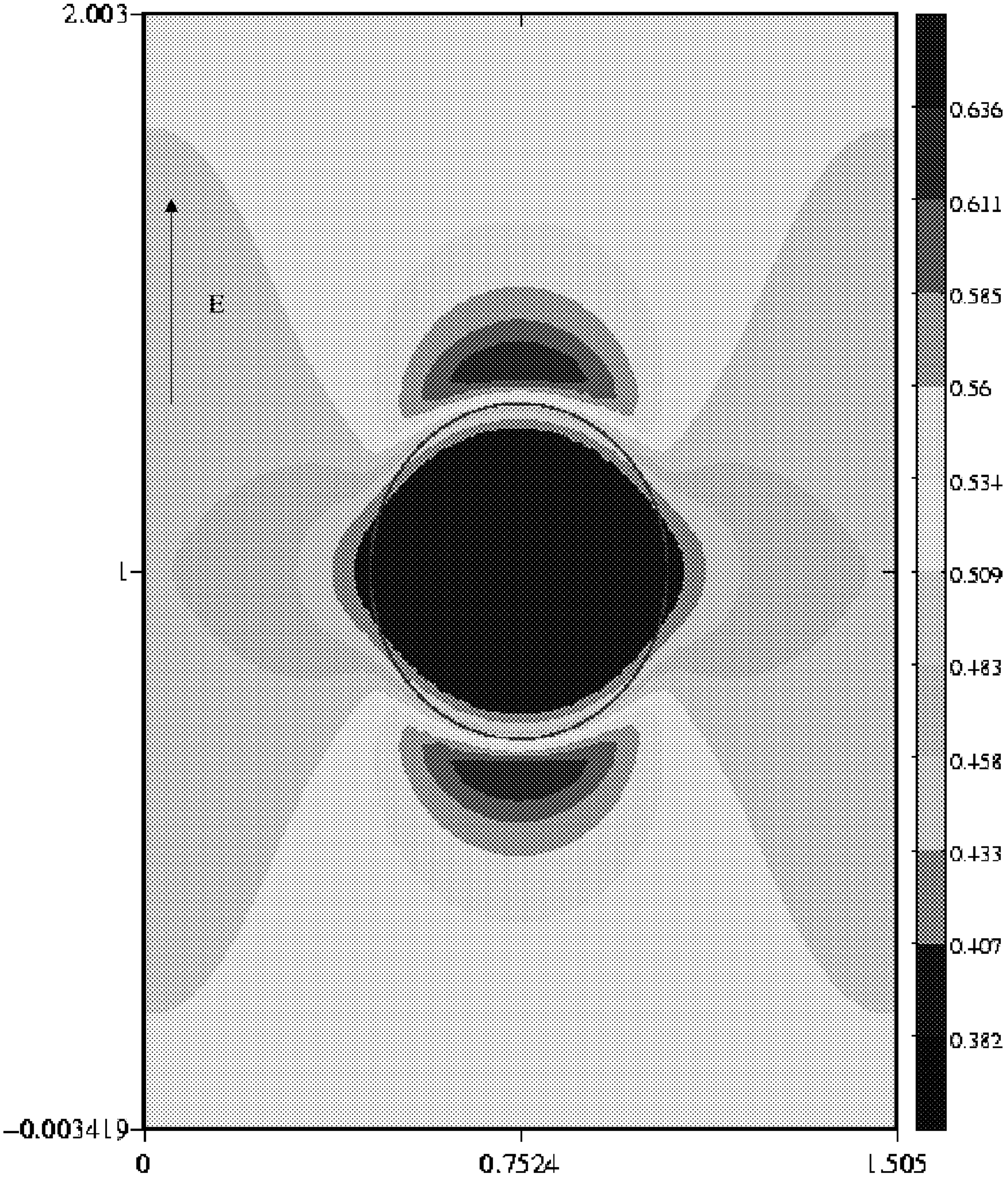
In FIG. 2B, the dielectric constant of the drop is greater than that of the ambient liquid. In this case, the electric field is locally maximum at the poles and locally minimum at the equator.

The modified electric field distribution for the case where the dielectric constant of the drop is greater than that of the ambient fluid is shown in FIG. 2A. The opposite case is shown in FIG. 2B. We note that the strength of the electric field inside the drop is weaker than that of the applied field, and the electric field strength at the poles is greater than near the equator. The electric field strength inside the drop in both cases is constant. This is important because this implies that a particle placed inside the drop is not expected to experience a DEP force, at least within the point-dipole approximation.

Drop Deformation

FIG. 2A implies that everywhere on the drop surface the normal component of the Maxwell stress tensor is compressive, i.e., it points into the drop, but its magnitude is larger near the equator than it is near the poles. Consequently, after the electric field is switched on, the electric stresses cause the drop to elongate in the direction of the electric field. However, as the drop deforms, the magnitude of the surface tension force, which counters the deviation from the spherical shape, increases. The drop stops deforming when the surface tension force is balanced by the electric force.

In FIG. 2B, on the other hand, everywhere on the drop surface the normal component of the Maxwell stress tensor is extensional, i.e., points away from the drop. The drop becomes elongated in the direction of the electric field because the extensional stress is larger near the poles than it is near the equator. The critical electric field strength below which the drop deformation remains small can be estimated from the result obtained by Allen and Mason (*Proc. R. Soc. Lond. A Math. Phys. Sci.* 1962, 267, 45-61) for the case of a drop placed in a uniform electric field. The deformed shape in their analysis is determined by the balance of the surface tension force, which tends to make the drop spherical, and the force due to the electric stress, which tends to elongate the drop. The electric stress distribution on the surface of the drop is deduced by assuming that the drop remains spherical. Allen and Mason obtained the following expression for the drop deformation:

$$D = \frac{9a\varepsilon_0\varepsilon_c E_0^2\beta^2}{16\gamma} = \frac{9}{16}We \quad (1)$$

where $$We = \frac{a'\varepsilon_0\varepsilon_c E_0^2\beta^2}{\gamma},$$

is the electric Weber number, a the drop radius, γ the interfacial tension between the two fluids, $\in_0$ the dielectric constant of the fluid, $\in_0=8.8542\times10^{-12}$ F/m the permittivity of free space, and $E_0$ the RMS value of the electric field. Expression (1) is also valid for a DC electric field where $E_0$ is simply the electric field intensity. The coefficient β(ω) is the real part of the frequency dependent Clausius-Mossotti factor given by:

$$\beta(\omega) = \mathrm{Re}\left(\frac{\varepsilon_d^* - \varepsilon_c^*}{\varepsilon_d^* + 2\varepsilon_c^*}\right) \quad (2)$$

where $\in^*_d$ and $\in^*_c$ are the frequency dependent complex permittivity of the drop and the ambient fluid, respectively. The complex permittivity is $$\varepsilon^{\rightarrow} = \varepsilon - \frac{j\sigma}{\omega},$$

where ∈ is the permittivity, σ the conductivity and $j=\sqrt{-1}$.

Equation (1) implies that the deformation increases as the square of the electric field and the square of the Clausius-Mossotti factor. Moreover, it varies inversely with the surface tension coefficient and is proportional to the electric Weber number. The deformation is defined as the parameter:

$$D = \frac{L-B}{L+B} \quad (3)$$

where L and B are respectively the major and minor axes of the drop, assuming that the shape of the latter is approximately ellipsoidal. The deformation parameter D varies between 0 and 1; for a spherical drop, D is zero and its value increases with increasing deformation from a sphere.

Another important effect not accounted for in the above analysis is that the presence of the drop modifies the electric field distribution around it. This, in turn, affects the electric stress distribution on the drop surface, and thus its deformation. These effects are particularly important in the manipulations of drops in microdevices where the drop size can be of the same order as the device size (Kadaksham, J., Singh, P., Aubry, N., *Mech. Res. Comm.* 2006, 33, 108-122).

A drop placed in a uniform electric field experiences a deforming electric stress and a surface tension force which counters this deformation. The drop attains a steady shape when these two forces balance each other. Furthermore, since the electric field strength on the drop surface is not constant, as discussed below, a particle on the surface of a drop is subjected to a DEP force that causes it to move to either the equator or one of the poles.

DEP Forces on Particles

It is well known that when a particle is subjected to a non-uniform electric field, and its dielectric constant is different from that of the ambient fluid, the electric stress acting on its surface results in a net force, referred to as the DEP force, which causes the particle to translate. If a particle is sufficiently small compared to the length scale over which the non-uniform electric field varies, the point dipole (PD) approach can be used to estimate the DEP force. According to the PD model, which assumes that the gradient of the electric field is constant, the time averaged DEP force acting on a spherical particle in an AC electric field is given by (Kadaksham, J., Singh, P., Aubry, N., *Mech. Res. Comm.* 2006, 33, 108-122; Pohl, H. A., Dielectrophoresis, Cambridge University Press, Cambridge 1978; Klingenberg, D. J., van Swol, S., Zukoski, C. F., *J. Chem. Phys.* 1989, 91, 7888-7895; and Kadaksham, J., Singh, P., Aubry, N., *J. Fluids Eng.* 2004, 126, 170-179):

$$F_{DEP}=2\pi a^3\epsilon_0\epsilon_c\beta\nabla E^2 \quad (4)$$

Where a is the particle radius and E is the RMS value of the electric field or simply the electric field intensity in a DC field. The coefficient $\beta(\omega)$ is the real part of the frequency dependent Clausius-Mossotti factor given by equation (2).

Equation (4) assumes that the dielectric constant of the ambient fluid around the particle is constant. For a particle situated at a two-fluid interface, however, this is clearly not the case since the dielectric constants of the two fluids involved are different and therefore the DEP force acting upon a particle will differ from (4). Particularly, the effective Clausius-Mossotti factor for a particle at the drop's surface is expected to depend on the dielectric constants of the particle and the two fluids involved, and also on the position of the particle within the interface. The position of a particle on the drop's surface, i.e., the position of the contact line on the particle's surface which determines the fraction of particle in the two fluids, depends on the contact angle and the buoyant weight of the particle. In the presence of an electric field, it also depends on the electric force since the latter can change the particle's position within the interface.

From FIG. 2, we know that for a drop placed in an ambient fluid and subjected to a uniform electric field, the electric field distribution on the drop's surface is non-uniform. FIG. 2 shows the expected direction of the DEP force that acts on a particle located on the drop's surface for which the particle's effective Clausius-Mossotti factor is positive, and the locations at which the particles are eventually collected. Due to the fact that the electric field is uniform within the drop, in a first order approximation, the dielectric constant of the ambient fluid plays a more important role than that of the drop in determining the direction of the DEP force. Namely, if the dielectric constant of the drop is greater than that of the ambient fluid, particles on the drop surface collect at the two poles. On the other hand, if the dielectric constant of the drop is smaller than that of the ambient liquid, particles collect in a ring shaped region near the equator. (However, when the particles' buoyant weight is not negligible and electrodes are mounted on the side walls, particles remain either near the top of the drop or sediment to the bottom of the drop while remaining near the equator.) Furthermore, the opposite is true (within the same order of approximation) if the particles' Clausius-Mossotti factor is negative. That is, particles are expected to collect at the equator if the dielectric constant of the drop is greater than that of the ambient fluid, and at the poles if the dielectric constant of the drop is smaller than that of the ambient fluid.

This phenomenon can thus be used to separate two types of particles but where they aggregate (at the poles or at the equator) depends on the dielectric constants of the drop, the ambient fluid and the particles. Furthermore, in an electric field, particles on the interface interact with each other via the electrostatic particle—particle forces. The PD limit, an expression for the interaction force between two dielectric spherical particles suspended in a dielectric liquid and subjected to a uniform electric field has already been given (Pohl, H. A., Dielectrophoresis, Cambridge University Press, Cambridge 1978 and Klingenberg, D. J., van Swol, S., Zukoski, C. F., *J. Chem. Phys.* 1989, 91, 7888-7895). Using this expression, it is easy to show that the electrostatic interaction force between two particles is attractive and also that it causes the particles to orient such that the line joining their centers is parallel to the electric field direction (except in the degenerate case when the line joining their centers is perpendicular to the electric field, in which case they repel). Similar interactions take place between particles in a non-uniform electric field (Kadaksham, J., Singh, P., Aubry, N., *Mech. Res. Comm.* 2006, 33, 108-122; Kadaksham, J., Singh, P., Aubry, N., *J. Fluids Eng.* 2004, 126, 170-179; and Kadaksham, J., Singh, P., Aubry, N., *Electrophoresis* 2004, 25, 3625-3632). Direct numerical simulations (DNS) conducted using this expression for the interaction force show that two particles subjected to a non-uniform electric field attract each other and orient such that the line joining their centers is parallel to the local electric field direction while they move together toward the location where the electric field strength is locally maximal or minimal, depending on the value of their dielectric constant relative to that of the two fluids (Kadaksham, J., Singh, P., Aubry, N., *Electrophoresis* 2005, 26, 3738-3744; Aubry, N., Singh, P., *Electrophoresis* 2006, 27, 703-715; and Nudurupati, S. C., Aubry, N., Singh, P., *J. Phys. D: Appl. Phys.* 2006, 39, 3425-3439). The extent of this attraction, which, if it is strong, manifests itself in particle chaining, depends on a dimensionless parameter which can also be found in the above references.

Concentration and Removal of Particles at the Poles

As for the case described in FIG. 2, when the dielectric constant of the drop is larger than that of the ambient fluid, particles experienced positive dielectrophoresis. Therefore, after the electric field is applied, particles moved towards the poles. This figure also shows that the drop deformation increases with increasing electric field strength. As the electric field strength is increased, the drop's radius of curvature at the poles decreases. The decrease in the radius of curvature at the poles ultimately leads to the formation of Taylor cones at the two drop ends when a sufficient voltage is applied (see FIG. 3). The drop would then subsequently lose all the particles aggregated near its poles by means of a tip streaming mechanism, through which the particles, together with some of the liquid surrounding it, get ejected. This method, therefore, offers a systematic way for removing particles from the surface of a drop in a contactless fashion. All particles ejected from the drop rise individually to the top surface if they are lighter than the ambient liquid, or settle to the bottom if they are heavier. After the particles are ejected, small droplets are present which are formed because the drop loses not only the particles but also some liquid.

Applying right away a voltage sufficiently large to cause tip streaming would not provide an effective method to remove particles from a drop. This is because the particles would not have sufficient time to move to the poles. The voltage must be applied gradually.

Concentration and Removal of Particles Near the Equator

Figure 4:
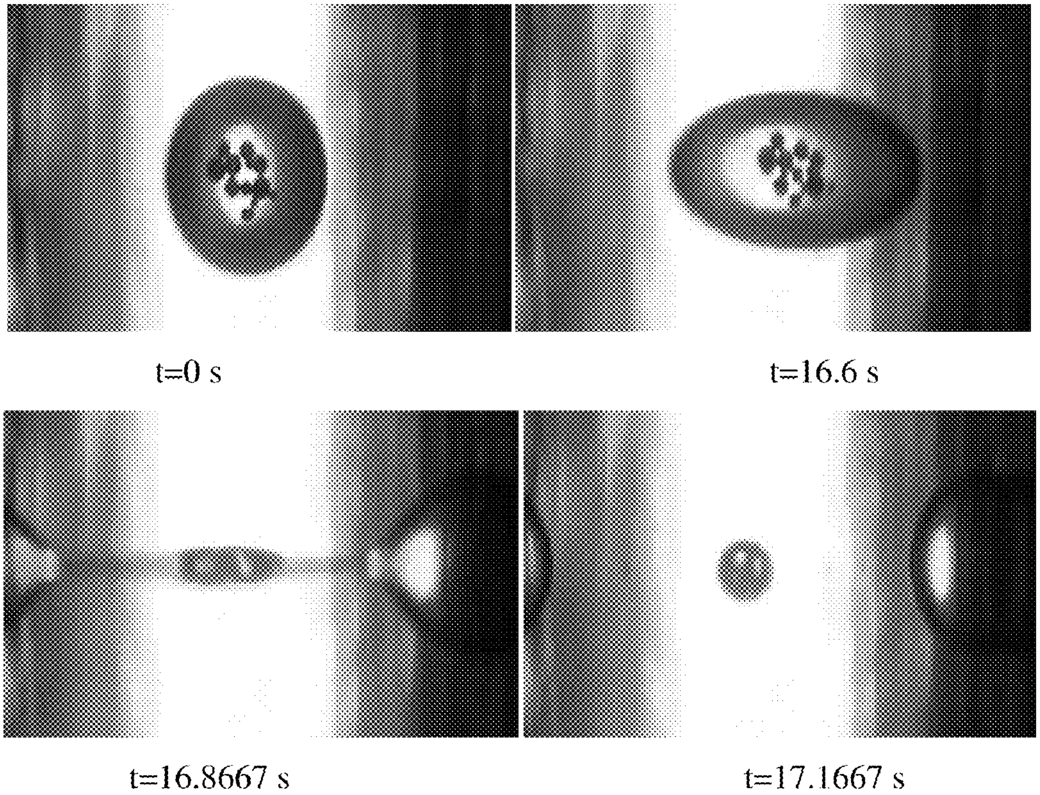
FIG. 4. Removal of extendo spheres from a water drop immersed in corn oil. The distance between the electrodes is 2.65 mm and the voltage applied is 2 kV at 1 kHz. The drop with an initial diameter of 844.2 μm is shown at t=0, 16.6, 16.8667 and 17.1667 s (a-d). Particles remain at the equator while the drop stretches (b) and breaks into two clean drops (c-d), leaving particles in a small detached droplet (of high particle concentration) in the middle (d).

In order to remove particles concentrated at the equator, a device whose electrodes are separated by a shorter distance is applied at a sufficiently high voltage so that the drop stretches and breaks into two or more droplets (as seen in FIG. 4). Since the particles are located approximately in the middle of the drop, after the drop breaks, they are contained in a small droplet in between two larger droplets. When a voltage is applied, the drop elongates and particles begin to collect near the equator at the bottom of the drop. When the voltage is increased, the drop deformation becomes even larger and particles collect in a ring shaped region near the equator. The drop continues to stretch until it adopts a dumbbell shape with an elongated filament in the middle which eventually breaks. Eventually the drop will break into three major drops, a central small droplet containing all the particles and two larger clean drops on the sides. This middle drop, concentrated with the particles and a minimal amount of fluid can be easily removed.

Separation of Two Types of Particles

In a case where a drop contains two types of particles with different dielectric properties, particles can be separated at the surface of the drop and then removed from the drop, while the other type of particles are left on the drop surface. This approach can be used for particles trapped on the drop surface for which the sign of the Clausius-Mossotti factor is different. First, a voltage is applied to a drop with a mixed distribution of two particles. When the voltage is increased, the drop deformation increased. The particles which undergo negative dielectrophoresis remain at the center of the drop, while the particles which undergo positive dielectrophoresis begin to move towards the poles. When a high enough voltage is reached, the drop elongates further and the particles accumulated at the poles are ejected from the drop. When the electric field is turned off, the remaining drop only contains the particles aggregated near the equator (particles which underwent negative dielectrophoresis). This separation, however, requires that the different particles on the surface of the drop do not physically block each other.

The advantage of the methods described herein is that they provide a simple, affordable means to change the surface properties of drops or bubbles and to clean the surface of drops or bubbles by removing particles trapped within their interface. The methods are generally applicable in the fields of material engineering and material processing, biotechnology, microfluidics, and nanotechnology. Specifically, the methods are suitable for isolating minute particles such as biological cells, cell organelles, bio-molecules as well as organic dielectric particles. The isolation of particles is required, for instance, in medicine, food engineering, biology, chemistry, and for pharmaceutical purposes. The concentration and separation of particles through the methods of the present invention may also be useful for detection of biological particles. The present invention may also be used to create ultra-pure droplets for chemistry or particle synthesis.

Thus provided is a method for moving particles on the surface of a drop. The method comprises applying an electric field, such as a uniform or non-uniform electric field, distributed phase, such as a drop comprising particles on its surface that is immersed or otherwise distributed in a continuous phase, such as in an ambient liquid, so that the particles move along the surface of the drop under the action of a dielectrophoretic force. A "uniform" electric field is a field that does not vary from place to place, such that field lines and equipotentials are parallel and evenly spaced. Such a field can be produced by two parallel charged plate electrodes. A particle said to be on the surface of a drop can be on or immediately adjacent to an inner or outer surface of the interface between the two inmiscible liquids, or can span the interface. Although in any method described herein, a non-uniform electric field may be used as well as a uniform electric field, the methods described herein surprisingly can be implemented in a uniform electric field, which may be preferable in many instances.

The described system is applicable to virtually any combination of inmiscible gases, liquids and particles, so long as the gases, liquids and particles have different dielectric constants, which is the vast predominance of combinations. Oil-in-water and water-in-oil compositions are examples of useful combinations of ambient liquid (continuous phase) and drops (dispersed phase). The particles may be simple, comprising a single composition, such as a glass, polymer, carbon black or zinc oxide particles. More complex particles, comprising two or more ingredients, such as drug-containing compositions, cells, receptors or functionalized beads, such as antibody-coated beads, also are contemplated for use in the systems described herein.

In one embodiment, the dielectric constant for the drop or bubble is greater than that of the ambient liquid or gas and the particles have a positive Clausius-Mossotti factor, such that the particles are moved (move or migrate) to the poles of the drop or bubble. Where the dielectric constant for the drop or bubble is greater than that of the ambient liquid or gas and the particles have a negative Clausius-Mossotti factor, the particles are moved to the equator of the drop or bubble Likewise, where the dielectric constant for the drop or bubble is greater than that of the ambient liquid or gas and the drop or bubble comprises both particles having a negative Clausius-Mossotti factor and particles having a positive Clausius-Mossotti factor, application of the electric field will result in the particles having a negative Clausius-Mossotti factor moving to the equator of the drop or bubble and the particles having a positive Clausius-Mossotti factor moving to the poles of the drop or bubble.

In another embodiment, the dielectric constant for the drop or bubble is less than that of the ambient liquid or gas and the particles that have a positive Clausius-Mossotti factor are moved to the equator of the drop or bubble. Where the dielectric constant for the drop or bubble is less than that of the ambient liquid or gas and the particles have a negative Clausius-Mossotti factor the particles are moved to the poles of the drop or bubble. Likewise, when the dielectric constant for the drop or bubble is less than that of the ambient or gas liquid and the drop or bubble comprises both particles having a negative Clausius-Mossotti factor and particles having a positive Clausius-Mossotti factor, the particles having a negative Clausius-Mossotti factor move to the poles of the drop or bubble and the particles having a positive Clausius-Mossotti factor move to the equator of the drop or bubble.

In a typical embodiment, it is desirable that the electrical field moves the particles about the surface of the drop or bubble before the drop or bubble breaks apart. Each combination of drops or bubbles and ambient liquid or gas will create different stabilities of the drop or bubbles due to the effects of surface tension and gravity parameter (among others, as described in detail below). In one embodiment, We'/G>1, in which We' is the scaled electric Weber number for a drop in the ambient liquid and G is the electric gravity parameter for a drop in the ambient liquid.

Multi-phase liquid and gas mixtures comprising drops or bubbles can be formed by a variety of methods, including stirring, shaking, expulsion through a tube or capillary, cavitation, sonication, etc. As an example, the drops and ambient liquid can be an emulsion, such as a particle-stabilized emulsion, also known as a Pickering emulsion.

The methods described above can be used to produce patterned drops, such as Janus particles, having particles on their surface at their equator or poles, or different surface constituents on the equator and poles. The method comprises creating a pattern on the drop of one or more particles and subsequently solidifying the drop while the electric field is applied. The drops may be solidified in virtually any manner. In one embodiment, the electric field is applied at a temperature that the drop is liquid, and the drop is then solidified while the electric field is applied by changing the temperature of the drop. For example, the electric field is applied at a temperature above the melting point of the drop and the drop is solidified by cooling to a temperature below which the drop is solidified. In another example, the drop comprises a composition that has one or both of a lower critical solution temperature (LCST) and an upper critical solution temperature (UCST) and the electric field is applied at a temperature at which the drop is a liquid or gel and then solidified while the electric field is applied by changing the temperature of the drop to a temperature at which the drop solidifies. In one example of that embodiment, the composition is a (co)polymer that can be a homopolymer or a copolymer, including block copolymers. The (co)polymer can be made by any useful method, including: Step-growth or chain-growth polymerization, free radical polymerization; living radical polymerization, such as atom transfer radical polymerization; ring-opening polymerization, group transfer polymerization, etc. Exemplary (co)polymers include: poly(N-isopropylacrylamide); polyethylene oxide (PEO); polypropylene oxide (PPO); ethyl(hydroxyethyl)cellulose; poly(N-vinylcaprolactam); poly(methylvinyl ether) and copolymers thereof, including copolymers of these listed polymers and/or with other polymers. A large number of (co)polymers having LCST and UCST properties are available and known in the art. In yet another embodiment, the drop comprises a polymer or compounds that are cross-linked while the electric field is applied. The polymer or compounds can be virtually any cross-linkable compound or composition that can be cross-linked in any fashion, including use of UV, microwave, chemical, etc. methods. In another example, the drop is sprayed or aerosolized in the presence of an electric field to orient the particles on the drop as the drop dries while passing through the gaseous phase.

In a further embodiment, when the continuous phase is a liquid, the continuous phase, rather than the dispersed phase can be solidified to produce a patterned structure, such as a cell-growth scaffold with pores comprising oriented particles on their surface, which may be useful in producing oriented cellular or tissue structures.

The particles useful in the described methods may be any particle that does not dissolve in the drop or ambient liquid. Examples of useful particles include one or more of: titanium dioxide, iron oxide, zinc oxide, carbon black, a metal or metallic compound; a magnetic or paramagnetic compound, a polymer, an antibody or a fragment thereof, a drug compound or composition, a nuclear imaging compound or composition (e.g., particles of compounds useful in nuclear imaging, such as CT, MRI or PET imaging), barium sulfate, talcum, silicate, barite, silicon dioxide particles, glass, carbon, glass, carbon, textile, or polymer fibers, cells, viruses, biological materials, proteins, enzymes, antibodies, receptors, and ligands.

In one example, the particles are contaminants of either the ambient liquid or drops. Typically particles present in a two phase system of inmiscible liquids or a gas in liquid, such as a foam, become trapped in the interface between the two phases. As such, the methods described herein can be useful in removing particulates from a liquid. In one embodiment, the above described methods for moving particles on the surface of a dispersed phase may further comprise after causing the particles to move on the surface of the drop or bubble, increasing the voltage of the electric field to the drop until the particles on the surface of the drop or bubble move towards the poles or equator of the drop or bubble so that the drop or bubble breaks into one or more drops or bubble comprising the particles and one or more drops or bubble that are substantially free of the particles. In one embodiment, the particles on the surface of the drop or bubble move to the poles of the drop or bubble and are ejected by tip streaming. In another embodiment, the particles on the surface of the drop or bubble move to the equator of the drop or bubble and the drop or bubble breaks into three or more major drops in which one or more drops, such as the center smaller drop, contains the particles and other major drops are substantially free of the particles. Thus, in one embodiment, a uniform electric field is applied to the drop comprising the particles so that the particles move towards the equator of the drop and then further increasing the electric field to break the drop into three major drops in which the center smaller drop contains the particles. In another embodiment, in which the drop comprises particles having a positive Clausius-Mossotti factor and particles having a negative Clausius-Mossotti factor, the particles that move towards the poles are ejected by tip streaming, leaving a drop comprising particles that move towards the equator. The breaking up of a particle can be achieved by increasing the uniform electric field.

To achieve separation of the particles from the drop or bubble and effective “cleaning”, whether the particles are removed from the poles or equator, the particle-containing smaller droplets or bubbles are removed by any effective means. For example, the particles may be more or less dense than the drops or bubbles, so they can “settle out” or be centrifuged. In another example, the particle-free constituents coalesce into a single layer and the particles remain in the continuous phase, so that the liquid or bubble that formed the droplets can be “purified”. The particle-containing smaller droplets or bubbles also may be separated by dielectrophoresis in a non-uniform electrical field in order to purify the entire emulsion.

Also provided is method for destabilizing a particle-stabilized emulsion (e.g., a Pickering emulsion) or a particle-stabilized foam. The method comprises applying a uniform electric field to the emulsion or foam making the distribution of particles on droplet’s surfaces non-uniform and making a portion of the surface of the droplets or the full droplets free of particles so that the droplets coalesce. The method can be a recycling method, for instance in a manufacturing method in which a waste product is an emulsion or foam, the constituents of the emulsion or foam can be separated as described herein. Likewise out-dated (past the expiration date) emulsions or foams can also be separated and recycled as described.

In another embodiment, the method of destabilizing a particle-stabilized emulsion (e.g., a Pickering emulsion) or a particle-stabilized foam can be used to mix two different compositions, for instance to initiate a chemical or enzymatic reaction. In this method and emulsion is formed comprising a first particle-stabilized drop and a second particle-stabilized drop having a different composition than the first drop. It may be preferred that the first and second drops are of different sizes. The two types of drops are then coalesced by application of a suitable electric field. A reaction can be initiated where the first drop and second drop comprise reagents for a chemical or enzymatic reaction such that only when the first and second drops coalesce, the reaction proceeds. It should be understood that within this limitation an insubstantial reaction may occur prior to coalescence, but the predominance of the reaction occurs after coalescence. In one embodiment, the first drop comprises an enzyme and the second drop comprises a substrate for the enzyme.

The methods described herein are useful in a large variety of technologies, and on many scales. In its simplest form, the methods described herein are implemented in a container, box, vial, tube, cuvette, lab-on-a-chip, etc. of any suitable configuration and on any scale so long as a suitable electric field can be obtained. Implementation in a system of tubes, electrodes, etc. Microfluidic systems can be designed with electrode configurations to implement the methods described herein. Such "Lab-On-a-Chip" or LOC devices are described in detail elsewhere, but implement micro- and nano-scale architecture (e.g. MEMS (microelectromechanical) or NEMS (nanoelectromechanical) devices, systems, etc.) to produce reaction chambers, vessels, valves, etc. See, for example, and among a large number of other patent disclosures, U.S. Pat. Nos. 7,648,835, 7,658,829 (describing dielectrophoretic actuators), U.S. Pat. Nos. 7,658,536; 7,655,470; 7,607,641; 7,601,286; 7,534,331 and 7,258,774, each of which is incorporated herein by reference in its entirety solely for its technical disclosure.

In the event of conflict between this document and any document incorporated by reference, this document shall control.

Example 1

Concentrating Particles on Drop Surfaces Using External Electric Fields

In this example, we use an externally applied uniform electric field to alter the distribution of particles on the surface of a drop immersed in another immiscible liquid. Our goal is to generate well-defined concentrated regions at the drop surface while leaving the rest of the surface particle free. Experiments show that when the dielectric constant of the drop is greater than that of the ambient liquid the particles for which the Clausius-Mossotti factor is positive move along the drop surface to the two poles of the drop. Particles with a negative Clausius-Mossotti factor, on the other hand, move along the drop surface to form a ring near the drop equator. The opposite takes place when the dielectric constant of the drop is smaller than that of the ambient liquid, namely particles for which the Clausius-Mossotti factor is positive form a ring near the equator while those for which such a factor is negative move to the poles. This motion is due to the dielectrophoretic force that acts upon particles because the electric field on the surface of the drop is non-uniform, despite the fact that the applied electric field is uniform. These phenomena could be useful to concentrate particles at a drop surface within well-defined regions (poles and equator), separate two types of particles at the surface of a drop or increase the drop deformation to accelerate drop breakup.

An appealing approach to the issue of controlling fluids in micro devices is the use of droplets which can transport various types of fluids and particles, and has been referred to as "digital microfluidics." An advantage of this technique compared to those using fluid streams lies in its potential for programmable micro-chips with bio-chemical reactions occurring within single droplets (Song, H., Tice, J. D. and Ismagilov, R. F. Angew. Chem. Int. Ed. 42, 768, 2003). Current challenges for increasing the efficiency of such biochemical processes include the controlled production (Ozen, O., Aubry, N., Papageorgiou, D. and Petropoulos, P. *Phys. Rev. Lett.* 96, 144501, 2006 and Li, F., Ozen, O., Aubry, N., Papageorgiou, D. and Petropoulos, P., *J. Fluid Mech.* 583, 347-377, 2007), transport, splitting and coalescence of droplets at a certain location and at a given time within the same device (Singh, P and Aubry, N. *Electrophoresis* 28, 644-657 (2007)), mixing, concentrating and separating particles carried by the droplets, and fluid/particles separation.

The goal of this example is to study the influence of an externally uniform electric field on the distribution of particles on the surface of a drop as a concentration and separation tool for digital microfluidic applications. The drop is immersed in another liquid and the two liquids involved are assumed to be immiscible. In the absence of the electric field, small particles, i.e., submicron sized particles for which the buoyant weight is negligible, distribute randomly on the drop's surface. Such a presence of small particles is known to stabilize emulsions (Binks, B. P. Particles as surfactants—similarities and differences. Current opinion in *Colloid and Interface Science* 7, 21-41 (2002)).

Furthermore, small particles are readily trapped in liquid-gas and liquid-liquid surfaces, even when they are denser or lighter than the liquid(s). Such particles are always surface active by virtue of the effects of capillarity and sometimes this activity mimics amphiphilic properties of surfactants. This is known since the pioneering works of Ramsden (*Proc. Roy. Soc.* London 72, 156 (1903)), who observed that emulsions were stabilized by solid matter at the interface between liquids, and by Pickering (*J. Chem. Soc.*, London, 91(2), 2001 (1907)) who noted that colloidal particles that were wetted more by water than by oil could act as an emulsifying agent for oil-in-water emulsions. More recent work in this area is described in Menon and Wasan (*Colloids Surf* 19, 89-105 (1986)) and Yan and Masliyah (*J. Colloid and Interface Science,* 168, 386-392 (1994)). It is generally accepted that hydrophilic solids stabilize oil-in-water emulsions, while hydrophobic solids stabilize water-in-oil emulsions. The most effective stabilization occurs when particles saturate the surface. Effective covering is promoted by self assembly due to capillarity which cannot occur without the deformation of the interface.

Our approach is to make use of externally applied electric fields to manipulate the distribution of particles on the surface of a drop. Electric fields are particularly powerful in small devices due to the fact that small potentials can generate relatively large field amplitudes that can be used to transport and even breakup droplets. In this regard, we recall that O'Konski and Thacker (*J. Phys. Chem.* 57, 955-958 (1953)) and Garton and Krasnucki (*Proc. Roy. Soc. A.* 280, 211-226, 1964) noted that a dielectric drop placed in a dielectric liquid and subjected to a uniform electric field deforms. These observations were later confirmed by Taylor (*Proc. Roy. Soc. London. Series A*, Mathematical and Physical Sciences, 1425, 159-1966, 1966) who considered the case where the drop or ambient liquid, or both, are conducting, and introduced a leaky dielectric model. The deformation and breakup of a dielectric drop in a dielectric liquid was analyzed analytically in Allen, R. S. and Mason, S. G. (*Proc. Royal Soc. London, Series A, Mathematical and Physical Sciences,* 267, 45-61, 1962) and Torza, S., et al. (*Phil. Trans. Royal Soc. of London. Series A, Mathematical and Physical Sciences* 269, 295-319, 1971). It was shown in Taylor, G. (*Proc. Roy. Soc. London. Series A*, Mathematical and Physical Sciences, 1425, 159-1966, 1966) and Melcher, J. R. and Taylor, G. I. (*Annu. Rev. Fluid Mech.* 1, 111-146 (1969)) that for the leaky dielectric model the shear stress on the surface of the drop is non-zero, and the fluid inside the drop circulates in response to such shear stresses (also see, Sherwood, J. D. *J. Fluid Mech.* 188, 133-146 (1988); Saville, D. A. *Annu. Rev. Fluid Mech.* 29, 27-64 (1997); and Darhuber, A. A. and Troian, S. M. *Annu. Rev. Fluid Mech.* 37, 425-455 (2005)).

Here we present experimental results that show that the particles distributed on the surface of a drop subjected to a uniform electric field can be concentrated in certain regions, i.e., either near the poles or at the equator of the drop. Here the poles are defined as the two points on the drop surface where the applied uniform electric field is perpendicular to the drop surface and the equator is the curve at equidistance between the two poles and along which the electric field is tangential to the drop surface. The dielectric constants of the ambient liquid, the drop and the particles determine the regions in which the particle concentration increases.

First, we describe the electric field distribution for a drop subjected to a uniform electric field and the dielectrophoretic force that acts on a particle located on the drop's surface. This is followed by a description of our experimental results for the distribution of particles and the dependence of the drop deformation on the dielectric constants of the particles, the drop and the ambient liquid.

Electric Field Distribution for a Dielectric Drop Placed in a Dielectric Liquid

We consider a drop suspended in a surrounding fluid with small solid particles floating at its surface and subjected to an externally applied uniform electric field. The latter in our numerical simulations is generated by placing the drop and its surrounding fluid in a box with electrodes coinciding with the upper and lower walls. The analysis performed here assumes that: (i) both the drop and the ambient liquids are perfect dielectrics, (ii) the drop and the ambient fluids are immiscible and (iii) the drop's dielectric constant is different from that of the ambient fluid. As discussed below, it is interesting to note that although the applied electric field away from the drop is uniform, the presence of the drop makes the electric field in the neighborhood of the drop non-uniform and, as a result, the particles on its surface are subjected to a non-uniform electric field and thus to the phenomenon of dielectrophoresis. We first characterize this non-uniformity, and the resulting dielectrophoretic force which acts on particles located either on its surface or near the drop.

The numerical results presented here were obtained using a code based on the finite element method, with features described in: Pillapakkam, S. B. and Singh, P. *Journal Comput. Phys.* 174, 552-578, 2001; Singh, P. and Aubry, N. *Phys. Rev. E* 72, 016602-016607, 2005; Aubry, N. and Singh, P. *Euro Phys. Lett.* 74(4), 623-629, 2006; Singh, P. and Aubry, N. ASME Paper Number FEDSM2006-98413, New York: American Society of Mechanical Engineers, 2006; and Singh, P., Joseph, D. D., Hesla, T. I. Glowinski, R., and Pan, T. W. *J. Non-Newtonian Fluid Mech.* 91, 165-188, 2000. The governing (fluid and electric field) time dependent equations are solved simultaneously everywhere, i.e., both inside and outside the drop in the computational domain, to obtain the steady solution. The electric force exerted on the drop due to the electric field is obtained in terms of the Maxwell stress tensor computed directly from the electric potential (Singh, P. and Aubry, N. *Phys. Rev. E* 72, 016602-016607, 2005; Aubry, N. and Singh, P. *Euro Phys. Lett.* 74(4), 623-629, 2006; Wohlhuter, F. K. and Basaran, O. A. *J. Fluid Mech.* 235, 481-510, 1992; Basaran, O. A. and Scriven, L. E. *J. Colloid and Interface Science* 140, 10-30, 1990; and Baygents, J. C. Rivette N. J., and Stone, H. A. *J. Fluid Mech.* 368, 359-375, 1998). The code was validated in Singh, P. and Aubry, N. ASME Paper Number FEDSM2006-98413, New York: American Society of Mechanical Engineers, 2006, by showing that the numerically computed results for the deformation of a drop in a uniform electric field were in agreement with the analytical results which assume that the drop is approximately spherical.

Figure 5:
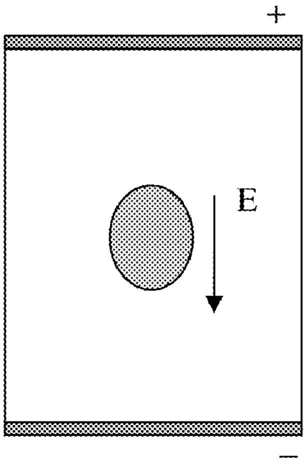
FIG. 5. Drop placed in an ambient fluid and subjected to a uniform electric field generated by the electrodes placed at the top and bottom of the computational domain. The domain is three dimensional with a rectangular cross-section.

For our simulations, the dielectric constant of the ambient fluid is held fixed and assumed to be 1.0. The interfacial tension between the ambient fluid and the drop, and the voltage difference between the electrodes are prescribed. The electric field distribution and the deformed drop shapes are obtained numerically. The domain dimensions are assumed to be 1.5, 1.5 and 2.0 cm in the x, y and z directions and the undeformed drop radius is assumed to be 0.25 cm. Simulations are started by placing a spherical drop at the center of the domain (see FIG. 5). The normal derivative of the electric potential is assumed to be zero on the domain side walls, and therefore, since the electrodes completely cover the top and bottom walls, in the absence of a drop, the electric field in the domain is uniform.

The dependence of the dielectrophoretic force, and the resulting drop deformation, are described below for two values of the drop dielectric constant.

Electric Field Distribution

FIG. 2 shows the computed steady state shape of the drop and the electric field distribution around it. The drop considered in FIG. 2*a* has a dielectric constant of 0.5 and the dielectric constant of the ambient fluid, as noted above, is one. The modified electric field distribution is such that the magnitude of the electric field is larger near the equator and smaller near the poles, compared to the magnitude of the imposed uniform electric field. It is also interesting to notice that the strength of the electric field inside the drop is greater than the applied field strength. This modification makes the electric field strength, and thus also the electric stress distribution, on the drop surface non-uniform.

The modified electric field distribution for the case where the dielectric constant of the drop is greater than that of the ambient fluid is shown in FIG. 2B. We note that the strength of the electric field inside the drop is weaker than that of the applied field, and the electric field strength at the poles is greater than near the equator.

FIG. 2 shows the steady deformed shape and the modified electric field around a dielectric drop suspended in a dielectric liquid and subjected to a uniform electric field. (a) The dielectric constant of the drop is 0.5 and of the ambient liquid is one, and We=1.3. Notice that the electric field is no longer uniform, and that it is locally maximum at the equator and locally minimum at the poles. (b) The dielectric constant of the drop is 2.0 and of the ambient liquid is one, and We=1.31. The electric field is locally maximum at the poles and locally minimum at the equator.

It is worth noting that the electric field strength inside the drop in both cases is constant. This is important because, as discussed below, this implies that a particle placed inside the drop is not expected to experience a dielectrophoretic force, at least within the point-dipole approximation.

Drop Deformation

FIG. 2A also implies that everywhere on the drop surface the normal component of the Maxwell stress tensor is compressive, i.e., it points into the drop, but its magnitude is larger near the equator than it is near the poles. Consequently, after the electric field is switched on, the electric stresses cause the drop to elongate in the direction of the electric field. However, as the drop deforms, the magnitude of the surface tension force, which counters the deviation from the spherical shape, increases. The drop stops deforming when the surface tension force is balanced by the electric force. In FIG. 2A, on the other hand, everywhere on the drop surface the normal component of the Maxwell stress tensor is extensional, i.e., points away from the drop. The drop becomes elongated in the direction of the electric field because the extensional stress is larger near the poles than it is near the equator.

The critical electric field strength below which the drop deformation remains small can be estimated from the result obtained by Allen and Mason (*Proc. Royal Soc. London, Series A, Mathematical and Physical Sciences,* 267, 45-61, 1962) for the case of a drop placed in a uniform electric field. The deformed shape in their analysis is determined by the balance of the surface tension force, which tends to make the drop spherical, and the force due to the electric stress, which tends to elongate the drop. The electric stress distribution on the surface of the drop is deduced by assuming that the drop remains spherical. Allen and Mason obtained the following expression for the drop deformation $$D = \frac{9a\varepsilon_0\varepsilon_c E_0^2\beta^2}{16\gamma} = \frac{9}{16}We \tag{1}$$

where $$We = \frac{a\varepsilon_0\varepsilon_c E_0^2\beta^2}{\gamma}$$

is the electric Weber number, a is the drop radius, $\gamma$ is the interfacial tension between the two fluids, $\in_c$ is the dielectric constant of the fluid, $\in_0=8.8542\times10^{-12}$ F/m is the permittivity of free space and $E_0$ is the RMS value of the electric field. Expression (1) is also valid for a DC electric field where $E_0$ simply the electric field intensity. The coefficient $\beta(\omega)$ is the real part of the frequency dependent Clausius-Mossotti factor given by $$\beta(\omega) = \mathrm{Re}\left(\frac{\varepsilon_d^* - \varepsilon_c^*}{\varepsilon_d^* + 2\varepsilon_c^*}\right),$$

where $\in^*_d$ and $\in^*_c$ are the frequency dependent complex permittivity of the drop and the ambient fluid, respectively. The complex permittivity $\in^*=\in-j\sigma/\omega$, where $\in$ is the permittivity, $\sigma$ is the conductivity and $j=\sqrt{-1}$.

Expression (1) implies that the deformation increases as the square of the electric field and the square of the Clausius-Mossotti factor. Moreover, it varies inversely with the surface tension coefficient and is proportional to the electric Weber number. The deformation is defined as the parameter $$D = \frac{L-B}{L+B}, \tag{2}$$

where L and B are respectively the major and minor axes of the drop, assuming that the shape of the latter is approximately ellipsoidal. The deformation parameter D varies between 0 and 1; for a spherical drop, D is zero and its value increases with increasing deformation from a sphere.

Another important effect not accounted for in the above analysis is that the presence of the drop in a device whose size is comparable to the drop size modifies the electric field distribution around it. This, in turn, affects the electric stress distribution on the drop surface, and thus its deformation. These effects are particularly important in the manipulations of drops in micro devices where the drop size can be of the same order as the device size (Kadaksham, J. Singh, P., and Aubry, N. *Mech. Res. Comm.* 33, 108-122, 2006).

To summarize, a drop placed in a uniform electric field experiences a deforming electric stress and a surface tension force which counters this deformation. The drop attains a steady shape when these two forces balance each other. Furthermore, since the electric field strength on the drop surface is not constant, as discussed below, a particle on the surface of a drop is subjected to a dielectrophoretic force that causes it to move to either the equator or one of the poles.

Dielectrophoretic Forces on Particles

It is well known that when a particle is subjected to a non-uniform electric field, and its dielectric constant is different from that of the ambient fluid, the electric stress acting on its surface results in a net force, referred to as the dielectrophoretic (DEP) force, which causes the particle to translate. If a particle is sufficiently small compared to the length scale over which the non-uniform electric field varies, the point dipole approach can be used to estimate the dielectrophoretic force. According to the point dipole (PD) model, which assumes that the gradient of the electric field is constant, the time averaged dielectrophoretic (DEP) force acting on a spherical particle in an AC electric field is given by $$F_{DEP}=2\pi a'^3\in_0\in_c\beta\nabla E^2 \tag{3}$$

where a' is the particle radius and E is the RMS value of the electric field or simply the electric field intensity in a DC field (Pohl, H. A., 1978, "*Dielectrophoresis*," Cambridge university press, Cambridge; Klingenberg, D. J., van Swol, S., Zukoski, C. F., *J. Chem. Phys.* 91, pp. 7888-7895, 1989; Kadaksham, J. Singh, P., and Aubry, N. J. *Fluids Eng.* 126, 170-179, 2004; Kadaksham, J. Singh, P., and Aubry, N. *Electrophoresis* 25, 3625-3632, 2004; and Kadaksham, J. Singh, P., and Aubry, N. *Mech. Res. Comm.* 33, 108-122, 2006). The coefficient $\beta(\omega)$ is the real part of the frequency dependent Clausius-Mossotti factor given by $$\beta(\omega) = \mathrm{Re}\left(\frac{\varepsilon_p^* - \varepsilon_c^*}{\varepsilon_p^* + 2\varepsilon_c^*}\right),$$

where $\in^*_p$ and $\in^*_c$ are the frequency dependent complex permittivities of the particle and the ambient fluid, respectively.

Here we wish to note that expression (3) assumes that the dielectric constant of the ambient fluid around the particle is constant. For a particle situated at a two-fluid interface, however, this is clearly not the case since the dielectric constants of the two fluids involved are different and therefore the dielectrophoretic force acting upon a particle will differ from (3). Particularly, the effective Clausius-Mossotti factor for a particle at the drop's surface is expected to depend on the dielectric constants of the particle and the two fluids involved, and also on the position of the particle within the interface. The position of a particle on the drop's surface, i.e., the position of the contact line on the particle's surface which determines the fraction of particle in the two fluids, depends on the contact angle and the buoyant weight of the particle. In presence of an electric field, it also depends on the electric force since the latter can change the particle's position within the interface.

Figure 1A:
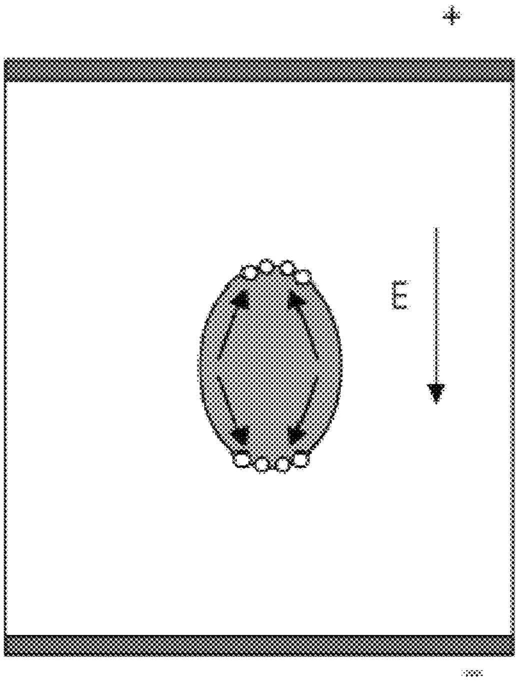
FIG. 1. The dielectrophoresis force induced motion of small particles on the surface of a drop subject to a uniform electric field generated by the electrodes placed at the top and bottom of the device. The figure shows the direction of motion for particles for which the Clausius-Mossotti factor is positive (the direction is the opposite for particles with a negative Clausius-Mossotti factor). The dielectric constant of the drop in the FIG. 1A is greater than that of the ambient fluid while the dielectric constant of the drop in the FIG. 1B is less than that of the ambient fluid.
Figure 1B:
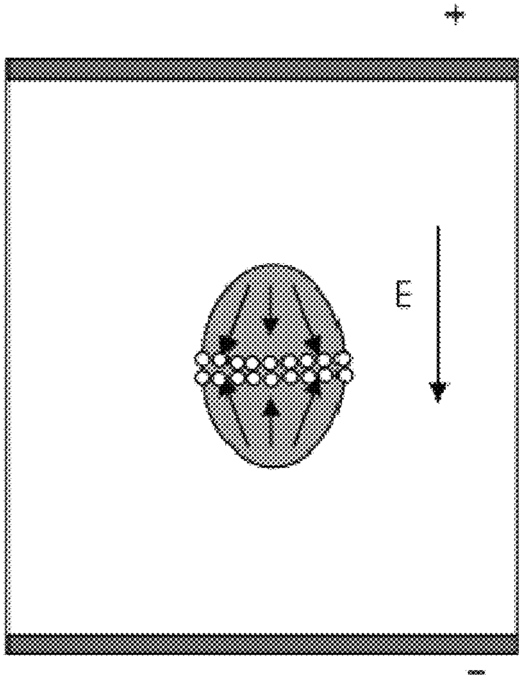

From FIG. 2 we know that for a drop placed in an ambient fluid and subjected to a uniform electric field, the electric field distribution on the drop's surface is non-uniform. FIG. 1 shows the expected direction of the DEP force that acts on a particle located on the drop's surface for which the particle's effective Clausius-Mossotti factor is positive, and the locations at which the particles are eventually collected. More specifically, FIG. 1 shows the dielectrophoretic force induced motion of small particles on the surface of a drop subjected to a uniform electric field generated by the electrodes placed at the top and bottom of the device. The figure shows the direction of motion for particles for which the Clausius-Mossotti factor is positive (the direction is the opposite for particles with a negative Clausius-Mossotti factor). The dielectric constant of the ambient fluid is assumed to be one. The dielectric constant of the drop in (FIG. 1A) is greater than one and in (FIG. 1B) it is less than one.

Due to the fact that the electric field is uniform within the drop, in a first order approximation, we expect, in general, the dielectric constant of the ambient fluid to play a more important role than that of the drop in determining the direction of the dielectrophoretic force. Namely, it is expected that if the dielectric constant of the drop is greater than that of the ambient fluid, particles on the drop surface collect at the two poles. On the other hand, if the dielectric constant of the drop is smaller than that of the ambient liquid, particles collect in a ring shaped region near the equator. (However, when the particles' buoyant weight is not negligible and electrodes are mounted on the side walls, particles remain either near the top of the drop or sediment to the bottom of the drop while remaining near the equator.) Furthermore, the opposite is true (within the same order of approximation) if the particles' Clausius-Mossotti factor is negative. That is, particles are expected to collect at the equator if the dielectric constant of the drop is greater than that of the ambient fluid, and at the poles if the dielectric constant of the drop is smaller than that of the ambient fluid. This phenomenon can thus be used to separate two types of particles but where they aggregate (at the poles or at the equator) depends on the dielectric constants of the drop, the ambient fluid and the particles.

Furthermore, in an electric field, particles on the interface interact with each other via the electrostatic particle-particle forces. In the point dipole limit, an expression for the interaction force between two dielectric spherical particles suspended in a dielectric liquid and subjected to a uniform electric field was given in (Pohl, H. A., 1978, "*Dielectrophoresis*," Cambridge university press, Cambridge and Klingenberg, D. J., van Swol, S., Zukoski, C. F., *J. Chem. Phys.* 91, pp. 7888-7895, 1989). Using this expression, it is easy to show that the electrostatic interaction force between two particles is attractive and also that it causes the particles to orient such that the line joining their centers is parallel to the electric field direction (except in the degenerate case when the line joining their centers is perpendicular to the electric field, in which case they repel). Similar interactions take place between particles in a non-uniform electric field. Direct numerical simulations (DNS) conducted using this expression for the interaction force show that two particles subjected to a non-uniform electric field attract each other and orient such that the line joining their centers is parallel to the local electric field direction while they move together towards the location where the electric field strength is locally maximal or minimal, depending on the value of their dielectric constant relative to that of the two fluids (Kadaksham, J., Singh, P., and Aubry, N. *Electrophoresis* 26, 3738-3744, 2005; Aubry, N. and Singh, P. *Electrophoresis* 27(3), 703-715, 2006; and Nudurupati, S. C., Aubry, N., and Singh, P. *J. Phys. D: Appl. Phys.* 39, 3425-3439, 2006). The extent of this attraction, which, if it is strong, manifests itself in particle chaining, depends on a dimensionless parameter which can also be found in the above references.

Experiments

Experiments were conducted in two different devices both having rectangular cross-sections. In the first device the electrodes were mounted on the bottom and top surfaces, and in the second they were mounted on the side walls. The height of the first device is 6.0 mm, which is also the distance between the electrodes, and the cross-section is square shaped with the width of 18 mm. For the second device, the distance between the electrodes is 6.5 mm, the depth 6.5 mm and the length 41 mm. The diameter of the drops used in the experiments was approximately 800 μm. The depth of the ambient fluid in the device was approximately 5.5 mm.

The drops were subjected to a uniform AC electric field which was generated by energizing the electrodes such that the phase of the two electrodes differed by π, and the frequency used in all experiments described here was 1 kHz. An AC field of sufficiently high frequency was used in our experiments to ensure that the role of conductivity was negligible. The electric field strength was varied by changing the magnitude of the voltage applied to the electrodes.

The drops of various sizes were formed at a small distance from the bottom surface by injecting a given amount of fluid into the ambient fluid with a syringe. The density and viscosity of the drops were not equal to the corresponding values for the ambient liquids. In fact, the ambient liquid was selected so that the drop density was slightly larger, which ensured that the drop did not levitate. For all cases reported in this paper, the drops were allowed to reach the bottom of the device, although would not wet it (so that the surface was always covered with the ambient fluid) before the electric field was switched on. However, since the drops were denser than the ambient liquid, they were slightly deformed due to their buoyant weight.

The liquids used in this study were Millipore water, silicon oil, decane and corn oil with the following properties. The dielectric constant of water is 80.0 and its conductivity is $5.5\times10^{6}$ $pSm^{-1}$; the values for silicon oil are 2.68 and 2.67 $pSm^{-1}$; the values for decane are 2.0 and $2.65\times10^{4}$ $pSm^{-1}$; and for corn oil they are 2.87 and 32.0 $pSm^{-1}$. The densities of water, silicon oil, decane and corn oil are 1.00 $g/cm^3$, 0.963 $g/cm^3$, 0.730 $g/cm^3$ and 0.92 $g/cm^3$, respectively.

Figure 6:
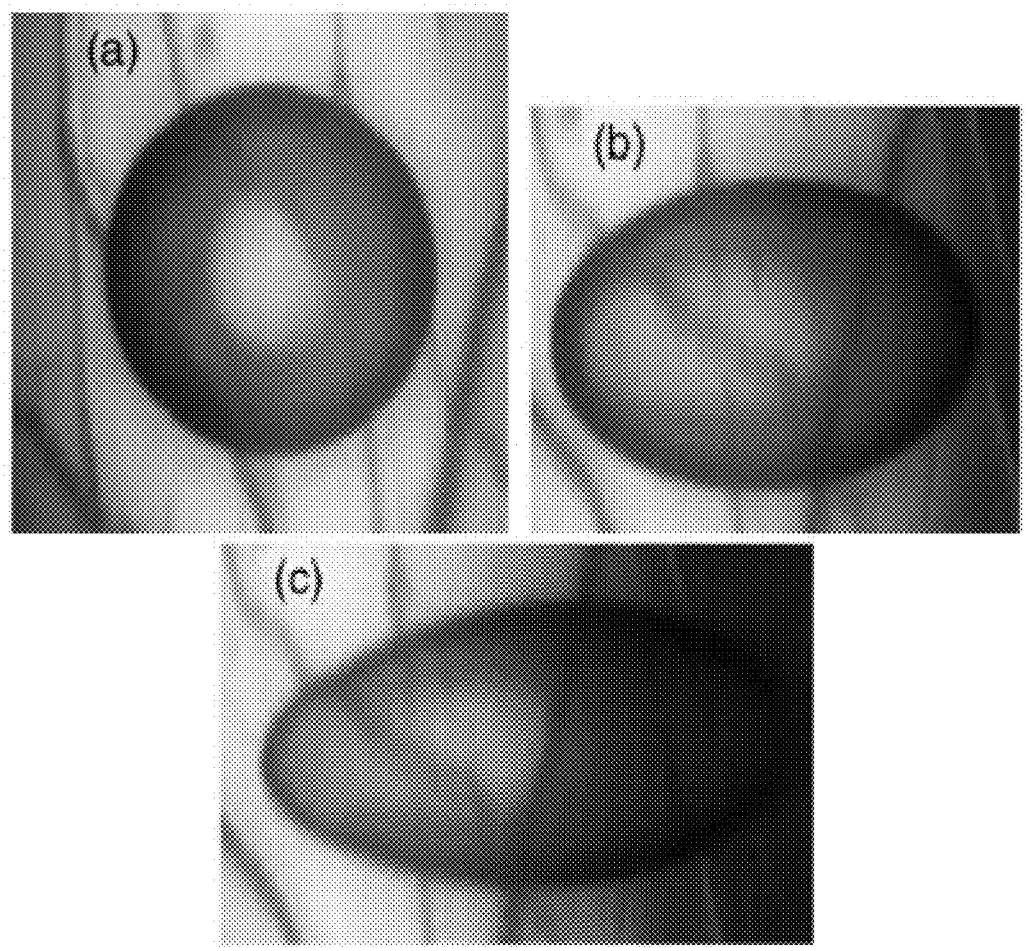
FIG. 6. Deformation of a water drop suspended in decane and subjected to a uniform electric field. Electrodes are mounted on the side walls of the device, and so the electric field is horizontal. The drop diameter is approximately 885 μm. The distance between the electrodes is 6.5 mm. (a) The applied voltage is 0 volts; the drop is spherical. (It, however, appears to be slightly elongated in the vertical direction due to the optical distortion that arises because the top surface of the ambient liquid is not flat.) (b) The steady shape when the applied voltage is 3700 volts. The longer dimension of the drop is 1157 μm. (c) The applied voltage is increased to 3800 volts. A short time later, just before it breaks up (it breaks in the next frame). The longer dimension of the drop is 1476 μm.

FIG. 6 shows the deformation of a water drop suspended in decane. The electric field in this case is horizontal as the electrodes are mounted on the side walls. As the electric field strength was increased the drop elongated and finally broke up when the voltage applied to the electrodes was around 3800 volts. In the top view, the drop shape appeared to be ellipsoidal, with the major axis of the ellipsoid being normal to the electrodes.

Drops with Particles

In our experiments, a drop with particles distributed on its surface was formed using the following procedure. The first step was to form a dilute suspension by mixing particles in the liquid that was to be used to form the drop. The particle concentration was kept small to ensure that the particle concentration on the drop surface remained sufficiently small. A fixed volume of this suspension was then injected into the ambient liquid by using a syringe. Since the drop density was slightly larger than that of the ambient liquid, the drop, after being formed, sedimented to the bottom surface of the device. The particles suspended inside the drop sedimented along with the drop (see FIG. 7).

Figures 7A, 7B, 7C:
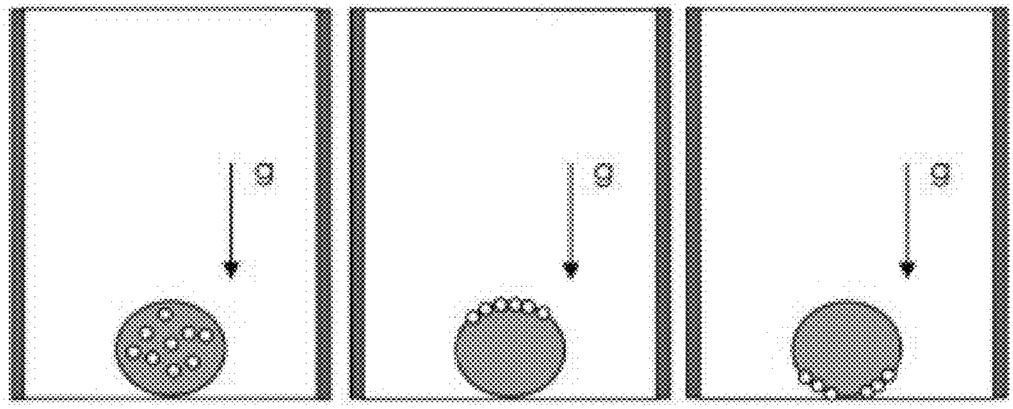
(FIG. 7A) The initial state of an injected drop. Particles are present within the drop and not on its surface.
(FIG. 7B) The suspended particles are less dense than the drop and so they get accumulated at the top surface of the drop.
(FIG. 7C) The suspended particles are denser than the drop and so they get accumulated at the bottom surface of the drop.

We then waited for several minutes to ensure that all particles suspended inside the drop reached either the bottom or the top surface of the drop, depending on the density of the particles compared to that of the drop (see FIG. 7). When the particle density was greater than the drop density, particles settled at the bottom surface of the drop. On the other hand, when the particle density was smaller than the drop density, particles rose to the top surface of the drop. In both cases, the particles got trapped at the two-fluid interface and remained there due to the interfacial tension. The position of a particle within the interface can be determined by the three-phase contact angle on its surface and its buoyant weight (Singh, P. and Joseph, D. D. *J. Fluid Mech.* 530, 31-80, 2005).

It is worth noting that relatively large sized particles were used in our experiments to ensure that we were able to visually monitor their motion after the electric field was applied. However, since the diameter of the particles used in our experiments was between 4 and 70 microns, their buoyant weight was not negligible and so they settled or rose under gravity. Once they were trapped at the interface between the drop and the ambient liquid they remained trapped even when the electric field was switched on. They simply moved along the surface of the drop under the action of the dielectrophoretic force which arises because the electric field on the drop's surface is not uniform.

We next describe two cases that arise depending on the relative magnitudes of the drop's and ambient liquids' dielectric constants.

Case 1. Drop Dielectric Constant Smaller than that of the Ambient Liquid

We first consider the case of particles with a density smaller than that of the ambient liquid, and then the case of particles with a density larger than that of the ambient liquid.

Figure 8:
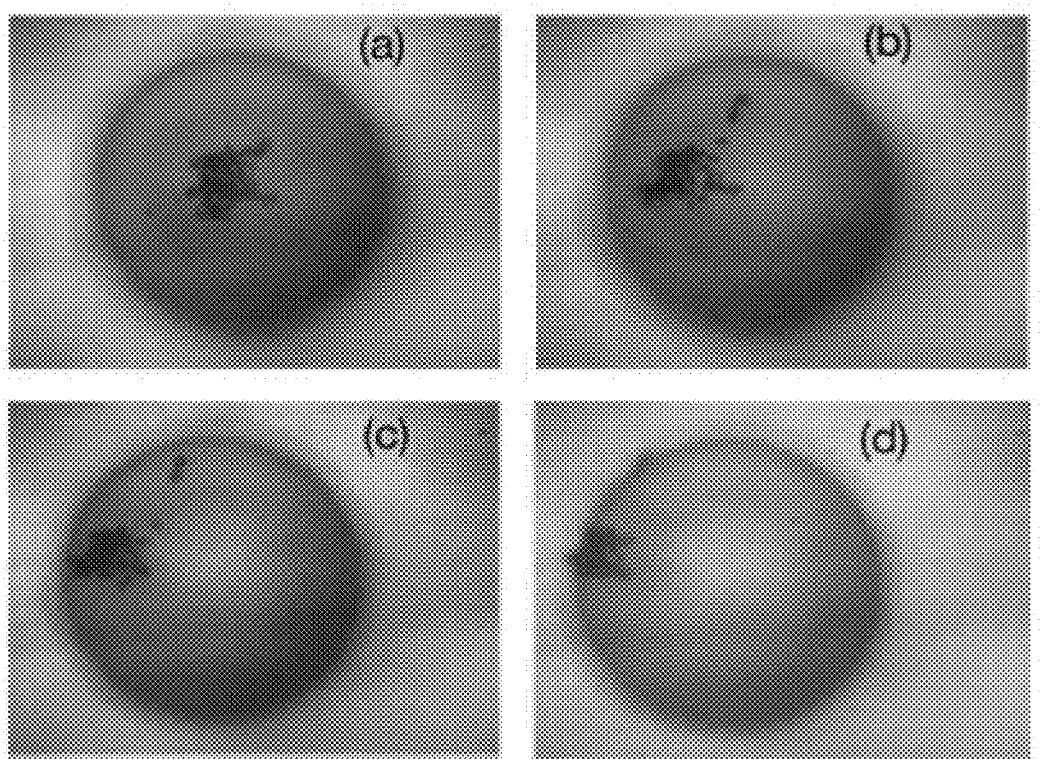
FIG. 8. Top view of the motion of hollow glass spheres on the surface of a silicone oil drop suspended in corn oil and subjected to a uniform electric field. Electrodes are mounted on the bottom and top surfaces of the device. The electric field is normal to the plane of the paper. The drop diameter is approximately 684 μm. The distance between the electrodes is 6.0 mm and the applied voltage is 3000 volts. The density of hollow glass spheres is 0.6 g/cm$^3$ and their diameter is approximately 18 μm. The Clausius-Mossotti factor is positive and since the electric field is maximal at the equator, after the electric field is switched on, the particles move towards the equator. (a) t=0, (b) t=20 s. (c) t=40 s. (d) t=60 s.

FIG. 8 shows the top view of the distribution of hollow glass particles, of diameter 18 μm, on the surface of a silicone oil drop suspended in corn oil at four different times after the electric field was switched on. The electrodes are at the top and bottom surfaces of the device. The electric field is perpendicular to the paper, and the voltage applied to the device was 3000 volts, which was held fixed. The drop stretches in the direction of the electric field, but since the viewing direction is parallel to the direction of stretch, this cannot be seen. The density of hollow glass particles being 0.6 g/cm$^3$, the particles are trapped at the top surface of the drop. From FIG. 8 we know that when the dielectric constant of the drop is smaller than of the ambient liquid, the electric field is maximal at the equator. In FIG. 8 the equator is the circular region enclosing the drop. Experiments show that the particles' Clausius-Mossotti factor is positive since particles move to the region where the electric field strength is maximal. This is consistent with the fact that the dielectric constant of the particles is 6.5, which is larger than that of the ambient liquid and also of the drop. The figure shows that particles move outwards as time increases and eventually most of them get trapped at the equator. Their motion, therefore, is against the buoyancy force which acts in the upward direction as the particles density is smaller than the liquid density. Also notice the presence of particle chains, which are due to electrostatic particle-particle interactions among particles. Furthermore, most of the particles move together in a cluster which also is a result of the attractive particle-particle interaction force between them.

Figure 9:
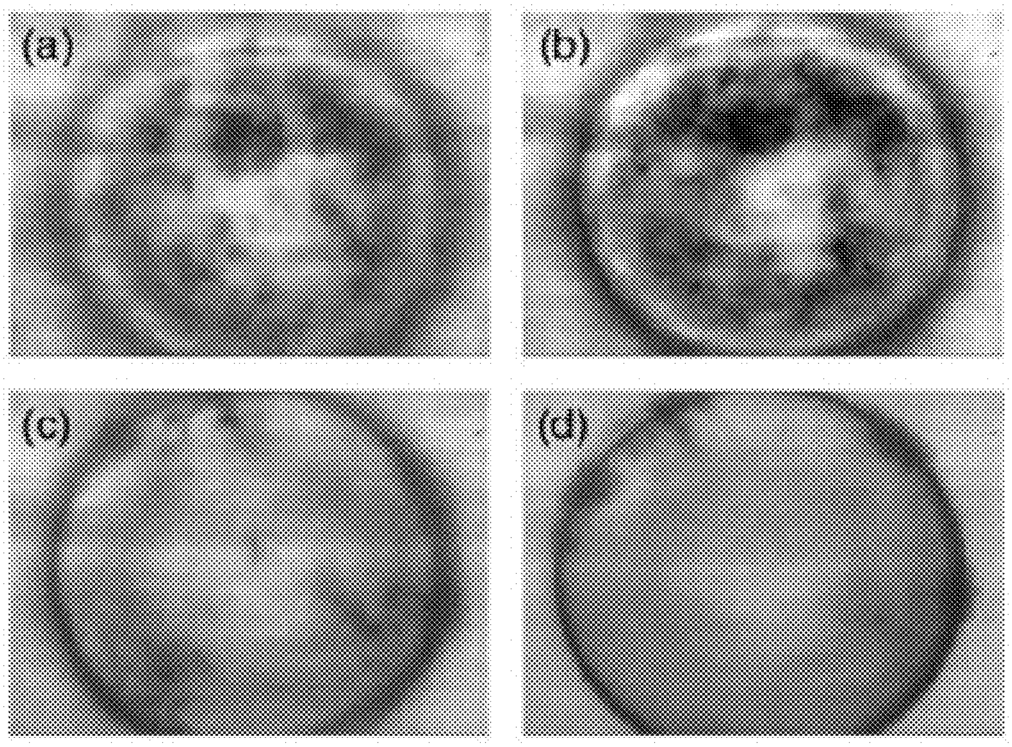
FIG. 9. Top view of the motion of sodalime glass spheres on the surface of a silicone oil drop suspended in corn oil and subjected to a uniform electric field. Electrodes are mounted on the bottom and top surfaces of the device. The electric field is normal to the plane of the paper. The drop diameter is approximately 940 μm. The distance between the electrodes is 6.0 mm and the applied voltage is 4000 volts. The density of sodalime glass spheres is 2.5 g/cm$^3$ and their diameter is between 4-10 μm. The Clausius-Mossotti factor is positive and since the electric field is maximal at the equator, after the electric field is switched on, the particles move towards the equator. (a) t=0, (b) t=10 s, (c) t=20 s, (d) t=60 s.

FIG. 9 shows the distribution of sodalime glass particles on the surface of a silicone oil drop suspended in corn oil. The diameter of the particles is between 4-10 μm, thus smaller than the particles used above, and their density is 2.5 g/cm$^3$, which makes the particles initially migrate toward, and get trapped at, the bottom surface of the drop. The particles' Clausius-Mossotti factor is positive as all the particles trapped at the interface move towards the drop's equator where the electric field strength is maximal. In this case particles move upwards, against the buoyant weight which acts downwards, as the density of particles is greater than the liquid density. The figure shows that the particles move outwards as time increases and eventually most of them are trapped at the equator. Notice that the middle portion of the drop in FIG. **9*d*** is virtually free of particles as all have moved to the drop's equator. Again, under the influence of particle-particle interactions, particles are not uniformly distributed along the equator, but rather form particle clusters there.

Case 2. Drop Dielectric Constant Larger than of the Ambient Liquid

Figure 10:
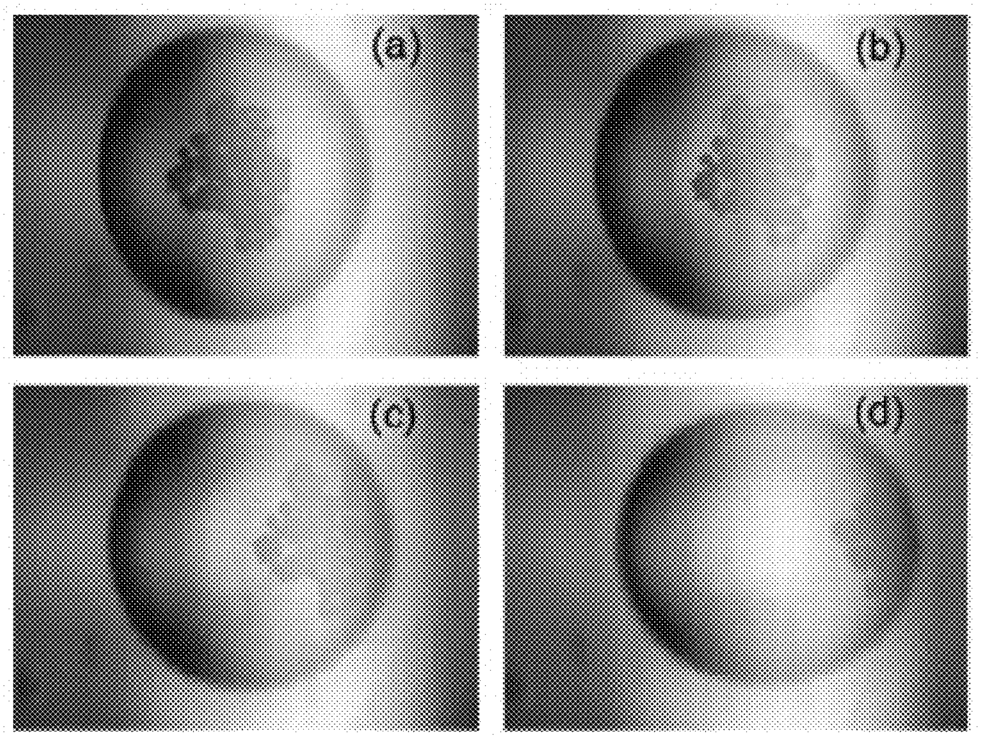
FIG. 10. Top view of the motion of extendospheres on the surface of a water drop suspended in decane and subjected to a uniform electric field. Electrodes are mounted on the left and right side walls of the device. The electric field is horizontal within the plane of the photographs. The drop diameter is approximately 1547 μm. The distance between the electrodes is 6.5 mm. The density of the extendospheres is 0.75 g/cm3 and their diameter is approximately 55 μm. The Clausius-Mossotti factor is positive and since the electric field maximum is located at the poles, after the electric field is switched on, the particles slowly move towards the pole on the right side. Notice that particles move together due to the electrostatic particle-particle interactions. The applied voltage to the electrodes is (a) 0 volts, (b) 1500 volts, (c) 2500 volts, (d) 2700 volts.

We next describe the distribution of hollow extendospheres on the surface of a water drop suspended in decane (see FIG. 10). The electrodes in this case were mounted on the left and right side walls of the device. The electric field is horizontal, and the maximum voltage applied to the device was 2700 volts. The drop stretches in the direction of the applied electric field. The density of hollow extendospheres is 0.75 g/cm$^3$, and thus, as was the case in FIG. 8, initially the particles are trapped at the top surface of the drop. The dielectric constant of the drop is greater than that of the ambient liquid, and thus the electric field is maximal at the poles. In FIG. 10 the electric field is horizontal and the poles are the far left and far right most points on the drop surface. The dielectric constant of the particles is 4.5, which is greater than that of decane, but smaller than of the drop. The particles' Clausius-Mossotti factor in the experiments is positive, as indicated by the fact that after the electric field is switched on particles trapped on the drop surface move to the regions where the electric field strength is maximal (see FIG. 10). Particles also move closer to the poles as the electric field strength is further increased. Their motion towards the pole is countered by the buoyancy force which tends to bring them to the top surface of the drop. The figure shows that all the trapped particles move to the right side and are captured near the right pole. Again, particles move together due to the electrostatic particle-particle interactions. It is noteworthy that the particles' Clausius-Mossotti factor is positive even though the particles' dielectric constant is much smaller than that of the water drop. This indicates that the dielectric constant of the ambient liquid relative to that of the particles is more important in determining the sign of the Clausius-Mossotti factor, as we had expected (see arguments above).

Influence of Redistribution of Particles on Drop Deformation

Figure 11:
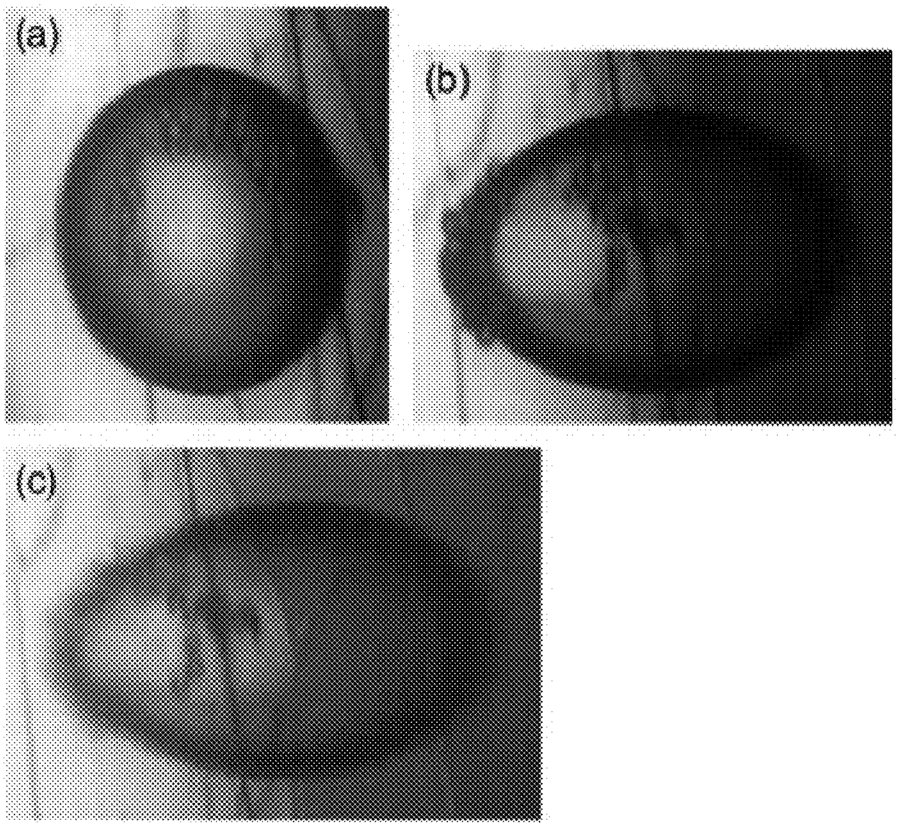
FIG. 11. Deformation of water drop containing polystyrene spheres on its surface and suspended in decane when it is subjected to a uniform electric field. Electrodes are mounted on the side walls of the device, and so the electric field is horizontal within the plane of the photographs. The drop diameter is approximately 840 μm. The distance between the electrodes is 6.5 mm and the applied voltage in (b) is 3100 volts. The density of polystyrene spheres is 1.05 g/cm$^3$ and their diameter is approximately 71 μm. The Clausius-Mossotti factor is positive and since the electric field is maximal at the poles, after the electric field is switched on, the particles slowly move towards the two poles. (a) The applied voltage is 0 volts; the drop is spherical. (b) The steady shape when the applied voltage is 3100 volts. The longer dimension of the drop is 1124 μm. (c) The applied voltage is increased to 3200 volts. A short time later, just before it breaks up (it breaks in the next frame), the longer dimension is 1218 μm.

In FIG. 11 the deformation of a water drop suspended in decane is shown for the case when 71 mm polystyrene spheres are present on the drop surface. The density of polystyrene spheres is 1.05 and the dielectric constant is 2.5. All other parameters are the same as for the case described in FIG. 6. The drop elongated in the direction of the electric field and the extent of the stretch increased with increasing electric field strength. Notice that in the top view, the drop shape appears to be ellipsoidal, and that most particles have moved to the poles of the extended drop. Here, the drop breakup occurred at a voltage of 3200 volts, which is much smaller than the voltage of 3800 required when the particles were not present. This is probably a consequence of the reduction in the effective interfacial tension due to the presence of particles. We remind the reader that this phenomenon is similar to the mechanism by which small particles stabilize emulsions, i.e., their presence reduces the effective interfacial tension which makes the emulsion more stable. If we assume that the electric Weber number in FIGS. 6 and 11 at the drop breakup is the same, we may conclude from equation (1) that the effective surface tension in the presence of particles is about 1.5 times smaller. Another possible reason could be that an electric force normal to the drop surface acts on the particles trapped in the interface which causes an increase in the drop deformation. This reason is supported by the fact that when the electric field is applied particles appear to move normal to the interface in the direction away from the drop center.

Conclusions

The objective of this work was to investigate the influence of an externally applied uniform electric field on the distribution of particles on the surface of a drop, particularly as a concentration/separation tool. In our experiments, the drop was immersed in another immiscible liquid for which the dielectric constant was different than that of the drop. The drop was subjected to a uniform AC electric field with a frequency of 1 kHz, which ensured that the conductivity of the liquids involved can be neglected. In the analysis presented, both the drop and the ambient fluid were assumed to be perfect dielectrics.

Our experiments have shown that when a drop is placed in a liquid with a smaller dielectric constant value, particles distributed on the surface of the drop gets collected at the poles of the elongated drop (assuming that particles undergo positive dielectrophoresis). On the other hand, when the dielectric constant of the drop is smaller particles collect in a ring shaped region near the equator (assuming that particles undergo positive dielectrophoresis). The reverse is true for particles undergoing negative dielectrophoresis, and therefore two types of particles, at least in principle, can be separated at a drop surface. We have argued that this motion of particles is due to the presence of a dielectrophoretic force that acts because the electric field on the surface of the drop is non-uniform, even when the drop is subjected to a uniform electric field. Our simulations have indeed shown that the electric field strength is maximal at the equator when the dielectric constant of the drop is smaller than that of the ambient liquid and therefore the particles for which the Clausius-Mossotti factor is positive should, in a first approximation, collect in a ring-shaped region near the equator. On the other hand, when the dielectric constant of the drop is greater than that of the ambient liquid the electric field strength is maximal at the poles, and thus particles for which the Clausius-Mossotti factor is positive are expected to, and do, collect there.

Finally, our experiments have also shown that when particles get collected at the poles of a drop the electric field strength needed to cause its breakup is smaller. This, we believe, is due to the fact that the presence of small particles causes a reduction in the effective interfacial tension in the pole regions, thus making the breakup of the drop easier.

The phenomena could be used to concentrate particles at a drop surface within well-defined regions (poles and equator) while clearing the rest of the surface, to separate two types of particles at the surface of a drop, or to accelerate the breakup of a drop.

Example 2

Effect of Parameters on Redistribution and Removal of Particles from Drop Surfaces In Example 1, it was shown that particles distributed on the surface of a drop can be concentrated at the poles or the equator of the drop by subjecting the latter to a uniform electric field and that such concentrated particles can then be removed from the drop by increasing the electric field intensity. In this Example, we present experimental results for the dependence of the dielectrophoretic force on the parameters of the system such as the particles' and drop's radii and the dielectric properties of the fluids and particles, and define a dimensionless parameter regime for which the technique can work. Specifically, we show that if the drop radius is larger than a critical value, that depends on the physical properties of the drop and ambient fluids and those of the particles, it is not possible to concentrate particles and thus clean the drop of the particles it carries at its surface because the drop breaks or tip-streams at an electric field intensity smaller than that needed for concentrating particles. However, since the dielectrophoretic force varies inversely with the drop radius, the effectiveness of the concentration mechanism increases with decreasing drop size, and therefore the technique (particles concentration followed by drop clean-up or delivery) is guaranteed to work provided the drop radius is sufficiently small. We also show that this concentration method can be used to separate particles experiencing positive dielectrophoresis on the surface of a drop from those experiencing negative dielectrophoresis, and form a composite (Janus) drop by aggregating particles of one type near the poles and of another near the equator. Furthermore, after the two types of particles are separated on the surface of the drop, it is possible to remove the particles concentrated near the poles from the drop by increasing the electric field intensity so that the drop tip-streams, thus leaving only one type of particles at the surface of the drop. This could be useful for having drops selectively deliver, or get rid of, some particles while keeping others.

There are numerous applications in which the presence of small particles on drops' surfaces is important. For example, foams and emulsions used in diverse applications are stabilized by using micron sized solid particles which become adsorbed at fluid-fluid interfaces (B. P. Binks, Current opinion in *Colloid Interface Sci.,* 2002, 7, 21-41; W. Ramsden, *Proc. Roy. Soc.*, London, 1903, 72, 156; S. U. Pickering, Emulsions, *Journal Chem. Soc.*, London, 2007, 91 (2), 2001; and V. B. Menon and D. T. Wasan, *Colloids Surf*, Part 1, 1986, 19, 89-105). Also, in recent years, partly as a result of the attention given to nano particles (and nanotechnology), there has been much interest in the phenomenon of particles assembly at interfaces, including fluid-fluid interfaces, as a means to fabricate novel nano structured materials (B. P. Binks, Current opinion in *Colloid Interface Sci.,* 2002, 7, 21-41 and W. Ramsden, *Proc. Roy. Soc.*, London, 1903, 72, 156.). Furthermore, particles on drops' surfaces can be advantageous in the field of digital microfluidics, which uses droplets, rather than fluid streams, to transport, concentrate and mix fluid and particles, for developing programmable micro-chips with bio-chemical reactions occurring within single droplets (H. Song, J. D. Tice and R. F. Ismagilov, Angew. *Chem. Int. Ed.,*

2003, 42, 768; O. Ozen, N. Aubry, D. Papageorgiou and P. Petropoulos, *Phys. Rev. Letters,* 2006, 96, 144501; R. Chabreyrie, D. Vainchtein, C. Chandre, P. Singh and N. Aubry, *Physical Review E,* 2008, 77, 036314; and R. Chabreyrie, D. Vainchtein, C. Chandre, P. Singh and N. Aubry, *Mechanics Research Communications,* 2009, 36, 130-137). Particularly, particles can be transported at drops' surfaces rather than within drops, and as we see below, can be delivered relatively easily from that location compared to the core of the drop.

As shown above, particles distributed on the surface of a drop can be concentrated at its poles or the equator by subjecting it to a uniform electric field and that these concentrated particles can then be removed by increasing the electric field intensity. In this Example, we show that the method can be used to separate particles experiencing positive dielectrophoresis on the surface of a drop from those experiencing negative dielectrophoresis, and thus form a composite (Janus) drop in which particles of one type aggregate near the poles and of the second type near the equator. Furthermore, we show that it is possible to selectively remove the particles concentrated near the poles from the drop by further increasing the electric field intensity so that the drop tip-streams. The role of the particles and drop radii, the dielectric constants of the fluids and particles involved and the device size on the electrostatic forces that act on the particles is also investigated. Another goal is to determine the parameters for which the distribution of particles on the surface of a drop can be manipulated and the conditions under which they can be removed from the drop. The approach presented here, in principle, could be helpful in industrial applications to destabilize emulsions, de-foaming (when the formation and presence of drops is undesirable), to remove solid contaminants accumulated on the surface of drops, and to deliver reagents and/or drugs transported on drops' surfaces.

We begin by noting that small particles, i.e., micron and submicron sized particles, are readily trapped in liquid-gas and liquid-liquid surfaces, especially when the contact angle is around 90°. This occurs because once a particle is captured at the interface it remains so under the action of the capillary force which is much stronger than the forces due to random thermal fluctuations. Consequently, drops immersed in another immiscible liquid often carry small particles on their surface. This presence of small particles is advantageous in applications where particles are used to stabilize emulsions whose constituents separate spontaneously when particles are not present (B. P. Binks, Current opinion in *Colloid Interface Sci.,* 2002, 7, 21-41). The role of small particles is thus similar to that of surfactant molecules which are widely used for stabilizing emulsions (B. P. Binks, Current opinion in *Colloid Interface Sci.,* 2002, 7, 21-41; W. Ramsden, *Proc. Roy. Soc*., London, 1903, 72, 156; S. U. Pickering, Emulsions, *Journal Chem. Soc*., London, 2007, 91 (2), 2001; and V. B. Menon and D. T. Wasan, *Colloids Surf.*, Part 1, 1986, 19, 89-105; and N. Yan and J. H. Masliyah, *J. Colloid Interface Sci.,* 1994, 168, 386-392).

Figure 12A:
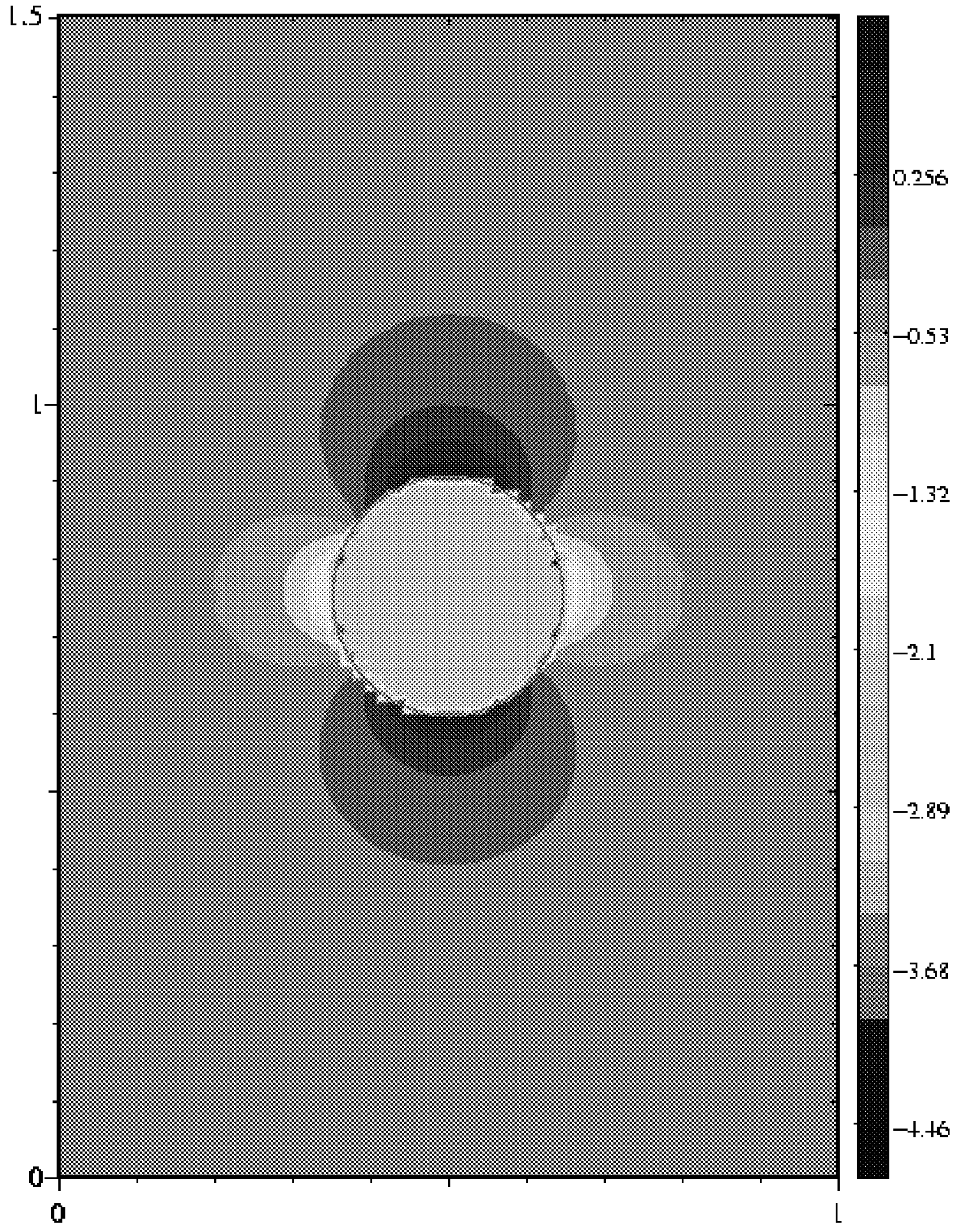
FIG. 12A-12C. Numerically obtained isovalues of the electric field intensity around a drop subjected to a uniform electric field generated by the electrodes placed at the top and bottom of the domain. The dielectric constant of the ambient fluid is assumed to be one. The dielectric constant of the drop in (FIG. 12A) is 2 and in (FIG. 12B) it is 0.5. The electric field is in the z-direction of the coordinate system (FIG. 12C).
Figure 12B:
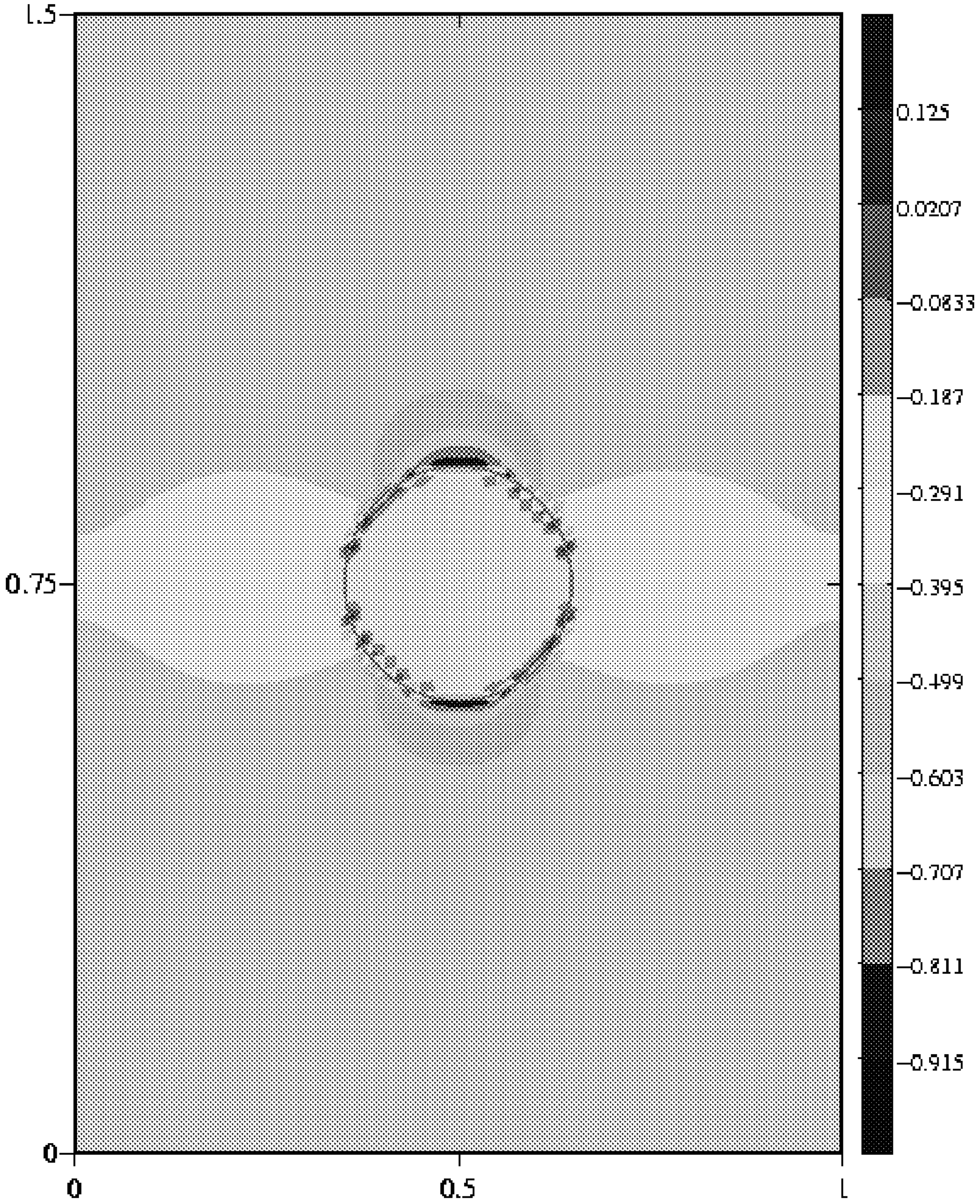
Figure 12C:
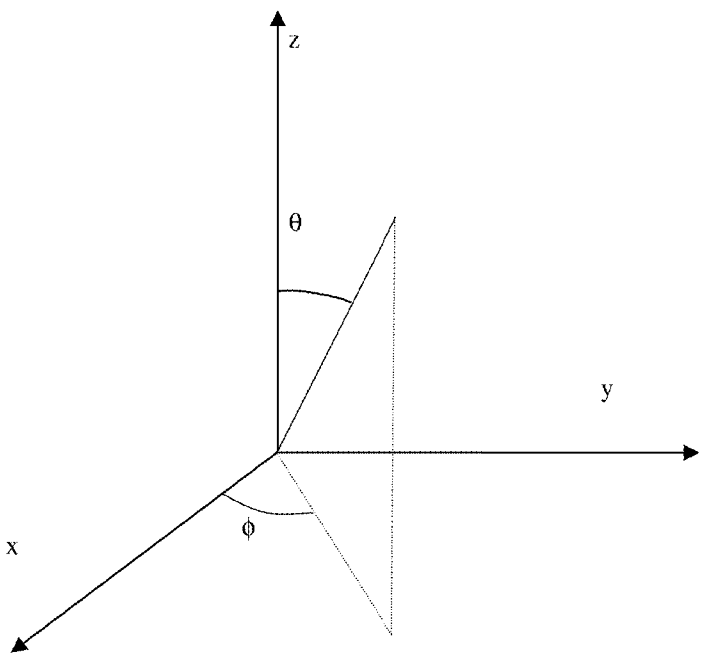
Figure 12D:
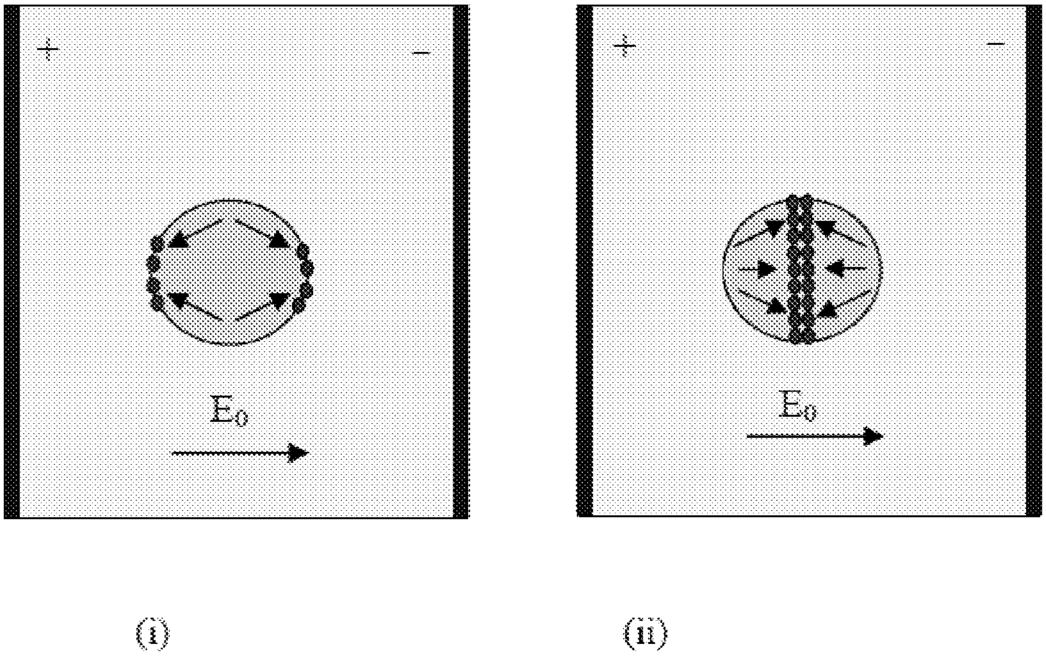
FIG. 12D. Schematic of the dielectrophoretic force induced migration of particles on a drop surface. The figure shows the direction of the motion for particles whose Clausius-Mossotti factor is positive (the direction is the opposite for particles with a negative Clausius-Mossotti factor). The dielectric constant of the ambient fluid is assumed to be one. The dielectric constant of the drop in (i) is greater than one and in (ii) it is less than one.

Let us consider a drop that carries particles on its surface and is immersed in another liquid with which it is immiscible. As described above, the distribution of particles on the drop's surface can be manipulated by applying a uniform electric field. This is possible because although the electric field away from the drop is uniform, its distribution on and near the drop's surface becomes non-uniform because the dielectric constants of the drop and the ambient fluid are different (see FIGS. 12A-12D). This non uniformity of the electric field causes a particle on the surface of the drop to be subjected to a dielectrophoretic (DEP) force. The direction of the force is either towards the equator or the poles depending on the dielectric constants of the involved fluids and particles (see FIGS. 12A-12C). The poles are defined as the two points on the drop's surface where the applied uniform electric field is normal to the drop surface, while the equator is the curve (a circle in case of a spherical drop) at equidistance between the two poles and along which the electric field is tangential to the drop surface. As noted above, if the drop's dielectric constant is smaller than that of the ambient fluid, the modified electric field distribution is such that the electric field near the equator is larger and near the poles it is smaller, compared to the imposed uniform electric field (see FIGS. 12A-12C). On the other hand, if the dielectric constant of the drop is greater than that of the ambient fluid, the electric field is stronger at the poles than it is near the equator.

We next describe the various forces which act on a particle trapped on the drop's surface and define the important dimensionless parameters that govern this problem. This is followed by a brief description of our experimental results.

Electrostatic Forces and Governing Dimensionless Parameters

In one or more drop or bubble et al. one or more drop or bubble the point dipole (PD) approximation was used to obtain an expression for the dielectrophoretic (DEP) force that acts on a particle of radius R trapped on the surface of a spherical drop of radius a (H. A. Pohl, *Dielectrophoresis*, Cambridge university press, Cambridge (1978); D. J. Klingenberg, S. van Swol and C. F. Zukoski, *J. Chem. Physics,* 1989, 91, 7888-7895; J. Kadaksham, P. Singh and N. Aubry, *J. Fluids Eng,* 2004, 126, 170-179; J. Kadaksham, P. Singh and N, Aubry, *Electrophoresis,* 2004, 25, 3625-3632; J. Kadaksham, P. Singh and N, Aubry, *Mechanics Research Communications,* 2006, 33, 108-122; and P. Singh and D. D. Joseph, *J. Fluid Mech.,* 2005, 530, 31-80). The tangential component of the DEP force (in spherical coordinates) depends on the position θ (see FIGS. 12A-12D) and is given by the following expression:

$$F_{DEP,\theta} = -12\pi R^3 \frac{1}{a}\varepsilon_0\varepsilon_c E_0^2 \beta'\beta(2+\beta)\cos\theta\,\sin\theta. \quad (1)$$

Here, $E_0$ is the rms value of the applied AC electric field which is along the z-direction of the spherical coordinate system, $\epsilon_0$ is the permittivity of free space, $$\beta(\omega) = \mathrm{Re}\left(\frac{\varepsilon_d^* - \varepsilon_c^*}{\varepsilon_d^* + 2\varepsilon_c^*}\right)$$

is the drop's Clausius-Mossotti factor, and $$\beta'(\omega) = \mathrm{Re}\left(\frac{\varepsilon_p^* - \varepsilon_c^*}{\varepsilon_p^* + 2\varepsilon_c^*}\right)$$

is the particle's Clausius-Mossotti factor with respect to the outer fluid. Here $\epsilon_c$ is the permittivity of the ambient fluid, $\epsilon^*_p$, $\epsilon^*_d$ and $\epsilon^*_c$ are the frequency dependent complex permittivities of the particle, and the drop and ambient fluids, and ω is the frequency of the AC field applied. The complex permittivity $\epsilon^*=\epsilon-j\sigma/\omega$, where $\epsilon$ is the permittivity, σ is the conductivity and $j=\sqrt{-1}$. The above expression is also valid for a dc electric field in which case $E_0$ denotes the electric field intensity. Notice that the magnitude of the force on a particle of given radius increases with decreasing drop size. Particles trapped on the interface also interact with each other via the dipole-dipole (D-D) forces (N. Aubry and P. Singh, IMECE2007-44095, Proceedings of 2007 ASME International Mechanical Engineering Congress and Exhibition, Seattle, 2007; N. Aubry, P. Singh, M. Janjua, and S. Nudurupati, *Proc. National Acad. Sci.,* 2008, 105, 3711-3714; N. Aubry, and P. Singh, *Physical Review E,* 2008, 77, 056302; and P. Singh and N. Aubry, *Physical Review E,* 2005, 72, 016602; N. Aubry and P. Singh, *Euro Physics Letters,* 2006, 74, 623-629; and S. Nudurupati, N. Aubry and P. Singh, *Journal of Physics D: Applied Physics,* 2006, 39, 3425-3439) (whose magnitude depends on the system parameters) are not included in equation (1). The PD model was shown to be valid to compute the DEP and D-D forces for small particles but for larger particles computations based on the Maxwell stress tensor needs to be conducted (P. Singh and N. Aubry, *Physical Review E,* 2005, 72, 016602; N. Aubry and P. Singh, *Euro Physics Letters,* 2006, 74, 623-629 and S. Nudurupati, N. Aubry and P. Singh, *Journal of Physics D: Applied Physics,* 2006, 39, 3425-3439).

Equation (1) implies that the DEP force is zero both at the poles ($\theta=0,\pi$) and at the equator ($\theta=\pi/2$), and maximum at $\theta=\pi/4$. Furthermore, it implies that if $\beta'\beta>0$, particles aggregate at the poles because they are in a state of stable equilibrium at the poles, and if $\beta'\beta<0$, they aggregate at the equator where their equilibrium is stable (see FIG. 12D).

The fact that the location where a particle moves to depends on the particle's Clausius-Mossotti factor ($\beta'$) can be used, as we discuss below, to separate particles trapped on the surface of a drop for which the sign of $\beta$ is different (N. G. Green, A. Ramos, H. Morgan, *Journal of Electrostatics,* 2002, 56, 235-254; T. Heida, W. L. C. Rutten, E. Marani, *Journal of Physics D: Applied Physics,* 2002, 35, 1592-1602; T. B. Jones, M. Washizu, *Journal of Electrostatics,* 1996, 37, 121-134; and A. Ramos, H. Morgan, N. G. Green, and A. Castellanos, *Journal of Electrostatics,* 1999, 47, 71-81), and this, for instance, can be used to form a composite (Janus) drop for which the areas surrounding the poles and the equator are covered by different types of particles. Furthermore, since $\beta'$ also depends on the frequency of the AC field, this may be achieved by selecting a suitable frequency such that the sign of $\beta'$ is different for the two types of particles to be separated.

To compare the strength of the DEP force with that of gravity and Brownian forces which act on a particle, we next compute the work, $W_{DEP}$, done on a particle by the DEP force in moving it from one of the poles to the equator of the drop. The work done is given by the integral of the dot product of the DEP force with the displacement along a path on the surface of the drop, from $\theta=0$ to $\pi/2$:

$$W_{DEP} = \int_0^{\pi/2} F_{DEP}\, a\, d\theta = -6\pi R^3 \varepsilon_0 \varepsilon_c E_0^2 \beta' \beta (2+\beta). \tag{2}$$

Notice that the work $W_{DEP}$ is independent of the drop radius. The work done in moving a particle from the drop's equator to one of the poles is of the same magnitude but has the opposite sign.

It is possible to manipulate particles trapped on the surface of a drop by applying an electric field only if the DEP force that results is sufficiently large to overcome the particle's buoyant weight. The electric field intensity that is needed to meet this condition can be determined by the requirement that $W_{DEP}$ is greater than the gravitational work done on the particle when it is moved from one of the drop's poles to the equator (or from the equator to one of the poles). The gravitational work done on a particle is given by $$W_G = \frac{4}{3}\pi R^3 (\rho_p - \rho_f) g a.$$

Here g is the acceleration due to gravity, $\rho_p$ is the particle density and $\rho_f$ is the effective fluid density. Using the above expressions, the requirement that the work done by the DEP force must be greater than the gravitational work gives $$6\pi R^3 \varepsilon_0 \varepsilon_c E_0^2 \beta' \beta (2+\beta) > \frac{4}{3}\pi R^3 (\rho_p - \rho_f) g a,$$

which can be rewritten as $$G = \frac{9\varepsilon_0 \varepsilon_c E_0^2 \beta' \beta (2+\beta)}{2a(\rho_p - \rho_f) g} > 1, \tag{3}$$

where G is a dimensionless electric gravity parameter. Notice that the above condition is independent of the particle radius R. It is noteworthy that the electric field intensity required for manipulating particles increases with increasing particle-fluid density difference. The above condition, in fact, implies that a negligibly small electric field is required for manipulating neutrally buoyant particles.

In addition, the previous condition implies that the electric field intensity required for concentrating particles decreases with decreasing drop radius. For example, for $\rho_p-\rho_f=200.0$ kgm$^{-3}$, g=9.81 ms$^{-2}$, $\beta=0.5$, $\beta'=0.5$, $\epsilon_c=2.0$, the electric field intensity required for a=1.0 mm is 595.4 kV/m, and for a=1.0 μm it is 18.8 kV/m. The electric field strength for the last case is about 32 times weaker than for the first case. This is an important result which implies that the electric field intensity required for manipulating micro emulsions is smaller than for emulsions containing larger sized droplets.

Another force, which is especially relevant for submicron and nano sized particles, is the Brownian force. The DEP force can be used to concentrate small particles on the surface of a drop only if the work done by the DEP force, $W_{DEP}$, is greater than kT, where k is the Boltzman constant and T is the temperature. Let us assume that $\beta=0.5$, $\beta'=0.5$, $\epsilon_c=2.0$, T=300 K, kT=$4.28\times10^{-21}$, and E=$1.0\times10^6$ V/m. Then, for R=1 μm, $W_{DEP}=4.9\times10^4$ kT and for R=100 nm, $W_{DEP}=48.7$ kT. This shows that for these parameter values the DEP force is large enough to overcome the random Brownian forces that act on a 1 μm and even 100 nm sized particle trapped on the surface of a drop.

Once particles concentrate near the poles or the equator of the drop, the electric field strength is increased further to a level above a critical value at which the drop either breaks near the middle or undergoes tip streaming, thus leading to the removal of particles concentrated near the equator or the poles. A drop placed in a uniform electric field deforms because the electric stress distribution on its surface is non-uniform. The deformed shape, assuming that the deformation is small, was determined in (C. T. O'Konski, and H. C. Thacker, *J. Phys. Chem.,* 1953, 57, 955-958; C. G. Garton, and Z. Krasuchi, *Proc. Roy. Soc. London A.,* 1964, 280, 211-226; G. Taylor, *Proc. Royal Soc. London A, Mathematical and Physical Sciences,* 1966, 1425, 159-1966; R. S. Allan and S. G. Mason, *Proc. Royal Soc. London A, Mathematical and Physical Sciences,* 1962, 267, 45-61; S. Torza, R. G. Cox and S. G. Mason, *Phil. Trans. Royal Soc. of London A, Mathematical and Physical Sciences,* 1971, 269, 295-319; J. R. Melcher and G. I. Taylor, *Annu. Rev. Fluid Mech.,* 1969, 1, 111-146 (1969); J. D. Sherwood, *J. Fluid Mech.,* 1988, 188, 133-146; D. A. Saville, *Annu. Rev. Fluid Mech.,* 1997, 29, 27-64; A. A. Darhuber and S. M. Troian, *Annu. Rev. Fluid Mech.,* 2005, 37, 425-455; and P. Singh and N. Aubry, *Electrophoresis,* 2007, 28, 644-657) by the balance of the surface tension force, which tends to make the drop spherical, and the force due to the electric stress, which tends to elongate the drop (R. S. Allan and S. G. Mason, *Proc. Royal Soc. London A, Mathematical and Physical Sciences,* 1962, 267, 45-61). The following expression for the drop deformation was obtained $$D = \frac{9}{16} We \tag{4}$$

where $$We = \frac{a\varepsilon_0\varepsilon_c E_0^2 \beta^2}{\gamma}$$

is the electric Weber number and γ is the interfacial tension between the two fluids. The deformation is defined by the parameter $$D = \frac{L - B}{L + B},$$

where L and B are the major and minor axes of the ellipsoidal drop, respectively, assuming that the shape of the drop is approximately ellipsoidal and its equatorial diameters are the same. The deformation parameter D varies between 0 and 1; for a spherical drop, D is zero and its value increases with increasing deviation from the spherical shape.

Furthermore, for certain cases, such as for a water drop immersed in corn oil, there is a critical Weber number at which the drop begins to tip-stream or break (G. Taylor, *Proc. Royal Soc. London A, Mathematical and Physical Sciences,* 1964, 280, 383-397; O. A. Basaran and L. E. Scriven, *J. Colloid Interface Sci.,* 1990, 140, 10-30; J. Fernandez de la Mora, *Annual Rev. Fluid Mech.,* 2007, 39, 217-243; S. N. Reznik, A. L. Yarin, A. Theron and E. Zussman, *J. Fluid Mech.,* 2004, 516, 349-377; F. K. Wohlhuter and O. A. Basaran, *J. Fluid Mech.,* 1992, 235, 481-510; and J. C. Baygents, N. J. Rivette and H. A. Stone, *J. Fluid Mech.,* 1998, 368, 359-375). Let the critical Weber number at which this happens be $We_{crit}$, a critical value that we report below. For convenience, we define a scaled electric Weber number $$We' = \frac{We}{We_{crit}}$$

so that the drop breakup or tip-streaming occurs when We'=1.

It is noteworthy that the electric Weber number (We) and the electric gravity parameter (G) both increase as the square of the electric field intensity. The former determines the electric field intensity at which a drop tip-streams or breaks, and the latter determines the intensity that is needed to manipulate particles. Therefore, depending on the physical properties of the drop and ambient fluids and those of the particles involved, the electric field intensity at which a drop begins to tip-stream can be smaller than the intensity that is needed for manipulating particles. This, in fact, occurred in our experiments for glass particles trapped on the surface of a water drop when the drop diameter was ~1 mm or larger. The drop was immersed in corn oil. The drop tip-streamed at an electric field intensity which was smaller than that needed for manipulating glass particles, and therefore it was not possible to concentrate them. It was only after the drop radius had been reduced, as discussed below, that it was possible to manipulate particles on the surface of the drop.

The ratio of the scaled electric Weber number to the electric gravity parameter can be used to define another dimensionless parameter that quantifies the relative importance of the drop's tendency to tip-stream or break and the tendency of particles to concentrate near the poles or the equator of the drop:

$$\frac{We'}{G} = \frac{2a^2}{9\gamma} \frac{(\rho_p - \rho_f)g}{\beta'\left(\frac{2}{\beta} + 1\right)We_{crit}} \tag{5}$$

Notice that the ratio $$\frac{We'}{G}$$

only depends on the physical properties of the two fluids and the particles involved. When $$\frac{We'}{G} < 1,$$

the drop is not expected to break or tip-stream for the electric field intensity that is needed for concentrating particles on the drop's surface. This is the case when the interfacial tension γ is sufficiently large, the drop radius is sufficiently small, or the density difference $\rho_p - \rho_f$ is sufficiently small. In fact, neutrally buoyant particles can be manipulated for any value of the drop radius. On the other hand, when $$\frac{We'}{G} < 1,$$

the drop breaks or tip-streams for an electric field intensity that is smaller than that needed for concentrating particles on the surface of the drop.

Furthermore, for a given set of ambient fluid, drop and particles, there is a unique critical drop radius for which $$\frac{We'}{G}$$

is equal to one. From (5), the critical radius is given by $$a_{crit} = 3\left(\frac{\gamma\beta'\left(\frac{2}{\beta} + 1\right)We_{crit}}{2(\rho_p - \rho_f)g}\right)^{\frac{1}{2}} \tag{6}$$

If the drop radius is much smaller than $a_{crit}$, the drop is not significantly deformed for the electric field intensity that is required for concentrating particles. However, if the radius is larger than $a_{crit}$, the drop tip-streams at an intensity that is smaller than that required for concentrating particles. Clearly, for the latter case, it is not possible to concentrate particles trapped on the surface of a drop. Furthermore, as discussed below, it is only when the drop radius is smaller than $a_{crit}$ that we can first concentrate and then remove particles from the surface of the drop by further increasing the electric field intensity, the latter step being possible only if the drop breaks or tip-streams.

Experimental Setup and Results

Figure 13:
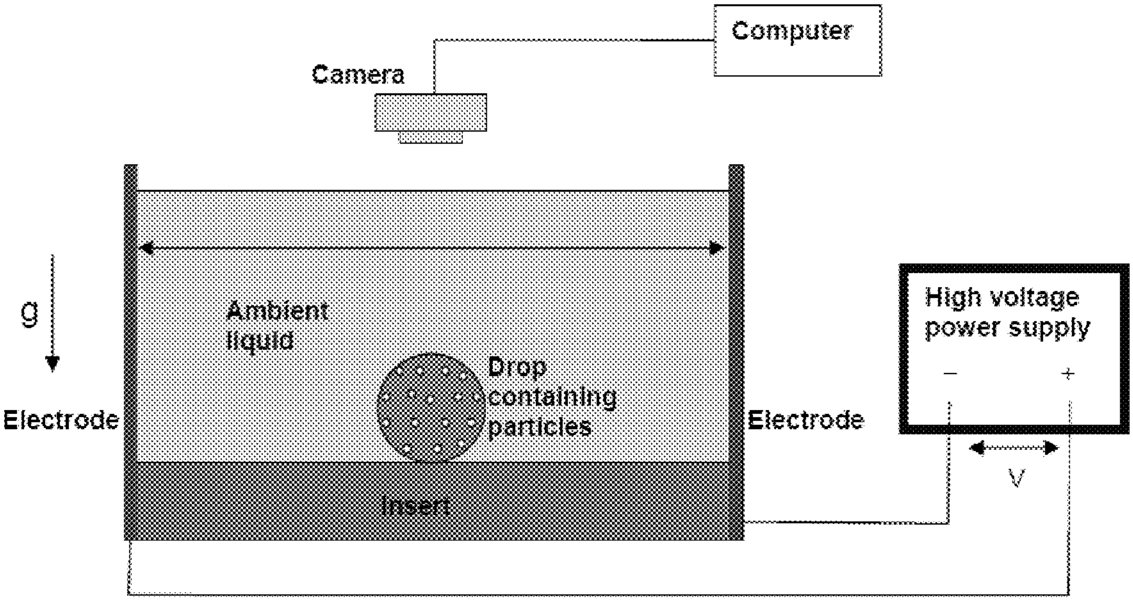
FIG. 13. Schematic of the setup used in our experiments. The electrodes were mounted on the left and right sidewalls. The electric field was in the horizontal direction, and thus the drops also stretched in that direction. The drop deformation and the motion of particles were recorded using the camera mounted above. An insert was used to ensure that the vertical position of the drop was near the middle of the electrodes. The material used for the insert was such that its dielectric constant was close to that of the ambient liquid.

We begin by describing the experimental procedure employed to investigate the influence of an externally applied electric field on the distribution of particles on the surface of a drop, and the role of various parameters in the process. Experiments were conducted in several devices with rectangular cross-sections in which the electrodes were mounted on the side walls (see FIG. 13). The distance between the electrodes was varied between 2.6 mm and 6.5 mm. The depth of the devices was 6.5 mm and the length 41 mm. The depth of the ambient liquid was approximately 5.5 mm. A variable frequency AC signal generator (BK Precision Model 4010A) was used along with a high voltage amplifier (Trek Model 5/80) to apply voltage to the electrodes. The frequency used in all of our experiments was 100 Hz or 1 kHz. The use of an AC field ensured that the role of conductivity and the drop's electric charge, if any, was negligible. The motion/deformation was recorded using a digital color camera connected to a Nikon Metallurgical MEC600 microscope. The uncertainty in the diameter of a drop obtained using the digital images was ±3.4 μm.

Drops of various sizes were formed at a small distance from the bottom surface by injecting a given amount of liquid into the ambient liquid with a micro-syringe (see table). The density and viscosity of the drops were not equal to the corresponding values for the ambient liquids. In fact, the ambient and drop liquids were selected so that the drop density was slightly larger, which ensured that the drop did not levitate. For all cases reported in this paper, drops were allowed to settle to the bottom of the device. The bottom surface was made hydrophobic by covering it by a layer of Polytetrafluoroethylene (PTFE).

TABLE 1

Properties of liquids used.

| Liquid | Density | Dielectric | Conductivity |
|---|---|---|---|
| Millipo | 1.00 | 80.0 | $5.5 \times 10^6$ |
| Silicon | 0.963 | 2.68 | 2.67 |
| Decane | 0.73 | 2.0 | $2.65 \times 10^4$ |
| Castor | 0.96 | 6.0 | 32.0 |
| Corn | 0.92 | 2.87 | 32.0 |

In our experiments, a drop with particles distributed on its surface was formed using the following procedure. The first step was to form a dilute suspension by mixing particles in the liquid that was to be used to form the drop. The particle concentration for the suspension was kept small to ensure that the concentration of particles on the surface of the formed drop was small. A fixed volume of this suspension was then injected into the ambient liquid by using a micro-syringe. Since the drop density was slightly larger than that of the ambient liquid, the drop, after being formed, sedimented to the bottom surface of the device. The particles suspended inside the drop sedimented along with the drop. In some experiments, a drop containing two types of particles was formed by merging two or more smaller drops, each containing particles of different types. This ensured that there were enough particles of each type and also ensured that they were not completely mixed. Although our experimental setup did not allow us to photograph the side view of the drops, we assume that the drops were deformed from the spherical shape due to their buoyant weights.

We then waited several minutes until all particles suspended inside the drop reached either the bottom or the top surface of the drop, depending on the density of the particles compared to that of the drop. Once a particle was trapped at the two-fluid interface, it remained there due to the interfacial tension, even when the electric field was switched on. The position of a particle within the interface is determined by the three-phase contact angle on its surface and its buoyant weight (P. Singh and D. D. Joseph, *J. Fluid Mech.,* 2005, 530, 31-80).

We also wish to mention that relatively large sized particles were used in our experiments to make sure that we were able to visually monitor their motion after the electric field was applied and thus understand the mechanisms by which particles migrated along the surface of the drop, influenced the drop deformation and were subsequently removed from the drop. However, since the diameter of the particles used was between 4 and 70 microns, their buoyant weight was not negligible and thus, as noted above, particles either settled or rose under the action of gravity. When an electric field was applied they moved along the surface of the drop under the action of the dielectrophoretic force. We expect smaller, submicron sized particles, for which the buoyant weight is negligible, to behave similarly.

Results

We next describe the results of our experiments aimed at concentrating particles near the poles or the equator of a drop by applying a uniform electric field, and for separating particles for which the sign of the Clausius-Mossotti factor is different, and then removing them from the drop by further increasing the electric field intensity.

Influence of Particles on the Electric Field Induced Drop Deformation

Figure 14:
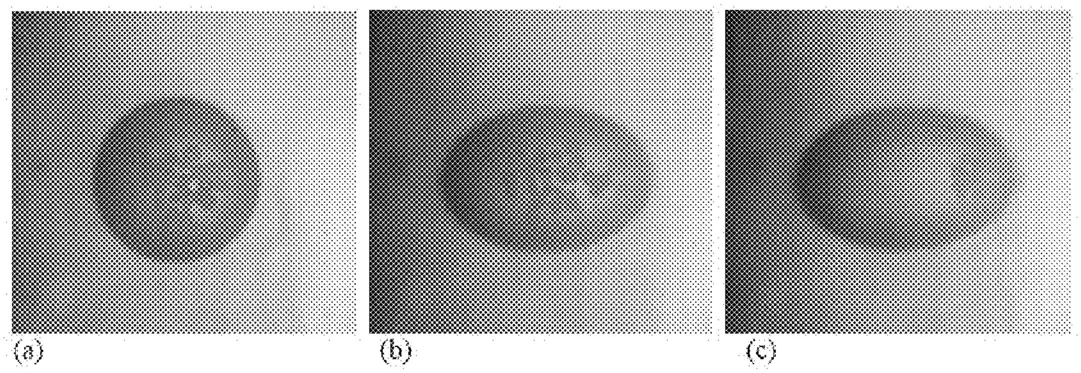
FIG. 14. Deformation of a water drop immersed in corn oil. The drop carried extendospheres on its surface which rose to its top surface as they were lighter than both liquids. The electrodes were mounted on the left and right side walls of the device, and the distance between them was 6.5 mm. The diameter of extendospheres was ~90 μm. (a) The applied voltage was zero and the deformation parameter D=0. The drop diameter was 944 μm. (b) At t=5 s, shortly after an AC voltage of 3600 V at 100 Hz was applied, the drop was significantly elongated, but the particles were still located near the center of the drop. The drop deformation parameter was D=0.179. (c) t=60 s. The voltage applied was still 3600 V. Notice that particles have already reached the poles, although a larger fraction has gone to the right pole. The drop deformation parameter was D=0.207, which was greater than in (b) as D continued to increase while the particles moved towards the poles. The local radius near the poles was smaller than for the corresponding case without particles shown in FIG. 15.

We first consider a water drop of diameter 945 μm suspended in corn oil which contained extendospheres on its surface. The drop sedimented to the bottom of the device as its density was greater than that of corn oil. Due to their relatively low density (0.91), extendospheres rose to the top surface of the water drop where they were trapped (see FIG. 14*a*). Experiments were conducted in a device for which the electrodes were mounted on the left and right sidewalls, thus making the applied uniform electric field horizontal. Hereafter, we define the drop's poles as the left and right most points on its surface. Since the dielectric constant of the drop is greater than that of the ambient liquid, the maximum value of the electric field occurs at the poles of the drop. For extendospheres, the Clausius Mossotti factor is such that $\beta'>0$, and thus the particles were expected to undergo positive dielectrophoresis and collect at the poles. This is indeed what happened in FIG. 14*b* which shows that after an AC electric field with a frequency of 100 Hz was switched on, the DEP force caused the particles to move towards the poles.

The non uniform electric stress distribution on the surface of the drop caused it to stretch in the direction of the applied electric field. FIG. 14*b*, taken at t=5 s, shows that the drop stretched to an approximately ellipsoidal shape with the deformation parameter D=0.179. Notice that in FIG. 14*b* particles have started to move towards the poles, while remaining trapped at the drop's surface during this motion. The drop deformation continued to increase as the particles migrated. It took approximately 60 s for all the particles to collect near the poles, and the drop reached a steady shape only after that time. The deformation parameter of the drop for the steady shape (reached at t=60 s) was 0.207 (see FIG. 14*c*).

Figure 15:
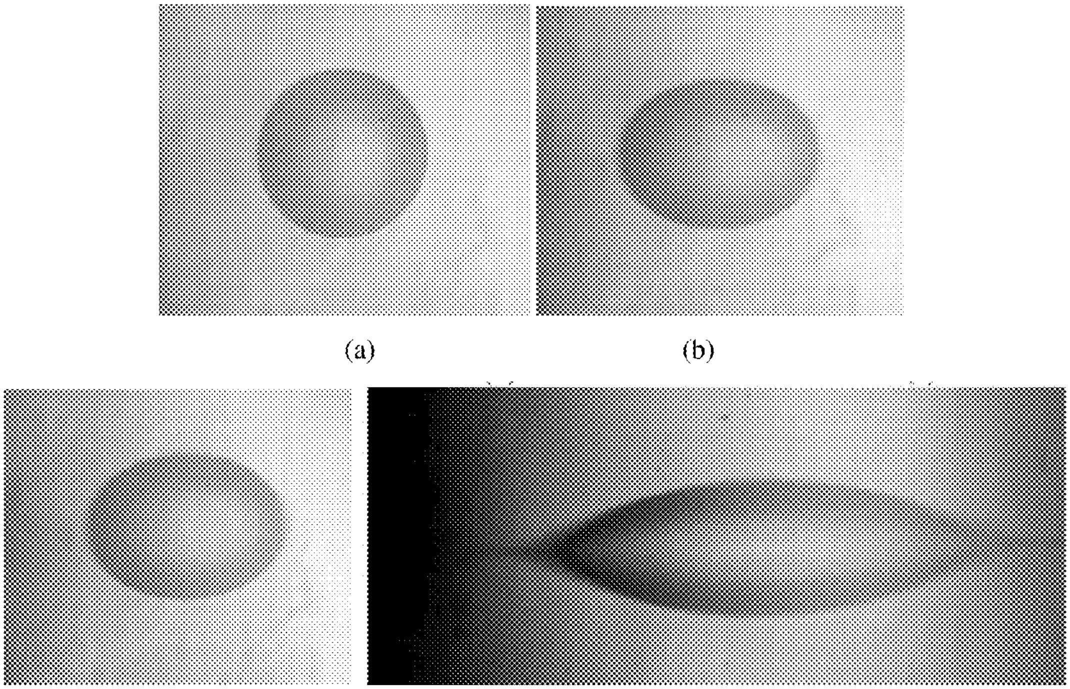
FIG. 15. Deformation of a water drop immersed in corn oil. The electrodes were mounted on the left and right side walls of the device, and the distance between them was 6.5 mm. (a) The voltage applied was zero and D=0. The drop diameter was 954 μm. (b) t=5 s. Shortly after an AC voltage of 3600 V at 100 Hz was applied, the drop became elongated with the deformation parameter D=0.150. (c) t=120 s. The voltage applied was 3600 V at 100 Hz and D=0.150, which was the same as in (b). This indicates that the drop deformation did not change after 5 seconds. (d) For another case, when a voltage of 4700 V at 100 Hz was applied the drop formed pointed ends (Taylor cones) and the fluid was ejected from the tips of the conical ends.

To further investigate the influence of particles on the drop deformation, we considered a clean drop (without particles) of the same approximate radius which was subjected to the same electric field intensity (see FIG. 15*a*). The deformation parameter in FIG. 15*b* at t=5 s was D=0.150 which did not change afterwards; its value is the same in FIG. 15*c* at t=120 s. This, however, was not the case for the drop containing particles described in FIG. 14 which continued to deform while the particles migrated to its poles. Also notice that the steady state value of the deformation parameter for the drop containing particles was 0.207, which is larger than the value of D=0.150 corresponding to a clean drop. Therefore, the presence of particles in this case caused an increase of the drop deformation.

The fact that the drop deformation continued to increase while the particles migrated to the poles suggests that the presence of particles near the poles results in an additional electric force to act on the drop which, for the above case, is in the direction of the outward pointing normal to the drop's surface and thus causes an increase in the drop deformation. Moreover, some of the particles protruded out of the drop's surface when the electric field was present (see FIG. 14*c*), which we postulate is due to the buckling of the layer of particles (trapped at the interface under the action of capillary forces) due to the compressive electric forces.

FIG. 15*d* shows that when the applied voltage was increased to 4700 V the drop developed conical ends, referred to as Taylor cones, and subsequently a fraction of the fluid inside the drop was ejected out of the conical ends (G. Taylor, *Proc. Royal Soc. London A, Mathematical and Physical Sciences,* 1964, 280, 383-397). This phenomenon has been used in many practical applications, e.g., for creating small droplets, spraying and generating thrust (G. Taylor, *Proc. Royal Soc. London A, Mathematical and Physical Sciences,* 1966, 1425, 159-1966; R. S. Allan and S. G. Mason, *Proc. Royal Soc. London A, Mathematical and Physical Sciences,* 1962, 267, 45-61; S. Torza, R. G. Cox and S. G. Mason, *Phil. Trans. Royal Soc. of London A, Mathematical and Physical Sciences,* 1971, 269, 295-319; J. R. Melcher and G. I. Taylor, *Annu. Rev. Fluid Mech.,* 1969, 1, 111-146 (1969); O. A. Basaran and L. E. Scriven, *J. Colloid Interface Sci.,* 1990, 140, 10-30; J. Fernandez de la Mora, *Annual Rev. Fluid Mech.,* 2007, 39, 217-243; S. N. Reznik, A. L. Yarin, A. Theron and E. Zussman, *J. Fluid Mech.,* 2004, 516, 349-377; F. K. Wohlhuter and O. A. Basaran, *J. Fluid Mech.,* 1992, 235, 481-510; and J. C. Baygents, N. J. Rivette and H. A. Stone, *J. Fluid Mech.,* 1998, 368, 359-375). Notice that the final drop volume was smaller.

Figure 16:
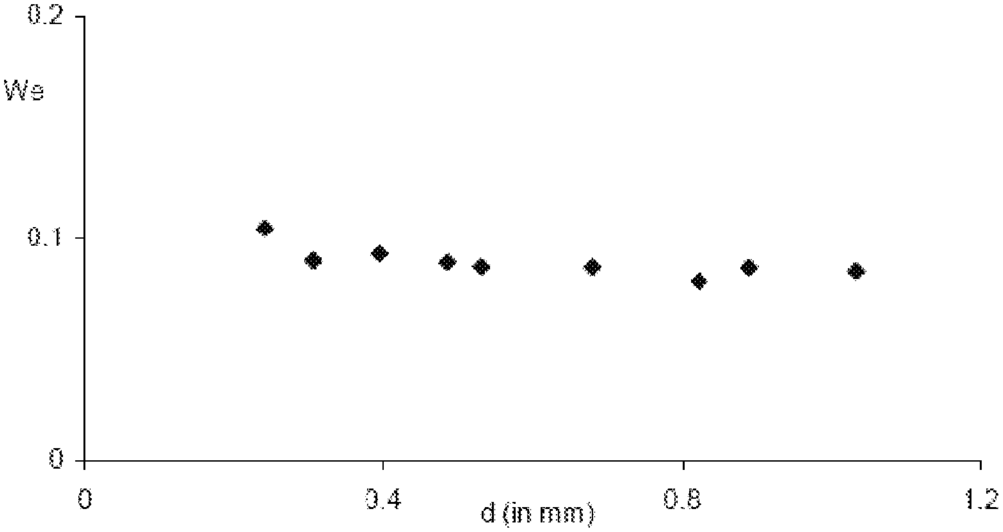
FIG. 16. The electric Weber number at which tip-streaming occurred for a water drop immersed in corn oil is plotted as a function the drop diameter. The critical Weber number based on this data is approximately 0.085. The frequency was 100 Hz. The distance between the electrodes was 6.05 mm.

In our experiments, the electric field intensity at which tip-streaming occurred increased with decreasing drop size. In addition, as FIG. 16 shows, the intensity at which tip-streaming occurred varied so that the electric Weber number remained approximately constant. The critical Weber number $We_{crit}$ for these experiments was approximately 0.085. This dependence on the electric field intensity at which a drop tip-streams on the drop radius is in agreement with past experimental and theoretical studies. Also notice that there was a slight decrease in $We_{crit}$ as the drop size increased. This may be a result of the fact that the larger sized drop deforms more under gravity, and as a result, the electric field necessary to cause tip-streaming is smaller.

For the case described above, the drop was immersed in a liquid whose dielectric constant was smaller than that of the drop itself. We next describe the case of a silicon drop immersed in castor oil for which the dielectric constant of the liquid is larger than that of the drop. In this case, the maximal and minimal values of the electric field are located at the equator and the poles, respectively. The drop diameter was 945 μm and it contained polystyrene particles on its surface (see FIG. 17*a*). The drop settled to the bottom of the device as its density was greater than that of castor oil. The density of polystyrene spheres was larger and so they sedimented to the bottom surface of the drop.

Figure 17:
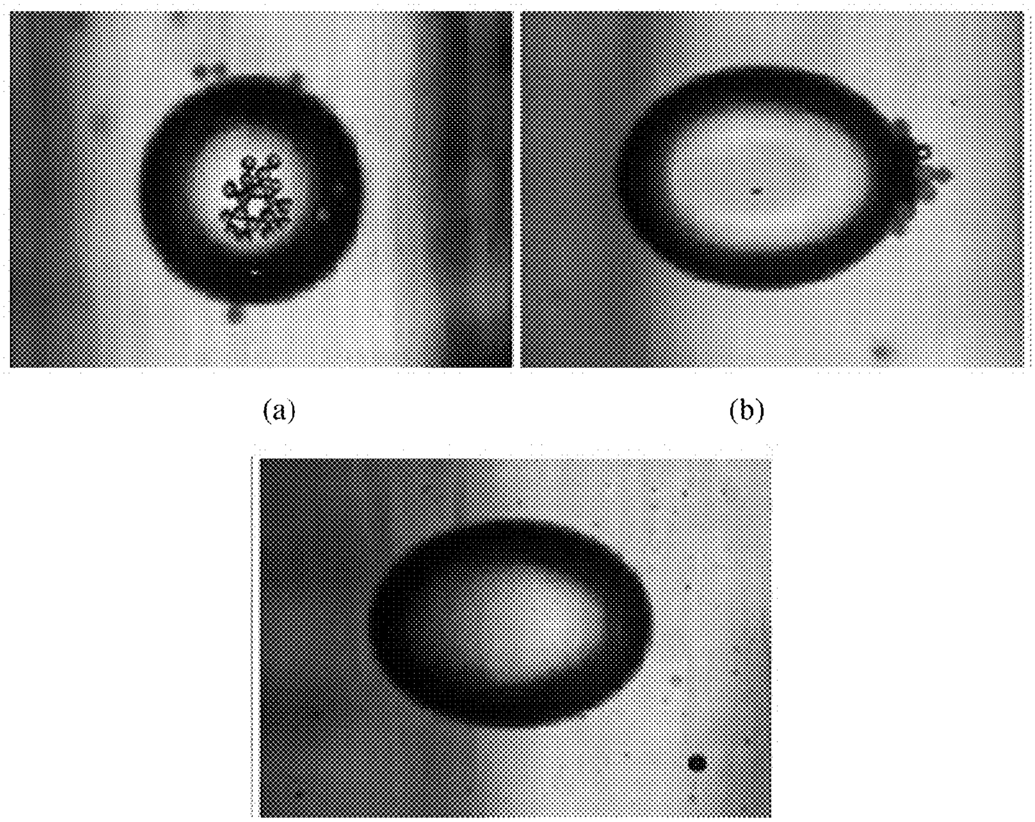
FIG. 17. Deformation of a silicone oil drop immersed in castor oil. The electrodes were mounted on the left and right side walls of the device, and the distance between them was 6.5 mm. (a) The voltage applied was zero. The drop contained polystyrene particles and its diameter was 945 (b) After an AC voltage of 5000 V at 100 Hz was applied, the drop became elongated with the steady state value of the deformation parameter D=0.106. Notice that particles formed chains and moved together towards the right pole because of particle-particle interactions. (c) Deformation of a clean drop (without particles) for 5000 V at 100 Hz. The diameter of the initial (undeformed) drop was 901 μm. The steady state value of the deformation was D=0.128.

After an AC electric field with a frequency of 100 Hz was switched on, all particles migrated under the action of the DEP force to the poles where the electric field intensity is minimal (see FIG. 17*b*). Polystyrene particles experienced negative dielectrophoresis because their dielectric constant is smaller than that of the ambient liquid. The steady state value of the drop deformation parameter was 0.106 which was attained after all the particles reached the poles. The corresponding deformation for the case without particles was 0.128. Therefore, in this case, the presence of particles caused a decrease in the drop deformation. Recall that for the case in which the drop's dielectric constant is larger than that of the ambient fluid the presence of particles experiencing positive dielectrophoresis near the poles caused an increase in the drop deformation (see FIG. 14). The drop deformation in FIG. 17 did not significantly change while particles migrated to the poles. This is different from the case described in FIG. 14 in the sense that the drop deformation changed while particles migrated to the poles. Also notice that the attractive dipole-dipole interactions among polystyrene particles are relatively larger and therefore they clustered and moved together to the right pole. Here we also wish to note that for our experiments the change in the drop deformation due to the presence of particles was insignificant when they concentrated near the equator on the drop's surface.

Dependence of the DEP Force on the Particle Radius

As discussed above, the electric field intensity required to manipulate particles is independent of the particle radius (see Equation (3)). To validate this result, we measured the electric field intensity needed to move a glass particle from the bottom of a water drop to one of its poles. The drop was immersed in corn oil. Three different glass spheres with the diameters of 45, 64 and 106 μm were considered. The density of glass spheres was 2.6 $g/cm^3$. The drop diameter was held approximately constant around 500 μm. All other parameters were held fixed in this study. The glass particles were allowed to sediment to the bottom of the drop, and the drop itself sedimented to the bottom of the device.

To accurately determine the minimal voltage (within 10 V) needed to move a glass sphere from the equator to the drop's pole, the drop was initially subjected to a voltage of 2000 V and then the applied voltage was increased in 10 V increments. When the applied voltage reached 2450 V, the glass sphere in a drop of diameter 497 μm moved to the drop's left pole. The glass sphere was expected to move to one of the poles since it was subjected to positive dielectrophoresis and the drop's dielectric constant was greater than that of the ambient liquid. The above experiment was repeated for two other glass spheres of larger diameters. The voltage required for moving the glass sphere of diameter 64 μm was 2590 V, and for the sphere of diameter 105 μm it was 2530 V. The drop diameter for the former case was 500.0 μm and for the latter was 498 μm. These results show that the electric field intensity needed to manipulate a particle is indeed approximately independent of the particle radius. This is an important result because it implies that the same electric field intensity can be used to manipulate both smaller and larger sized particles adsorbed on the surface of a drop.

Dependence of the DEP Force on the Drop Radius

According to Equation (1), the DEP force acting on a particle is inversely proportional to the drop radius. To verify the validity of this equation, we conducted experiments in which the electric field intensity needed to move a particle from the drop's equator to its pole was measured as a function of the drop radius. To ensure that the particle's properties did not change, the same extendosphere was used throughout the experiment while the diameter of the water drop was varied between 390 μm and 700 μm by injecting or removing water from the drop. The drop was immersed in corn oil. For the results presented in FIG. 18 the radius of the extendosphere was 130 μm. While the study was repeated for several extendospheres of slightly different diameters, the results obtained are not shown here as they were similar.

Figure 18:
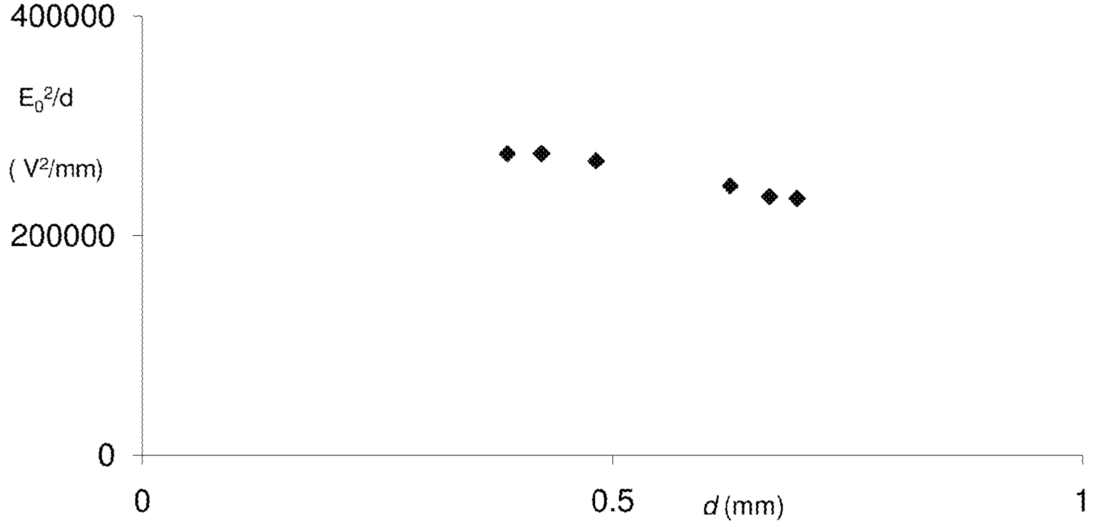
FIG. 18. The square of the electric field intensity ($E_0$) needed to move a fixed extendosphere from the drop's equator to a pole divided by the drop diameter (d) is plotted as a function of the drop diameter. The frequency of the AC field was 100 Hz. The diameter of the extendosphere was 130 μm. The drop was immersed in corn oil. The figure shows that when the drop diameter was varied between 0.39 and 0.7 mm, $$\frac{E_0^2}{d}$$

FIG. 18 shows that the electric field intensity ($E_0$) needed to move an extendosphere from the drop's equator to its pole varied with the drop diameter d so that $$\frac{E_0^2}{d}$$

was approximately constant. Since these results were obtained for a fixed particle and only the drop diameter was varied, all other parameters, including the particle's buoyant weight, remained constant. As noted earlier, to move a particle from the drop's equator to its pole, the DEP force must overcome the buoyant weight of the particle, which remained constant. Our experimental results therefore are in agreement with Equation (1). The inverse dependence of the DEP force on the drop diameter is an important result because it implies that particles distributed on the surface of micron sized droplets can be manipulated by applying a smaller electric field intensity than that needed for millimeter sized droplets.

Removal of Particles from the Surface of a Drop

We next present results illustrating the removal (from the drop) of particles concentrated either near the poles or the equator of a drop. This was achieved by increasing the electric field strength to another critical value so that the electric Weber number was larger than the critical value $We_{crit}$. The approach, obviously, is likely to work only if the drop tip-streams or breaks when a sufficiently strong electric field is applied. In addition, as discussed in section 2, the drop radius must be smaller than the critical radius given by Equation (6), because otherwise the drop breakup or tip-streaming would occur for a smaller electric field intensity than that required for concentrating particles.

Removal of Particles Concentrated at the Poles

Figure 3:
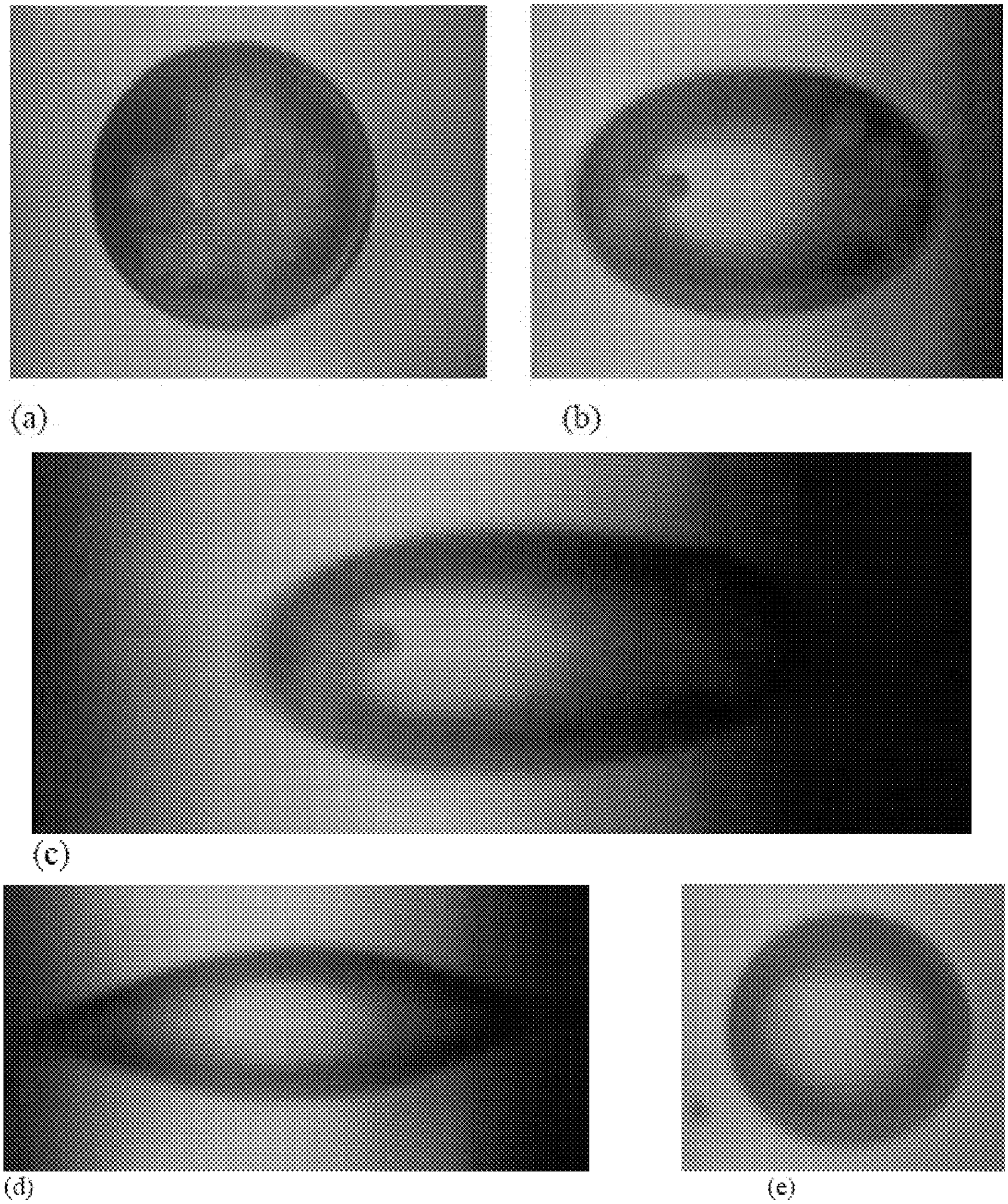
FIG. 3. Removal of extendospheres from a water drop immersed in decane. The electrodes were mounted on the left and right side walls of the device, and the distance between them was 6.5 mm. (a) The drop diameter was 933 μm. The initial distribution of extendospheres on the drop's top surface. The voltage applied was zero. (b) The voltage applied was 3000 V at 1 kHz. Particles moved towards the two poles. (c) The voltage applied was 3500 V at 1 kHz. All of the particles accumulated at the two poles and formed particle chains. Notice that the radius of curvature near the poles was smaller, and the deformation is larger than in (b). (d) Shortly after the voltage of 3800 V at 1 kHz was applied, the drop shape near the poles became conical, and all of the particles had already ejected from the drop via tip-streaming. (e) After the electric field was switched off, the drop assumed a spherical shape. The drop was clean and its diameter was 833 μm.

In FIG. 3 we describe the case of a water drop suspended in decane which contained extendospheres on its surface. FIG. 3*a* displays the initial distribution of particles at the drop surface. The dielectric constant of the drop being larger than that of the ambient fluid, the electric field was maximal at the poles. After the electric field was switched on, the drop elongated in the field direction and particles started to move towards the poles (see FIGS. 3*b, c*). For extendospheres β'>0, and so as expected the spheres experienced positive dielectrophoresis. FIG. 3*c*, corresponding to the case of a larger voltage, shows that particles had already aggregated near the poles.

The radius of curvature at the poles decreased with increasing voltage and ultimately led to the formation of Taylor cones at the two ends of the drop when a voltage of 3800 volts was applied (see FIG. 3*d*). The drop's liquid was then ejected out of the conical ends, and along with the liquid all the particles aggregated near the poles were also ejected by means of a tip-streaming mechanism. In this case, since all the particles were already concentrated near the poles before tip-streaming occurred, they were all ejected and the final drop was free of particles. The particles ejected from the drop then rose individually to the top surface of decane as they were lighter than the ambient liquid, thus separating themselves from the liquid. We also observed that after the particles were ejected there were small droplets present which were formed because the drop lost not only the particles but also some of the liquid. The final drop size in FIG. 3*e*, which was taken after the electric field had been switched off, was therefore smaller than the drop's initial size (FIG. 3*a*). The above method offers a systematic way for removing particles from the surface of drops in a contactless fashion.

It was noted in FIG. 16 that the electric field intensity at which the drops started to tip-stream decreased with increasing drop radius so that the electric Weber number (corresponding to tip-streaming) was approximately constant. Furthermore, we found that applying a voltage that was sufficiently large to cause tip-streaming right away did not provide an effective method for removing particles from the surface of the drop. This is due to the fact that in this case particles did not have sufficient time to move to the poles and as a result the fluid inside the drop alone was ejected during tip-streaming. For the method to work properly, the voltage needs to be increased in two steps. In the first step, the drop must be subjected to a sufficiently large voltage for a certain period of time during which all the particles accumulate near the poles without causing tip-streaming. Only then a higher voltage, that causes the accumulated particles to tip-stream, should be applied to remove the latter from the drop.

Removal of Particles Concentrated Near the Equator

In order to address the removal of particles concentrated near the equator, we used a device whose electrodes were separated by a smaller distance. Specifically, our experiments showed that when the distance between the electrodes is about three times the drop diameter or smaller the drop bridged the gap between the electrodes when a sufficiently high voltage was applied and subsequently broke-up into two or three major droplets. On the other hand, when the distance was about more than five times larger than the drop diameter only tip-streaming occurred when the applied voltage was above a critical value. In a smaller device, there is an increase in the electric field intensity in the gap between the electrodes and the drop's surface, and this increases the stretching due to the electrostatic force experienced by the drop causing it to bridge the gap between the electrodes and subsequently break in the middle due to the capillary instability. Our experiments described below showed that when particles were located approximately in the middle of the drop, after the drop broke they were contained within a smaller droplet in between the two larger sized droplets.

We first describe the case of a water drop, carrying polystyrene particles, immersed in corn oil. Since the density of polystyrene particles is 1.05 which is larger than that of the liquids involved, particles settled to the bottom surface of the drop (FIG. 19*a*). When a voltage of 1400 volts was applied, the drop elongated and particles began to collect near the equator at the bottom surface of the drop (FIG. 19*b*). This shows that particles experienced negative dielectrophoresis as well as the buoyancy forces which were non-negligible.

For a voltage of 1800 volts, the drop deformation was even larger and particles collected in a ring shaped region near the equator. The drop continued to stretch until it bridged the gap and assumed a dumbbell like shape. The filament in between the two ends of the dumbbell continued to thin with time and eventually the capillary instability caused it to break near the middle. The breakup near the middle occurred quickly after the filament diameter became smaller than the thickness of the region occupied by the particles. The size of the middle droplet, as discussed below, was found to increase with increasing concentration of particles. The middle droplet was formed because not all of the fluid and none of the particles contained in the filament were transferred to the two main droplets. The last photograph in FIG. 19*c* shows that the drop has broken into three major droplets and a few additional smaller droplets. All of the particles were contained in the smaller central droplet or were around it, and the two larger droplets on the sides were clean. Notice that the particle concentration in the middle droplet is rather large as most of the liquid was transferred to the two larger drops and this caused some of the particles to be expunged from the drop's surface into the outside ambient fluid.

FIG. 20 describes a similar process for a water drop suspended in corn oil, with extendospheres on its surface. Extendospheres rose to the top surface of the drop as their density was smaller than that of the drop and ambient liquids. For an AC voltage of 2000 volts at 1 kHz particles remained near the top of the drop, implying that either particles experienced negative dielectrophoresis or the DEP force was not large enough to overcome the buoyancy force. Recall that at the frequency of 100 Hz extendospheres undergo positive dielectrophoresis for the same two fluids. The drop deformation then increased quickly which was followed by its breakup into three major droplets. As was the case in FIG. 19, the droplet in the middle contained all of the particles, leaving the other two droplets particle-free.

For the cases described in this subsection the drops elongated to bridge the gap between the electrodes and eventually broke in the middle due to the capillary instability. The drops were able to bridge the gap because the distance between the electrodes was only approximately three times larger than the drop diameter. In fact, our experiments showed that for a device with a given distance between the electrodes there was a critical drop diameter for which the drop bridged the gap between the electrodes. The drops smaller than this size tip streamed, whereas the larger sized drops bridged the gap and then broke in the middle. A water drop suspended in corn oil bridged the gap when its diameter was about one third of the distance between the electrodes. The ratio of the drop diameter and the distance between the electrodes at which the drop bridges the gap, in general, depends on the physical properties of the drop and ambient fluids involved.

To understand the mechanism by which the breakup takes place and why the middle droplets containing particles are formed, we conducted similar experiments for the drops that were clean (without particles). FIG. 21 shows the breakup of a clean water drop immersed in corn oil. The drop stretched in the direction of the electric field and continued to stretch until its ends touched the side walls. Notice that at this point, the drop assumed a dumbbell like shape, with an elongated cylindrical filament in the middle and two spherical ends of larger diameters (see the third photograph of FIG. 21). The diameter of the filament continued to decrease with the fluid moving out into the two spherical ends. When most of the fluid was pulled into the two ends and the diameter of the filament became sufficiently small, it broke due to the capillary instability resulting in the formation of a line of small droplets in the middle. The size of the central droplet was smaller than in FIG. 20 for the case where the drop contained particles.

To further investigate the influence of particles on the formation of the middle droplet, we reduced the particle concentration in the drop, as shown in FIG. 4. As in FIG. 20, particles remained at the equator while the drop stretched. In addition, the filament was similar to that in FIG. 22*a*, except that it contained particles. The presence of particles, therefore, resulted in the formation of a larger sized droplet in the middle which contained all of the particles (see FIGS. 22*b*). The size of this middle droplet increased when the volume of particles in the drop was increased.

Separation of Two Types of Particles and Formation of Janus Drops

Finally, we consider the case in which a water drop contained two types of particles with different dielectric properties. The drop immersed in corn oil contained hollow extendospheres and glass particles. The goal here was to show that we could separate two different types of particles trapped at the surface of a drop. This was achieved by controlling the electric field intensity and frequency so that extendospheres which undergo positive dielectrophoresis moved to the poles while glass particles which undergo negative dielectrophoresis remained near the equator. Once this arrangement of particles was reached we further increased the electric field intensity and were able to remove one type of particles (extendospheres) from the drop, leaving the other type (glass particles) on the drop's surface.

In FIG. 22*a*, the drop containing glass (18 μm diameter) and extendospheres was formed using three smaller drops as shown. While the middle drop carried glass particles, the two drops on the sides carried extendospheres. The three drops were merged to form a larger drop by applying a voltage of 600 V (P. Singh and N. Aubry, *Electrophoresis,* 2007, 28, 644-657). After the drops merged, we switched the electric field off and allowed the distribution of particles on the drop surface to reach a steady state. Then a voltage of 1500 V at the frequency of 100 Hz was applied to the device. FIG. 22*b* shows that as the applied voltage was increased to 1600 V and then to 1700 V the drop deformation increased. Also, notice that glass particles (which either underwent negative dielectrophoresis or experienced a small DEP force compared to their buoyant weight) remained at the center of the drop whereas extendospheres (which underwent positive dielectrophoresis) began to move towards the poles. After all extendospheres reached the poles, we applied a voltage of 1825 volts. The drop elongated further and the extendospheres accumulated at the poles were ejected from the drop by tip-streaming (see FIG. 22*c*). The electric field was then switched off. The last Figure in the sequence shows the drop containing mostly glass particles while all extendospheres except one have been removed. The separation of particles on the surface of a drop, however, requires that the two types of particles do not physically block each other. Therefore, when the concentration of particles on the drop's surface is relatively large the separation is not complete, especially in tightly packed regions.

FIG. 23 shows the case in which glass particles and extendospheres were initially in a mixed state on the surface of a drop, but when the electric field was applied the glass particles remained at the equator while extendospheres moved to the poles. Some extendospheres, however, were physically blocked by the tightly packed glass particles and as a result did not separate. Recall here that both glass and extendospheres remain trapped on the drop's surface, and thus it is rather difficult for a trapped particle to escape since their motion is restricted to the two-dimensional surface of the drop. After the electric field was removed this distribution remained unchanged resulting in the formation of a drop for which some areas were covered by glass particles alone and some by extendospheres alone, and the remaining surface remained uncovered. This demonstrates that the method can be used to create other distributions of particles on the surface of drops, and the fraction of area covered by a given type of particles can be varied by changing the concentration of those particles. The technique thus offers a way to create composite (Janus) particles with tailored surface structure and composition by freezing these distributions.

Conclusion and Discussion

We have experimentally studied the role of various parameters that influence the process of concentrating, separating and removing particles distributed on the surface of a drop when it is subjected to a uniform electric field. As shown, it is possible to manipulate particles trapped on the surface of a drop because they experience DEP forces due to the non uniformity of the electric field intensity on the drop's surface (even though the applied electric field away from the drop is uniform).

Our experiments, in agreement with our recent analytical result, show that the DEP force on a particle is inversely proportional to the drop radius. Thus, the electric field intensity required to move particles trapped on the surface of a drop decreases with decreasing drop radius which is significant because it implies that the electric field intensity required for manipulating particles of micro emulsions is smaller than that needed for emulsions containing millimeter sized droplets.

Experiments also show that the presence of particles on the drop's surface can influence its electric field induced deformation. For the case in which particles aggregate at the poles and the drop's dielectric constant is greater than that of the ambient liquid, the drop's deformation was larger. On the other hand, when particles aggregated near the poles and the drop's dielectric constant was smaller than that of the ambient liquid, the drop deformation was smaller than for a clean drop. We postulate that this change in the deformation is due to the modification in the net electrostatic force that acts on the drop.

It is possible to concentrate submicron sized particles only if the DEP force is large enough to overcome the Brownian motion. The work done on a particle by the DEP force in moving it from one of the drop's poles to the equator was computed for a typical range of parameter values and found to be at least an order of magnitude larger than kT for 100 nm sized particles, thus showing that the DEP force is large enough to overcome the Brownian force.

Furthermore, it is shown that the concentration of particles is possible only when the electric gravity parameter G, defined as the ratio of the DEP force and the buoyant weight, is O(1) or larger. The electric gravity parameter G increases with decreasing buoyant weight and also with decreasing drop size, but is independent of the particle radius.

Once particles were concentrated near the poles or the equator, we were able to remove them from the drop by increasing the electric field intensity. Our experiments show that the electric field intensity at which tip-streaming occurred increased with decreasing drop diameter so that the electric Weber number was approximately constant, which is in agreement with past experimental studies. To remove particles concentrated near the poles, the intensity was increased to a critical value at which particles aggregated at the poles were ejected by means of a tip-streaming mechanism. This required the use of a device for which the distance between the electrodes was larger than approximately five times the drop diameter.

To remove particles aggregated near the equator of the drop, we used a device for which the gap between the electrodes was approximately three times larger than the drop diameter. In this case, after all the particles aggregated near the equator, the applied voltage was increased to a value so that the drop elongated, bridged the gap between the electrodes, and then broke into three major droplets. Our experiments show that the drop breakup near the middle occurred due to the capillary instability once the diameter of the filament became smaller than the size of the particle cluster. All of the particles were contained in and around the droplet in the middle, while the two larger sized droplets on the sides were particle free. The size of the middle droplet adjusted to the volume of particles trapped on the drop's surface, i.e., it increased (resp. decreased) when the volume of particles was increased (resp. decreased).

The drop bridged the gap between the electrodes due to the enhancement of the electric field intensity in the gap between the electrodes and the device walls. Our experiments show that the diameter of the smallest drop that bridged the gap between the electrodes varied linearly with the distance between the electrodes. For a water drop suspended in corn oil, the drop bridged the gap when the distance between the electrodes was about three times the drop diameter. The electric Weber number at which the drop bridged the gap between the electrodes was approximately the same as that at which the drop tip streamed in the larger sized devices.

The described methods for removing particles from drops can work only if the drops break or tip-stream for a larger electric field intensity than that required for concentrating particles. It is shown that for a given drop, ambient liquid and particles combination, there is a critical drop radius below which the electric field intensity needed for concentrating particles is smaller than the intensity at which the drop tip-streams or breaks. Only in the case where the drop radius is smaller than this critical value, it is possible to concentrate particles on the surface of the drop. More specifically, only if the dimensionless parameter is such that $$\frac{We'}{G} < 1,$$

it is possible to concentrate particles. Furthermore, ideally, if the goal is also to clean the drop of particles, then $$\frac{We'}{G}$$

should not be much smaller than one because otherwise the electric field intensity required for breaking the drop will be much larger than that required for concentrating particles.

We have also shown that the method can be used to separate particles which undergo positive dielectrophoresis from those experiencing negative dielectrophoresis on the surface of a drop. This was done by aggregating particles of one type at the poles and of another type at the equator. The redistribution of particles remained unchanged after the electric field was switched off because they did not mix. This approach therefore can be used to form composite or "Janus" drops for which surface properties vary because their surface is covered by one type of particles near the equator and by another type of particles near the poles. Finally, once particles were separated on the surface of a drop, we were able to remove particles aggregated at the poles from the drop via tip-streaming, thus leaving the drop with only one type of particles.

Example 3

Electrohydrodynamic Removal of Particles from Drop Surfaces

A uniform electric field is used for cleaning drops of the particles they often carry on their surface. In a first step, particles migrate to either the drop's poles or equator. This is due to the presence of an electrostatic force for which an analytical expression is derived. In a second step, particles concentrated near the poles are released into the ambient liquid via tip-streaming, and those near the equator are removed by stretching the drop and breaking it into several droplets. In the latter case, particles are all concentrated in a small middle daughter droplet.

Drops immersed in another immiscible liquid often carry small particles on their surface due to the fact that when particles are present either within drops or in the ambient fluid, they are readily trapped at the interface, especially when the contact angle is around 90°, and once captured they remain so under the action of the capillary force which is much stronger than the force due to random thermal fluctuations. This ability of drops to attract particles on their surface can be used in applications such as cleaning the ambient fluid, using drops as particle carriers particularly in microfluidic devices, and stabilizing emulsions (S. U. Pickering, J. Chem. Soc., London, 91(2), 2001 (1907); H. Song, J. D. Tice, and R. F. Ismagilov, Angew. Chem. Int. Ed., 42, 768 (2003); O. Ozen, N. Aubry, D. Papageorgiou, and P. Petropoulos, Phys. Rev. Letters, 96, 144501 (2006); B. P. Binks, Current opinion in Colloid and Interface Science, 7, 21-41 (2002); W. Ramsden, Proc. Roy. Soc. (London), 72, 156 (1903); N. Yan and J. H. Masliyah, J. Colloid and Interface Science, 168, 386-392 (1994).). The focus of this Example is on the removal of particles accumulated on drops' surfaces, which should be useful to purify drops, e.g., for the synthesis of ultra pure particles, delivering particles carried by drops once target sites have been reached, and demulsifying emulsions stabilized by particles.

Even when the applied electric field is uniform, the distribution of the electric field on the surface of a drop is non-uniform, and thus a particle on or near its surface experiences a dielectrophoretic (DEP) force that causes it to move either to the equator or to one of the poles. Here, we use the point-dipole approach to estimate the DEP force acting on a particle that causes it to migrate towards the poles or the equator. The drop is assumed to be spherical. The approach assumes that the electric field is not altered by the presence of the particle, the particle size is small compared to the length scale over which the electric field varies and the electric field gradient at the center of the particle can be used to estimate the DEP force acting on the particle (H. A. Pohl, Dielectrophoresis, Cambridge university press, Cambridge (1978); J. Kadaksham, P. Singh, and N. Aubry, Journal of Fluids Engineering, 126, 170 (2004); J. Kadaksham, P. Singh, and N. Aubry, Mechanics Research Communications, 33, 108 (2006); P. Singh and N. Aubry, Physical Review E, 72, 016602 (2005)). When these assumptions are no longer valid, the exact methods based on the Maxwell stress tensor are available (P. Singh and N. Aubry, Physical Review E 72, 016602 (2005); N. Aubry and P. Singh, Euro Physics Letters 74, 623-629 (2006).).

The position of a particle within the interface is determined by the balance of the vertical forces acting on the particle, the latter consisting in our case of the capillary force (which depends among other factors on the three-phase contact angle on its surface which can change in the presence of an externally applied electric field), the electric force in the normal direction to the interface, and the particle's buoyant weight (P. Singh, P. and D. D. Joseph, J. Fluid Mech. 530, 31 (2005)). We will assume that the particle's center is at the interface, but at a negligible distance outside the drop's surface, and therefore the non uniform electric field outside the drop is used to estimate the DEP force. Here, we also wish to note that the electric field intensity inside the drop is constant, and thus, since its gradient is zero, if the particle center is assumed to be inside the drop, the DEP force on the particle, within the point-dipole approximation, will be zero.

The r- and θ-components of the root mean square (rms) of the electric field outside a spherical drop of radius a can be shown to be given by (see T. B. Jones, Electromechanics of Particles, Cambridge University Press, Cambridge, (1995)):

$$E_r = E_0\cos\theta\left(1 + \frac{2\beta a^3}{r^3}\right),\quad E_\theta = -E_0\sin\theta\left(1 - \frac{\beta a^3}{r^3}\right) \tag{1}$$

where $E_0$ is the rms value of the applied AC electric field which is assumed to be along the z-direction of the spherical coordinate system, $$\beta(\omega) = \mathrm{Re}\left(\frac{\varepsilon_d^* - \varepsilon_c^*}{\varepsilon_d^* + 2\varepsilon_c^*}\right)$$

is the Clausius-Mossotti factor, and r is the distance of the particle from the drop's center. Here $\epsilon^*_d$ and $\epsilon^*_c$ are the frequency dependent complex permittivities of the drop and the ambient fluid, respectively, and ω is the frequency of the AC field. Here the complex permittivity $\epsilon^* = \epsilon - i\,\sigma/\omega$, where $\epsilon$ is the permittivity, σ is the conductivity and $i=\sqrt{-1}$.

The DEP force acting on a particle of radius R slightly outside the surface of the drop, within the point-dipole approximation, is given by $F_{DEP}=2\pi\beta' R^3\epsilon_0\epsilon_c\nabla E^2$ (H. A. Pohl, Dielectrophoresis, Cambridge university press, Cambridge (1978); J. Kadaksham, P. Singh, and N. Aubry, Journal of Fluids Engineering, 126, 170 (2004); J. Kadaksham, P. Singh, and N. Aubry, Mechanics Research Communications, 33, 108 (2006); P. Singh and N. Aubry, Physical Review E, 72, 016602 (2005). and T. B. Jones, Electromechanics of Particles, Cambridge University Press, Cambridge, (1995)). Here $\epsilon_0$ is the permittivity of free space, $$\beta'(\omega) = \mathrm{Re}\left(\frac{\varepsilon_p^* - \varepsilon_c^*}{\varepsilon_p^* + 2\varepsilon_c^*}\right),$$

$\epsilon^*_p$ is the complex permittivity of the particle, and E is the electric field magnitude:

$$E^2 = E_0^2\left(1 + \cos^2\theta\left(\frac{4\beta a^3}{r^3} + \frac{4\beta^2 a^6}{r^6}\right) + \sin^2\theta\left(-\frac{2\beta a^3}{r^3} + \frac{\beta^2 a^6}{r^6}\right)\right) \tag{2}$$

The $\epsilon$-component of the DEP force, which for an undeformed drop is in the tangential direction to the drop's surface, is then given by $$F_{DEP,\theta} = -4\pi\beta' R^3\varepsilon_0\varepsilon_c\left(E_0^2\cos\theta\sin\theta\left(\frac{6\beta a^3}{r^4} + \frac{3\beta^2 a^6}{r^7}\right)\right) \tag{3}$$

Equation (3) is also valid for a DC electric field in which case $E_0$ denotes the electric field intensity. The force on a particle near the drop's surface can be obtained by substituting r≈a, which gives $$F_{DEP,\theta,a} = -12\pi R^3 \frac{1}{a}\varepsilon_0\varepsilon_c E_0^2 \beta' \beta(2+\beta)\cos\theta\ \sin\theta. \tag{4}$$

The above expression gives the DEP force in the ∈-direction on a small particle near, but outside, the drop's surface. The force is zero both at the poles (θ=0, π) and at the equator (θ=π/2), and maximum at θ=π/4. Also, the force acting on a particle of a given radius increases with decreasing drop size. This implies that within the assumptions made in this paper, the smaller the size of the drop, the easier it is to concentrate particles (of a given radius), a result consistent with our experimental observations.

From Equation (4) we deduce that the sign of β'β(2+β) determines the direction of the tangential DEP force. However, since |β|≦1, the factor (2+β)>0. Thus, the sign of β'β (2+β) is the same as that of β'β. Nevertheless, for β<0 the magnitude of the factor (2+β) is smaller than for β>0. Thus, the DEP force is smaller in the former case. In addition, although the force is zero at both the poles and the equator, it is easy to see that the sign of β'β determines the locations at which particles eventually aggregate. When β'β>0 particles aggregate at the poles as they are in a state of stable equilibrium at the poles and in a state of unstable equilibrium at the equator. On the other hand, when β'β<0, they aggregate at the equator where their equilibrium is stable. This result is consistent with experimental findings.

From this, for example, we may conclude that particles for which the Clausius-Mossotti factor is positive (β'>0) aggregate at the poles if the permittivity of the drop is greater than that of the ambient fluid, and at the equator if the permittivity of the drop is smaller than that of the ambient fluid, as shown in the Examples herein. It is important to note that if the fluids' and particle's conductivities are not negligible, the signs of β' and β may also depend on the frequency of the AC field. Furthermore, it is possible that the electric field induced fluid flow causes the motion of the particles trapped on the surface of a drop. This, however, was not the case in the present experimental study.

It is noteworthy that a particle trapped on the drop's surface is in contact with both fluids instead of just the outer fluid. Expression (4) for the DEP force, which assumes that the particle's center is outside the drop, is therefore only approximate. Clearly, the Clausius-Mossotti factor β' for a particle trapped on the surface and the DEP force should depend on the permittivities and conductivities of the particle and the two fluids involved—and not just those of the outer fluid—and also on the position of the particle within the interface. The position of the contact line on the particle's surface, which determines the fraction of the particle immersed in each fluid, depends on the contact angle, the buoyant weight of the particle, and any additional force normal to the interface acting on the particle (P. Singh, P. and D. D. Joseph, J. Fluid Mech. 530, 31 (2005)). A change in the contact angle due to electrowetting can also cause the particle to move in the direction normal to the interface to satisfy the new contact angle requirement (F. Mugele and J. Baret, J. Phys.: Condens. Matter 17, R705 (2005)). In addition, the electric force normal to the interface can also change the particle's position. We do not include these factors in the analysis presented above.

So far, we have assumed that the drop remains spherical. However, a drop subjected to a uniform electric field deforms due to the non-uniformity of the electric stress distribution on its surface. Its deformed shape is determined by the balance of the surface tension force, which tends to make the drop spherical, and the force due to the electric stress (G. I. Taylor, Proc. Royal Soc. London A, Mathematical and Physical Sciences, 280, 383 (1964); R. S. Allen, and S. G. Mason, Proc. Royal Soc. London, Series A, Mathematical and Physical Sciences, 267, 45-61 (1962); S. Torza, R. G. Cox, and S. G. Mason, Phil. Trans. Royal Soc. of London A, Mathematical and Physical Sciences, 269, 295 (1971); J. R. Melcher, and G. I. Taylor, Annu. Rev. Fluid Mech., 1, 111, (1969); J. D. Sherwood, J. Fluid Mech., 188, 133 (1988); D. A. Saville, Annu. Rev. Fluid Mech. 29, 27-64 (1997)). Furthermore, there is a critical electric field intensity above which the drop undergoes tip-streaming or breaks (G. I. Taylor, Proc. Royal Soc. London A, Mathematical and Physical Sciences, 280, 383 (1964); R. S. Allen, and S. G. Mason, Proc. Royal Soc. London, Series A, Mathematical and Physical Sciences, 267, 45-61 (1962); S. Torza, R. G. Cox, and S. G. Mason, Phil. Trans. Royal Soc. of London A, Mathematical and Physical Sciences, 269, 295 (1971); J. R. Melcher, and G. I. Taylor, Annu. Rev. Fluid Mech., 1, 111, (1969); J. D. Sherwood, J. Fluid Mech., 188, 133 (1988); D. A. Saville, Annu. Rev. Fluid Mech. 29, 27-64 (1997); F. K. Wohlhuter, and O. A. Basaran, J. of Fluid Mech., 235, 481 (1992); O. A Basaran, AIChE J. 48, 1842-1848 (2002); J. F. de la Mora, Annu. Rev. Fluid Mech., 39, 217 (2007)). Here we show that the former can be exploited to remove particles accumulated near the poles and the latter to remove particles accumulated near the equator. Our experiments reported below show that when the distance between the electrodes is about three times the drop diameter, or smaller, the drop bridges the gap between the electrodes and then breaks in the middle. On the other hand, the drop tip-streams when this distance is about five times the drop diameter or larger. The critical electric Weber number $$\left(We = \frac{a\varepsilon_0\varepsilon_c E_0^2\beta^2}{\gamma},\ \text{where } \gamma \text{ is the interfacial tension}\right),$$

that is the ratio of the electric and capillary forces, at which the drops tip streamed or bridged the gap between the electrodes was approximately 0.085. For given fluids, particles and experimental set up, this value defines the minimum electric field (and thus voltage difference) needed. In a smaller device, the drop bridges the gap because the electric field intensity and the electric stress in the region between the electrodes and the drop's surface are enhanced due to the smaller size of the gap, as shown by the direct numerical simulation results reported in FIG. 24 (for the details of the computational approach see P. Singh and N. Aubry, Electrophoresis 28, 644 (2007) and S. B. Pillapakkam, and P. Singh, Journal Comput. Phys., 174, 552 (2001); S. B. Pillaipakkam, P. Singh, D. Blackmore and N. Aubry, J. Fluid Mech., 589, 215 (2007)).

Experiments were conducted in a device with a rectangular cross-section in which the electrodes were mounted on the side walls. The distance between the electrodes was 6.5 mm, the depth 6.5 mm and the length 41 mm. The depth of the ambient fluid in the device was approximately 5.5 mm. To make the bottom surface hydrophobic, the latter was covered by a layer of Polytetrafluoroethylene (PTFE). A variable frequency AC signal generator (BK Precision Model 4010A) was used along with a high voltage amplifier (Trek Model 5/80) to apply voltages to the electrodes. The motion/deformation was recorded using a digital color camera connected to a Nikon Metallurgical MEC600 microscope.

The Millipore water drops containing particles on their surfaces were formed in corn oil using the procedure described in (S. Nudurupati, M. Janjua, N. Aubry, and P. Singh, Electrophoresis, 29(5), 1164 (2008)). The dielectric constant of Millipore water was 80.0 and its conductivity was $5.50\times10^{6}$ $pSm^{-1}$, and the values for corn oil were 2.87 and 32.0 $pSm^{-1}$. The densities of water and corn oil were 1.00 $g/cm^3$ and 0.92 $g/cm^3$, respectively. Since the density of corn oil was slightly smaller, the drops reached the bottom of the device, but did not wet the bottom surface which remained covered with corn oil since it was hydrophobic. The diameter of the particles used in our experiments was between 1-70 μm and so we were able to visually monitor their motion. The dielectric constant of extendo spheres was 4.5 and that of polystyrene particles was 2.5. Furthermore, the drop size was such that the particle diameter was at least an order of magnitude smaller than that of the drop. The buoyant weight of the particles, however, was non-negligible and therefore the latter collected either at the top or the bottom surface of the drop, depending on their density compared to that of the liquids.

A two-step procedure was used for cleaning drops of the particles trapped on their surfaces. In the first step, an electric field of sufficiently large intensity was used to concentrate particles either at the drop's poles or at its equator. This, as noted earlier, is due to the fact that even though the applied electric field is uniform, it becomes non-uniform on and near the drop's surface if the electric permittivity of the drop is different from that of the ambient fluid. The resulting DEP force causes particles to move towards the regions of either high or low electric field strength, while they remain trapped on the drop's surface.

FIG. 25 shows that extendo spheres on the surface of a water drop migrate towards the poles and aggregate there. Since the drop's permittivity is larger than that of the ambient fluid, the electric field near the equator is smaller than the imposed uniform electric field, and near the poles it is larger (see FIG. 24). This shows that extendo spheres undergo positive dielectrophoresis since $\beta'>0$. For the same drop-ambient fluid combination, FIG. 26 shows that polystyrene particles trapped on the drop's surface migrate and collect near the equator. Since the electric field strength at the equator is locally minimal, polystyrene particles for which $\beta'<0$ undergo negative dielectrophoresis.

In the second step, the electric field intensity is increased further to remove these aggregated particles from the drop. To remove particles aggregated near the poles, a tip-streaming mechanism was used. FIG. 25 shows that for a sufficiently strong electric field the water drop develops conical ends (also called Taylor cones (G. I. Taylor, Proc. Royal Soc. London A, Mathematical and Physical Sciences, 280, 383 (1964); R. S. Allen, and S. G. Mason, Proc. Royal Soc. London, Series A, Mathematical and Physical Sciences, 267, 45-61 (1962); S. Torza, R. G. Cox, and S. G. Mason, Phil. Trans. Royal Soc. of London A, Mathematical and Physical Sciences, 269, 295 (1971); J. R. Melcher, and G. I. Taylor, Annu. Rev. Fluid Mech., 1, 111, (1969); J. D. Sherwood, J. Fluid Mech., 188, 133 (1988); D. A. Saville, Annu. Rev. Fluid Mech. 29, 27-64 (1997); F. K. Wohlhuter, and O. A. Basaran, J. of Fluid Mech., 235, 481 (1992); O. A Basaran, AIChE J. 48, 1842-1848 (2002); J. F. de la Mora, Annu. Rev. Fluid Mech., 39, 217 (2007))) and particles concentrated at the poles eject due to tip-streaming, thus leaving the drop free of particles. For a water drop suspended in corn oil, the electric field caused tip-streaming when the distance between the electrodes was ~5 times the drop diameter or larger.

To remove particles aggregated near the equator, we used a device for which the gap between the electrodes was approximately three times the drop diameter. In this case, the drop bridged the gap but did not tip-stream, and then broke in the middle because of the thinning of the filament (see FIG. 26). The middle droplet was formed because all of the fluid contained in the filament was not transferred to the two main droplets. The middle droplet contained all the particles, and the two larger sized droplets were free of particles. The breakup near the middle occurred when the filament diameter became smaller than the thickness of the region occupied by the particles, and the size of the middle droplet was found to increase with increasing concentration of particles In conclusion, we have confirmed that an externally applied uniform electric field can be used to manipulate particles trapped on the surface of drops leading to their concentration near the poles or the equator of the drop, and obtained an analytical expression for the electrostatic force acting on the particles. It was further shown that these concentrated particles can then be removed by increasing the electric field intensity. The technique offers a way for releasing small particles (including nanoparticles) from drops to the ambient fluid if the liquids are judiciously selected so that particles aggregate near the poles. It obviously can work only if the liquids involved are such that an electric field of sufficiently large intensity induces tip-streaming. If, on the other hand, liquids are such that particles cluster near the equator, the drop stretches and, if placed in a small device, then bridges the gap between the electrodes. It then breaks into several daughter droplets, with the middle one containing all of the particles. It is shown computationally that the drop bridges the gap between the electrodes due to the electric stress enhancement that occurs when the gap between the drop and an electrode is of the order of the drop size.

Example 4

Destabilization of Pickering Emulsions Using External Electric Fields

Emulsions can be stabilized by the presence of particles which get trapped at fluid-fluid interfaces and prevent adjacent drops from coalescing with one another. We show here that such emulsions, or Pickering emulsions, can be destabilized by applying external electric fields. This is demonstrated experimentally by studying water drops in decane and silicone oil drops in corn oil in presence of micro-sized particles. It is shown that the primary phenomenon responsible for the destabilization is the motion of particles on the surface of drops in presence of a uniform electric field. Although there should be no electrostatic forces acting on neutral particles in a uniform electric field, the presence of the drop itself introduces non-uniformity which leads to dielectrophoretic forces acting on the particles and is thus responsible for particle motions along the drop surface. Particles translate to either the poles or the equator of the drop, depending on the relative dielectric constants of the particles, the surrounding fluid and the fluid within the drop. Such motions break the particle barrier, thus allowing for drops to merge into one another and therefore destabilizing the emulsion.

In 1907, Pickering discovered that fine particles are readily adsorbed at liquid-liquid or liquid-gas interfaces, and can be used as stabilizers in emulsion technology (Pickering, S. U., *J. Chem. Soc.,* 1907, 91 (2001)). The stabilization of emulsions takes place when fine particles diffuse to the interfacial region and stay there in a stable mechanical equilibrium (Tambe, D. E., Sharma, M. M., *Advances in Colloid and Interface Science,* 52, 1-63 (2004)). The addition of surfactants or particles is essential for long-term stability: both surfactants and particles accumulate at the fluid-fluid interface and inhibit drop recombination and coarsening (Aveyard, R., Binks, B. P., Clint, J. H., *Advances in Colloid and Interface Science,* 100, 503-546 (2003) and Sebba, F., *Foams and Biliquid Foams*, Wiley, Chichester (1987)). Particles are then essentially irreversibly bound to the surface of drops (Aveyard, R., Binks, B. P., Clint, J. H., *Advances in Colloid and Interface Science,* 100, 503-546 (2003)). Moreover, the Gibbs free energy needed to detach particles from interfaces in Pickering emulsions is much larger than that needed in the case of surfactants in conventional emulsions (Tambe, D. E., Sharma, M. M., *Advances in Colloid and Interface Science,* 52, 1-63 (2004); Aveyard, R., Clint, J. H., Horozov, T. S., *Physical Chemistry Chemical Physics,* 5, 2398-2409 (2003) and Tambe, D. E., Sharma, M. M., *Journal of Colloid and Interface Science,* 162, 1-10 (1994)). It should be noted, however, that the energy needed for a particle to be trapped at an interface is directly proportional to the particle surface area, and thus, for sufficiently small particles the adhesion energy of the particle may approach that of a surfactant molecule and, in this case, particles can be reversibly adsorbed (Lin, Y., Skaff, H., Emrick, T., Dinsmore, A. D., Russell, T. P., *Science,* 299, 226-229 (2003)).

Another important factor governing the behavior of particle stabilized emulsions is the fact that in contrast to surfactants, particles are not amphiphilic. In other words, their surfaces are usually uniform, and thus do not have a hydrophobic and a hydrophilic part, unlike surfactant molecules. Hence, the surface of drops coated with particles will tend to have properties similar to those of the particles themselves and the type of emulsion obtained, water-in-oil (w/o) or oil-in-water (o/w), depends on the hydrophilicity of the particles (Binks, B. P., Lumsdon, S. O., *Langmuir,* 16, 8622-8631 (2000)). As a result, particles can adhere to two drops simultaneously, potentially leading to bridging flocculation and/or rapid coalescence of sparsely coated drops (Horozov, T. S., Binks, B. P., *Angewandte Chemie-International Edition,* 45, 773-776 (2006) and Stancik, E. J., Kouhkan, M., Fuller, G. G., *Langmuir,* 20, 90-94 (2004)). However, these situations are relatively rare (Vignati, E., Piazza, R., Lockhart, T. P., *Langmuir,* 19, 6650-6656 (2003)).

While it is well-known that stable emulsions are important in many applications ranging from the preparation of foods and cosmetics to the manufacturing of plastics, demulsification may be sought as well, e.g. to dehydrate crude oil or to bring reagents initially carried by initially distinct drops in contact of one another by merging the drops. The latter situation may be encountered in the so-called "digital microfluidics" where individual drops are used as carriers and miniature reactors.

Pickering emulsions formed using paramagnetic microparticles have been destabilized by Melle et al. (*Langmuir,* 21, 2158-2162 (2005)) by applying a non-uniform magnetic field. In the latter work, it was shown that paramagnetic solid particles cannot stop drop coalescence when the strength of the magnetic field is sufficiently large. It was further conjectured that this phenomenon was due to the motion of magnetic particles towards the region of high magnetic field strength, and their stripping from the drop surfaces. This, in turn, breaks the particle barriers, thereby inducing the coalescence of solid-stabilized emulsions. In this paper, we use dielectric particles, rather than paramagnetic particles, to manipulate emulsions.

As shown above, the distribution of particles on the surface of a drop immersed in another immiscible liquid can be altered by applying an external uniform electric field. Particles trapped on the surface of a drop then gather around the poles or the equator of the drop (which are either the highest or the lowest electric field regions) depending on the Clausius-Mossotti factors involved, that is the relative dielectric constants of the drop, the ambient liquid, and the particles. These studies have potentially important applications, including the fabrication of Janus particles (that is particles with two faces, one covered with one type of particles, and another one covered with another type) and the release of particles from drops for cleaning and/or targeted drug delivery at higher electric field strengths.

The manipulation of particles on drop surfaces also raises the interesting possibility that emulsions which have been stabilized by surrounding drops with solid particles, or Pickering emulsions (Pickering, S. U., *J. Chem. Soc.,* 1907, 91 (2001)), could be destabilized by altering the distribution of particles on drop surfaces through the application of external uniform electric fields. The underlying mechanism would then be the clustering of particles in certain areas of the drop surfaces which would then leave other areas uncovered. It is through the latter interstices that adjacent drops could potentially merge. Although the coalescence between two drops can be achieved by simply properly locating the drops and using drop deformation induced by dielectrophoresis (Singh, P. and Aubry, N., *Electrophoresis,* 29, 644-657 (2007)), this paper seeks the merger of a large number of drops in Pickering emulsions.

Below, we recall the dielectrophoretic force acting on particles trapped on drop surfaces due to the non-uniformity of the electric field introduced by the drop itself. We describe our experimental results with and without electric field, and finally draw our conclusions.

Dielectrophoretic Forces on Pickering Emulsions

Here, we are concerned with the dielectrophoretic (DEP) force at the origin of the displacement of particles floating on the surface of drops. DEP forces are induced by non-uniform electric field distributions around drops, even though the applied electric field is uniform. This is due to the fact that the presence of the drop itself distorts the electric field distribution which, without the drop, would be uniform. A schematic of the drop placed in a channel with electrodes embedded within the channel walls is given in FIG. 27. An AC electric field is applied, with the voltage adjusted by means of a power supply, and the frequencies and wave forms controlled by a function generator.

Particle Distribution

In a first approximation, particles can be modeled as point dipoles placed in an external electric field. For a dielectric particle suspended in an ambient dielectric liquid and subjected to an AC electric field, it is well-known that such a model, also referred to as point-dipole (PD) model, leads to a time averaged DEP force acting on the particle having the expression $$F_{DEP}=2\pi a'^3\epsilon_0\epsilon_c\beta(\omega)\nabla E^2, \qquad (1)$$

where a' is the particle radius, $\epsilon_0$ the permittivity of free space, and E the root-mean-squared (RMS) value of the electric field (Pohl, H. A., Dielectrophoresis, Cambridge University Press (1978) and Jones, T. B., Electromechanics of Particles, Cambridge University Press, New York (1995)). The Clausius-Mossotti factor β(ω), which enters in Expression (1) is given by $$\beta(\omega)=\mathrm{Re}\left(\frac{\varepsilon_p^*-\varepsilon_c^*}{\varepsilon_p^*+2\varepsilon_c^*}\right), \qquad (2)$$

where $\in^*_p$ and $\in^*_c$ are the frequency-dependent complex permittivities of the particle and the ambient liquid, respectively. Equation (1) also holds in the case of a DC electric field where E stands, in this case, for the electric field intensity. It is worth noting that the direction and sign of the DEP force depend on the distribution of the electric field and the sign of the Clausius-Mossotti factor. For a positive Clausius-Mossotti factor, the force orients itself in the direction of the gradient of the electric field square, while for a negative Clausius-Mossotti factor, the force points in the opposite direction. The direction of the DEP force is thus determined by the dielectric constants of the particles and the ambient liquid. This dependence of the force direction also affects the direction of the particle movement on the drop surface and where particles eventually cluster, in the regions of either high or low electric field. In addition to the DEP force expressed by Equation (1), particles are subjected to particle-particle (P-P) electrostatic interaction forces and hydrodynamic forces. Particle-particle electrostatic forces are responsible for particle chaining, and like the DEP force (1), can be approximated using the PD model (Kadaksham, J., Singh, P., Aubry, N., *Journal of Fluids Engineering,* 126, 170-179 (2004) and Kadaksham, J., Singh, P., Aubry, N., *Mechanics Research Communications,* 33, 108-122 (2006)). Their magnitude, and therefore the extent of particle chaining, can be adjusted by varying the system parameters (Kadaksham, A. T. J., Singh, P. and Aubry, N., *Electrophoresis,* 26, 3738-3744, (2005) and Aubry, N. and Singh, P. *Electrophoresis,* 27, 703-715 (2006)).

The latter model is valid if the particles are small compared to the length scale over which the electric field varies, the presence of the particles does not alter the electric field distribution and the value of the electric field gradient at the center of the particle can be used in the calculation of the forces. When these assumptions no longer hold, one has to compute the full distribution of the electric field taking into account the presence of the particles and then deduce the Maxwell stress tensor which, in turn, is used in the calculation of the electrostatic forces. Such an alternative method was developed recently and shown to converge toward the PD model expressions for both the DEP force and particle-particle interaction forces (P. Singh and N. Aubry, *Physical Review E* 72, 016602 (2005) and N. Aubry and P. Singh, *Euro Physics Letters* 74, 623-629 (2006)). In addition, we use AC electric fields of sufficiently high frequency so that conductivity effects can be assumed negligible, and fluids and particles can be considered as perfect dielectrics. It is clear that at lower frequency values, other physical phenomena including those due to the formation of an electric field induced fluid motion may arise and need to be accounted for. The effect of lower frequencies on the physical mechanisms reported in this paper is beyond the scope of the present work.

So far, we have discussed the case of particles suspended in a bulk liquid and subjected to a non-uniform electric field. However, we are interested in particles trapped at fluid-fluid interfaces and in such a case we expect the electrostatic force acting on the particles to depend on the characteristics of the particles and those of the liquids located on both sides of the interface. The case of particles trapped at a flat interface, which was shown to lead to the self-assembly of particles into non-packed lattices, can be found in references (N. Aubry, P. Singh, M. Janjua, and S. Nudurupati, *Proc. U.S. Nat. Acad. of Sci.,* 105, 3711 (2008) and N. Aubry and P. Singh, *Physical Review E,* 77, 056302 (2008)).

We now turn to the case where the particles float on a drop surface. For this, we assume that the drop is spherical, the electric field is affected by the presence of the drop but not by the presence of the particle (because the size of the latter is small compared to that of the drop), and the particle is located slightly outside of the drop. The latter assumption allows us to consider the non-uniform electric field slightly outside the drop to estimate the DEP force (notice that since the electric field intensity inside the drop is constant, the DEP force that a particle experiences inside the drop is zero).

Using such assumptions, the r- and θ-components of the RMS value of the electric field outside of a spherical drop of radius a can be shown (Pohl, H. A., Dielectrophoresis, Cambridge University Press (1978)) to be given by $$E_r = E_0\cos\theta\left(1 + \frac{2\beta a^3}{r^3}\right), \qquad (3)$$

$$E_\theta = -E_0\sin\theta\left(1 - \frac{\beta a^3}{r^3}\right),$$

where $E_0$ is the RMS value of the applied AC electric field which is assumed to be along the z-direction of the spherical coordinate system, $$\beta(\omega) = \mathrm{Re}\left(\frac{\varepsilon_d^* - \varepsilon_c^*}{\varepsilon_d^* + 2\varepsilon_c^*}\right)$$

is the Clausius-Mossotti factor, and r is the distance between the particle and the center of the drop. Within the expression of the Clausius-Mossotti factor, β(ω), $\in^*_d$ and $\in^*_c$ are the frequency dependent complex permittivities of the drop and the ambient fluid, respectively, and ω is the frequency of the AC field. The complex permittivity is defined as $\in^* = \in - j\sigma/\omega$, where ∈ is the permittivity, σ is the conductivity and $j=\sqrt{-1}$.

The DEP force acting on a particle of radius R located right outside of the drop is given by $F_{DEP} = 2\pi\beta' R^3 \in_0 \in_c \nabla E^2$. Here, $$\beta'(\omega) = \mathrm{Re}\left(\frac{\varepsilon_p^* - \varepsilon_c^*}{\varepsilon_p^* + 2\varepsilon_c^*}\right),$$

$\in^*_p$ is the complex permittivity of the particle, and E is the electric field magnitude in RMS value:

$$E^2 = E_r^2 + E_\theta^2$$

$$E^2 = E_0^2\left(1 + \cos^2\theta\left(\frac{4\beta a^3}{r^3} + \frac{4\beta^2 a^6}{r^6}\right) + \sin^2\theta\left(-\frac{2\beta a^3}{r^3} + \frac{\beta^2 a^6}{r^6}\right)\right). \qquad (4)$$

The θ-component of the DEP force, which is the force in the direction tangential to the drop's surface for a non-deformed drop, is then given by $$F_{DEP,\theta} = -4\pi\beta' R^3 \varepsilon_0 \varepsilon_c \left(E_0^2 \cos\theta \sin\theta\left(\frac{6\beta a^3}{r^4} + \frac{3\beta^2 a^6}{r^7}\right)\right). \qquad (5)$$

Equation (5) can also be applied to the case of a DC electric field, in which case $E_0$ denotes the electric field intensity. The azymuthal force on a particle located right outside of the drop can be obtained by substituting r≈a, which leads to $$F_{DEP,\theta,a} = -12\pi R^3 \frac{1}{a} \varepsilon_0 \varepsilon_c E_0^2 \beta' \beta (2+\beta) \cos\theta \sin\theta. \tag{6}$$

Notice that the force is zero both at the poles ($\theta=0,\pi$) and at the equator ($\theta=\pi/2$), is maximum at $\theta=\pi/4$, and increases as the drop size decreases. In other words, the smaller the size of the drop, the easier it is to move particles on the surface of the drop.

Equation (6) allows us to calculate the intensity of the tangential DEP force but also determine its sign. The direction of the particles' motion, and thus the location at which particles eventually aggregate, is determined by the sign of the latter force component, and thus the sign of $\beta'\beta(2+\beta)$. Furthermore, the sign of $\beta'\beta(2+\beta)$ is the same as that of $\beta'\beta$, because $(2+\beta)>0$ since $|\beta|\leqq 1$. Hereafter, we refer to $\beta'\beta$ as the "combined Clausius-Mossotti factor." If this combined factor is positive, namely $\beta'\beta>0$, particles aggregate at the poles where they are in a state of stable equilibrium. Hereafter, we refer to this type of emulsions as Type I. In contrast, if $\beta'\beta<0$, particles aggregate at the equator. We will refer to this type of emulsions as Type II.

Deformation of Drops

In addition to moving particles trapped on drop surfaces, an externally applied uniform electric field also deforms the drops themselves. This deformation, which depends on the electrical properties of the fluids, can be estimated under the following assumptions: (i) the fluids are considered as perfect dielectrics, in which case the electrical stresses act only in the direction normal to the interface and (ii) an isolated drop deforms into a prolate spheroidal shape. The electric stress or Maxwell stress tensor thus causes the drop to deform according to the direction of the electric field. However, as the drop deforms, the magnitude of the surface tension force, which counters the deviation from the spherical shape, increases. The drop stops deforming when the surface tension force balances the electrical force. The critical electric field strength below which the drop deformation remains small can be estimated using the result obtained by Allan and Mason for the case of a drop placed in a uniform electric field (Allan, R. S., Mason, S. G., *Proc. R. Soc. Lon. Ser.-A,* 267, 45 (1962); Allan, R. S., Mason, S. G., *Proc. R. Soc. Lon. Ser.-A,* 267, 62 (1962) and Allan, R. S., Mason, S. G., *J. Coll. Sci. Imp. U. Tok.,* 17, 383 (1962)). In their analysis, the deformed shape is determined by the balance of the surface tension force, which tends to make the drop spherical, and the force due to the electric stress, which tends to elongate the drop. The electric stress distribution on the surface of the drop is deduced by assuming that the drop remains spherical and the deformation takes the following expression:

$$D = \frac{9}{16} We = \frac{L-B}{L+B}, \tag{7}$$

where $$We = \frac{a\varepsilon_0 \varepsilon_c E_0^2 \beta^2}{\gamma}$$

is the electric Weber number and $\gamma$ is the interfacial tension between the two liquids. Here L is the end-to-end length of the drop measured along the axis of symmetry, and B is its maximum width in the transverse direction. The deformation parameter D varies between 0 and 1; for a spherical drop, D is zero and its value increases as the shape of the drop deviates from that of a sphere. For example, for drops of decane in water with a diameter of 780 μm (which were used in the experiments below), the deformations, which were measured experimentally, were found to be 0.017±0.002 and 0.040±0.002. These values are in good agreement with the analytical values of 0.015 and 0.042 obtained analytically using Expression (7), which also shows that the analysis in terms of the Clausius-Mossotti factor presented in this paper is appropriate.

The DEP force distribution around a slightly elongated drop, for which the deformation was computed using Expression (7), was calculated by determining the electric field distribution in presence of the drop using Equation (1). The force lines are displayed in FIG. 28.

Experiments

All experiments reported in this paper were conducted in a channel having a rectangular cross-section and equipped with electrodes mounted within the channel walls. Acrylic insulating plates have been inserted between the electrodes and the channel walls in order to prevent the electrodes from being in direct contact with the fluid, thus avoiding any electric current within the ambient liquid. The channel width, depth and length are 2.5 mm, 13 mm and 61 mm, respectively. The distance between the electrodes is 4 mm, and the width of the insulating plates is 0.75 mm. The depth and length of the channel are also the depth and the length of the electrodes. An AC power supply supplies voltages with a phase difference of $\pi$ between the electrodes, thus also generating an AC electric field across the channel in the direction normal to the walls. The frequency of the AC field applied was either 1 kHz or 100 Hz, while the field strength was varied incrementally by adjusting the voltage through a power supply. As reported below, the same physical phenomena were observed at both frequencies. A schematic of the experimental set-up is presented in FIG. 29.

The properties of the liquids used in this study are as follows. The dielectric constant of Millipore water is 80.0, its conductivity is $5.5\times10^6$ pSm$^{-1}$, and its density is 1.00 g/cm$^3$, while the corresponding values for decane are 2.0, $2.65\times10^4$ pSm$^{-1}$, and 0.73 g/cm$^3$; the values for silicone oil are 2.68, 2.67 pSm$^{-1}$ and 0.963 g/cm$^3$; the values for corn oil are 2.87, 32.0 pSm$^{-1}$ and 0.92 g/cm$^3$. The viscosity values are $1.003\times10^{-3}$ Ns/m$^2$, $0.92\times10^{-3}$ Ns/m$^2$, $48.15\times10^{-3}$ Ns/m$^2$ and $51.44\times10^{-3}$ Ns/m$^2$ for Millipore water, decane, silicone oil and corn oil, respectively, while the surface tension of water-decane and silicone oil-corn oil are $51.2\times10^{-3}$ N/m and $1.41\times10^{-3}$ N/m, respectively.

In order to stabilize the emulsions, micrometer-sized hollow extendospheres (Sphere one Inc., Chattanooga) were used. The density and dielectric constant of the extendospheres were 0.75 g/cm$^3$ and 4.5, respectively. The particles used in this study were highly polydisperse in size (ranging from 40~200 μm), with a normal distribution and an average diameter of d=112.5±37.2 μm.

Coalescence Between Bare Drops

First, we observed the coalescence of neighboring drops in a particle-free solution under the action of an electric field. For this, we injected two micrometer-sized water drops into a decane solution using a micropipette. These drops, located in the channel described above, were then videotaped using an optical microscope (Nikon Eclipse LV100) connected to a CCD camera (SONY DXC-390). FIG. 30 shows the time sequential coalescence of the two drops. Note that after a short time, the drops combine to form one final elongated large drop, which becomes spherical again once the electric field is relaxed. In FIG. 30*a*, the initial position of the drops before the electric field is turned on is such that the line joining their centers is inclined with respect to the electric field direction. In FIG. 30*b*, the drops are initially positioned so that the line joining their centers is parallel to the electric field. In both cases, the drops merge without reorienting themselves.

Stability of Pickering Emulsions

FIG. 31 exhibits optical microscopic images of water-in-decane Pickering emulsions stabilized by extendospheres in the case of (a) two isolated drops and (b) multiple drops. The diameters of the drops were within the range d=659.3±119.0 μm. We note that these water-in-decane Pickering emulsions are very stable over long periods of time (more than a month) and that even drops which are very close to each other do not merge.

Change in Particle Distribution on the Surface of a Single Drop

In order to evaluate the influence of an externally applied uniform electric field on the particle distribution on a drop surface, we prepared first a single water drop immersed in decane and surrounded by extendospheres, and second a single silicone oil drop immersed in corn oil surrounded by the same particles. In order to make sure that we could clearly observe the particles on the drop surface, we sprinkled a sufficient number of particles while also making sure that particles would not cover the entire drop surfaces. In FIG. 32, the electrodes were located at the top and bottom of the photographs for FIGS. 32(*a-c*) and 32(*g-i*) while the electric field was normal to the sheet of paper for FIGS. 32(*d-f*) and 32(*j-l*). The maximum voltage applied was 2500V and the frequency of the AC field was 1 kHz for the two top rows and 100 Hz for the two bottom rows. In the first configuration (first and third rows), the particles were observed to migrate toward the poles of the drop (FIGS. 32(*a-c*) and 32(*g-i*)), and the particle density near the poles was seen to increase with the applied voltage. Notice that in this case the combined Clausius-Mossotti factor (ββ') is positive, thus leading to a motion of the particles toward the regions of maximal electric field strength, i.e. near the poles of the drop. Furthermore, particles which tend to form chains because of particle-particle interactions move together to the poles. Chains, however, are always more difficult to move than individual particles and it takes a higher voltage to bring chains to their final destinations. It is interesting to note that, as the electric field strength increases, chains which formed away from the poles and hardly moved at lower voltages also ended up migrating to the poles. This increased the uncovered areas away from the poles. In contrast, in the second configuration (second and fourth rows) the combined Clausius-Mossotti factor (ββ') is negative, which led to a motion of the particles toward the equator of the drop. There was no significant difference between the physical phenomena observed at the two different frequencies.

First and third row panels ((a-c) and (g-i)): A water drop is immersed in a decane solution (the combined Clausius-Mossotti factor is ββ'=0.2731>0); it is clear that in this case particles cluster at the poles of the drop. Second and fourth row panels ((d-f) and (j-l)): A silicone oil drop is immersed in corn oil (the combined Clausius-Mossotti factor is ββ'=−0.0036<0); it is clear that in this case particles cluster at the equator of the drop.

Destabilization of Pickering Emulsions Using an Electric Field

We now investigate the possibility of destabilizing Pickering emulsions in which drops are covered with particles. For this purpose, we first focus on the coalescing behavior of two drops subjected to an external uniform electric field. FIG. 33 shows time-sequences of two drops around the time of their coalescence for two different systems: water drops immersed in decane, or emulsion of type I, (top row) and silicone oil immersed in corn oil, or emulsion of type II, (bottom row). Recall that the combined Clausius-Mossotti factor ββ' is positive in the first case and negative in the second case. Note also that in both cases the axis joining the centers of the drops is inclined with respect to the direction of the electric field. When the electric field is turned off, the Pickering emulsion is stable, and no coalescence takes place between adjacent drops even when the latter are in contact with one another (FIGS. 33*a, d*). However, shortly after the external electric field is applied, adjacent drops are seen to form bridges in between each other and subsequently merge (FIGS. 33*b, c* and FIGS. 33*e, f*). Here, we speculate that the motion of the particles and the subsequent uncovering of areas on the drop surfaces are at the origin of such mergers. For emulsions of type I (with a positive combined Clausius-Mossotti factor), particles are attracted to the poles of the drop, and for emulsions of type II (with a negative combined Clausius-Mossotti factor), particles are attracted to the equator of the drop. In both types of emulsion, as particles move they also leave other areas of the drop surface uncovered, thus breaking the particle barriers at those locations. Through these exposed areas, bridges can form in between drops and subsequently drops coalesce due to the tendency of the drops to minimize their surface energy.

If the previous scenario is correct, drops for which the line joining their centers is parallel to the external electric field in a type I emulsion should not merge. This was found to be the case, as demonstrated in FIG. 34*a-c* (top row). Likewise, drops whose line joining their centers is normal to the electric field in a type II emulsion do not merge, as shown in FIG. 34*d-f* (bottom row). Note that in both cases, the voltage applied (2500 V) exceeded the voltages used to induce drop coalescence in FIG. 33. On the other hand, drops for which the line joining their centers is aligned with the electric field are observed to merge in a type II solution, as displayed in FIG. 35. Recall that this was not the case in a type I solution (FIG. 34*a-c*). These observations indicate that the particle motion, rather than the elongation of the drops, is at the origin of the drop coalescence process. Finally, it is worth noting that while the position of the particles in a type II solution would allow drops whose line is normal to the electric field to merge, this scenario does not usually take place as in this case the drop-drop electrostatic interaction force is repelling and drops move away from each other.

An interesting drop arrangement is one in which three drops are next to each other in type I emulsion, two of the drops being on top of each other, and the other one being located on the side, in between the first two drops (see FIG. 36). In agreement with the scenario previously described, the drops on top of each other do not merge directly. Instead the bottom drop coalesces with the drop located on the side which, in turn, merges with the top drop. FIG. 37 shows a larger number of drops merging under a sufficiently large electric field.

It is noteworthy that merged drops are not spherical even after the electric field is turned off. These non-spherical drops are stable due to the fact that the surrounding particles are over-packed and trapped at the surface of the drops. A normal stress balance at the surface of a drop requires that $$\Delta P = \frac{\sigma_1}{R_1} + \frac{\sigma_2}{R_2} \quad (8)$$

where $\Delta P$ is the pressure jump across the surface, $R_1$ and $R_2$ are the local principal radii of the curvature of the drop surface, and $\sigma_1$ and $\sigma_2$ are the corresponding principal surface stresses. In nature, unequal stresses ($\sigma^1 \neq \sigma_2$) are not supported for a normal fluid surface. However, the over-packed Pickering emulsions are capable of supporting such uneven stresses due to the jamming of the particles trapped on the surface after drop coalescence. Several experimental and theoretical studies have indeed shown that non-spherical Pickering emulsions can form when the surrounding particles are over-packed at the surface of drops (Aveyard, R., Clint, J. H., Horozov, T. S., *Physical Chemistry Chemical Physics,* 5, 2398-2409 (2003); Binks, B. P., Lumsdon, S. O., *Langmuir,* 16, 8622-8631 (2000); Aveyard, R., Clint, J. H., Nees, D., Quirke, N., *Langmuir,* 16, 8820-8828 (2000); Binks, B. P., Clint, J. H., Mackenzie, G., Simcock, C., Whitby, C. P., *Langmuir,* 21, 8161-8167 (2005); Bon, S. A. F., Mookhoek, S. D., Colver, P. J., Fischer, H. R., van der Zwaag, S., *European Polymer Journal,* 43, 4839-4842 (2007); Pieranski, P., *Physical Review Letters,* 45, 569-572 (1980); Subramaniam, A. B., Abkarian, M., Mahadevan, L., Stone, H. A., *Nature,* 438, 930-930 (2005); Subramaniam, A. B., Mejean, C., Abkarian, M., Stone, H. A., *Langmuir,* 22, 5986-5990 (2006); and Dinsmore, A. D., Hsu, M. F., Nikolaides, M. G., Marquez, M., Bausch, A. R., Weitz, D. A., *Science,* 298, 1006-1009 (2002)). Moreover, it is extremely difficult to detach particles from drop surfaces without providing energy from the surroundings. This is due to the fact that the Gibbs free energy barrier between the state of the particles located on the drop surface and the state of the particles away from the drop surface is much larger than in the case of surfactants in conventional emulsions. In summary, the final drops had non-spherical shapes because (i) the surface of the drops was overcrowded with particles, (ii) most particles were not able to escape from the drop surface due to the relatively high energy required to detach the particles from surfaces and (iii) the spherical shape (corresponding to a minimum surface) could not offer enough surface area for all the particles.

Finally, we would like to mention that we expect the technique to also work for Pickering emulsions in which nanoparticles are used as emulsion stabilizers, including emulsions containing much smaller drops. In this case, one needs to apply an electric field sufficiently strong to generate DEP forces capable of overcoming the other forces acting on the particles, including particle-particle interaction forces and Brownian forces (Kadaksham, A. T. J., Singh, P. and Aubry, N., *Electrophoresis,* 25, 3625-3632, (2004)). We have started to carry out preliminary experiments which indicate that this is indeed the case.

Conclusions

In this example, we have proposed and investigated a new technique to destabilize dielectric Pickering emulsions using external uniform electric fields. It is interesting to note that the method offers a unified way to manipulate emulsions from creation to destabilization, as emulsions can be created through the application of a uniform electric field in a microdevice (Ozen, O., Aubry, N., Papageorgiou, D. and Petropoulos, P. *Physical Review Letters,* 96, 144501 (2006)) by using the electrohydrodynamic instability present at a fluid-fluid interface (Ozen, O., Aubry, N., Papageorgiou, D. and Petropoulos, P., *Electrochimica Acta,* 51, 11425 (2006) and Li, F., Ozen, O., Aubry, N., Papageorgiou, D. and Petropoulos, P., *Journal of Fluid Mechanics,* 583, 347-377 (2007)). An overall advantage of such a method lies in the simplicity of its implementation, as it is relatively easy to apply electric fields.

Experiments were conducted using dielectric Pickering emulsions with micrometer-sized extendospheres. These emulsions consisted of water drops suspended in decane, and silicone oil drops suspended in corn oil. Experiments showed that Pickering emulsions could be destabilized under an AC electric field, resulting from the local particle density changes on the drop surface. For the first type of emulsions, or type I emulsions, for which the combined Clausius-Mossotti factor is positive, particles move to the poles of the drops. For the second type of emulsions, or type II emulsions, for which the Clausius-Mossotti factor is negative, particles move to the equator of the drops. Independently of the regions the particles move to, such motions open up some uncovered areas on the drops' surface through which adjacent drops merge. In certain drop arrangements, however, drops do not merge. These include drops for which the line joining their centers is parallel to the electric field in a type I emulsion as, in this case, particles aggregate at the poles of the drops, thus forming barriers at those locations and preventing the drops from merging. The situation is similar for drops for which the line joining their centers is normal to the electric field direction as, in this case, particles aggregate at the equator of the drops. However, when the relative location of adjacent drops is such that the line joining their centers forms a certain angle with respect to the electric field direction, merging takes place when a sufficiently large electric field is applied. After coalescence, the merged drops maintained non-spherical shapes.

We claim:

1. A method for moving particles on the surface of a drop or bubble of a dispersed phase comprising particles on its surface, in a mixture comprising a continuous phase and the dispersed phase, comprising applying an electric field to the mixture so that the particles move along the surface of the drop or bubble under the action of a dielectrophoretic force.

2. The method of claim 1 in which the dispersed phase comprises drops of a liquid.

3. The method of claim 1 in which the continuous phase is a liquid.

4. The method of claim 1 in which the continuous phase is a gas.

5. The method of claim 1 in which the dispersed phase comprises bubbles of a gas and the continuous phase is a liquid.

6. The method of claim 1, in which the electric field is uniform.

7. The method of claim 1 in which the electric field is non-uniform.

8. The method of claim 1, wherein the dielectric constant for the dispersed phase is greater than that of the continuous phase and the particles have a positive Clausius-Mossotti factor, such that the particles are moved to the poles of drops or bubbles of the dispersed phase.

9. The method of claim 1, wherein the dielectric constant for the dispersed phase is greater than that of the continuous phase and the particles have a negative Clausius-Mossotti factor, such that the particles are moved to the equator of drops or bubbles of the dispersed phase.

10. The method of claim 1, wherein the dielectric constant for the dispersed phase is greater than that of the continuous phase and the drops or bubbles comprise particles having a negative Clausius-Mossotti factor and particles having a positive Clausius-Mossotti factor, such that the particles having a negative Clausius-Mossotti factor move to the equator of the drop or bubble and the particles having a positive Clausius-Mossotti factor move to the poles of the drop or bubble.

11. The method of claim 1, wherein the dielectric constant for the dispersed phase is less than that of the continuous phase and the particles have a positive Clausius-Mossotti factor, such that the particles are moved to the equator of the drop or bubble.

12. The method of claim 1, wherein the dielectric constant for the dispersed phase is less than that of the continuous phase and the particles have a negative Clausius-Mossotti factor, such that the particles are moved to the poles of the drop or bubble.

13. The method of claim 1, wherein the dielectric constant for the dispersed phase is less than that of the continuous phase and the drops or bubbles comprise particles having a negative Clausius-Mossotti factor and particles having a positive Clausius-Mossotti factor, such that particles having a negative Clausius-Mossotti factor move to the poles of the drops or bubbles and the particles having a positive Clausius-Mossotti factor move to the equator of the drops or bubbles.

14. The method of claim 1, further comprising after causing the particles to move on the surface of the drop or bubble to the poles or equator, further increasing the voltage of the electric field to the drop or bubble so that the drop or bubble breaks into one or more drops or bubbles comprising the particles and one or more drops or bubbles that are free of particles.

15. The method of claim 14, in which particles on the surface of the drop or bubble move to the poles of the drop or bubble and are ejected by tip streaming.

16. The method of claim 14, in which particles on the surface of the drop or bubble move to the equator of the drop or bubble and the drop or bubble breaks into three or more major drops or bubbles in which one or more of the major drops or bubbles are free of the particles.

17. The method of claim 14, further comprising removing a drop or bubble comprising the particles from the continuous phase.

18. The method of claim 14, further comprising removing the drop or bubble free of particles from the continuous phase.

19. The method of claim 1 in which the drop or bubble comprises particles having a positive Clausius-Mossotti factor and particles having a negative Clausius-Mossotti factor such that particles that move towards the poles are separated from particles that move towards the equator in the electric field.

20. The method of claim 1, in which $We'/G>1$, in which $We'$ is the scaled electric Weber number for the dispersed phase in the continuous phase and G is the electric gravity parameter for the dispersed phase in the continuous phase.

21. The method of claim 1, in which the dispersed phase is a liquid, further comprising solidifying the drop while the electric field is applied.

22. The method of claim 21 in which the electric field is applied at a temperature that the drop is liquid and the drop is then solidified while the electric field is applied by changing the temperature of the drop.

23. The method of claim 21 in which the electric field is applied at a temperature that the ambient fluid and drop are liquid, and the ambient liquid and drop are then solidified while the electric field is applied by changing the temperature of the drop.

24. The method of claim 21, in which the electric field is applied at a temperature above the melting point of the drop and the drop is solidified by cooling to a temperature below which the drop is solidified.

25. The method of claim 21 in which the drop comprises a composition that has one or both of a lower critical solution temperature (LCST) and an upper critical solution temperature (UCST) and the electric field is applied at a temperature at which the drop is a liquid or gel and then solidified while the electric field is applied by changing the temperature of the drop to a temperature at which the drop solidifies.

26. The method of claim 25 in which the composition is a (co)polymer.

27. The method of claim 26 in which the composition comprises a polymer selected from the group consisting of: poly(N-isopropylacrylamide); polyethylene oxide (PEO); polypropylene oxide (PPO); ethyl(hydroxyethyl)cellulose; poly(N-vinylcaprolactam); poly(methylvinyl ether) and copolymers thereof.

28. The method of claim 21 in which the drop comprises a polymer that is cross-linked while the electric field is applied.

29. The method of claim 1 in which the continuous phase is a liquid, further comprising solidifying the continuous phase while the electric field is applied.

30. The method of claim 29 in which the electric field is applied at a temperature that the continuous phase is liquid, and the continuous phase is then solidified while the electric field is applied by changing the temperature of the continuous phase.

31. The method of claim 29 in which the continuous phase comprises a polymer that is cross-linked while the electric field is applied.

32. The method of claim 1 in which the dispersed phase comprises particles having a positive Clausius-Mossotti factor and particles having a negative Clausius-Mossotti factor such that particles move towards both the poles and the equator.

33. The method of claim 1 in which the particle is uncharged.

* * * * *